(12) United States Patent
Okawa et al.

(10) Patent No.: US 12,097,616 B2
(45) Date of Patent: Sep. 24, 2024

(54) MODEL GENERATION APPARATUS, MODEL GENERATION METHOD, CONTROL APPARATUS, AND CONTROL METHOD

(71) Applicant: OMRON Corporation, Kyoto (JP)

(72) Inventors: Yohei Okawa, Kyoto (JP); Kennosuke Hayashi, Kyoto (JP); Yoshiya Shibata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 286 days.

(21) Appl. No.: 17/628,244

(22) PCT Filed: Jul. 22, 2020

(86) PCT No.: PCT/JP2020/028446
§ 371 (c)(1),
(2) Date: Jan. 19, 2022

(87) PCT Pub. No.: WO2021/033486
PCT Pub. Date: Feb. 25, 2021

(65) Prior Publication Data
US 2022/0258336 A1 Aug. 18, 2022

(30) Foreign Application Priority Data
Aug. 22, 2019 (JP) .................. 2019-152396

(51) Int. Cl.
*B25J 9/16* (2006.01)
*G06N 3/084* (2023.01)
(Continued)

(52) U.S. Cl.
CPC ............. *B25J 9/163* (2013.01); *B25J 9/1661* (2013.01); *G06N 3/084* (2013.01); *G06N 5/04* (2013.01);
(Continued)

(58) Field of Classification Search
CPC ........ B25J 9/163; B25J 9/1661; B25J 9/1664; B25J 9/1666; G05B 2219/40499;
(Continued)

(56) References Cited

U.S. PATENT DOCUMENTS

2017/0028562 A1\* 2/2017 Yamazaki ................ B25J 9/163
2018/0257225 A1 9/2018 Satou
(Continued)

FOREIGN PATENT DOCUMENTS

JP 2018-149628 A 9/2018
JP 2019-30941 A 2/2019
(Continued)

OTHER PUBLICATIONS

Jamali Nawid et al.: "Robot-Object Contact Perception Using Symbolic Temporal Pattern Learning", 2014 IEEE International Conference on Robotics and Automation (ICRA), May 31, 2015, pp. 6542-6548, Hong Kong, China, [retrieved on Sep. 22, 2014]; Relevance is indicated in the EESR issued on Jan. 17, 2023 in a counterpart European patent application.
(Continued)

*Primary Examiner* — Jason Holloway
*Assistant Examiner* — Benjamin J Brosh
(74) *Attorney, Agent, or Firm* — METROLEX IP LAW GROUP, PLLC; Robert L. Scott, Esq.

(57) ABSTRACT

A model generation apparatus according to one or more embodiments may include: a data obtainer configured to obtain a plurality of learning datasets each including a combination of training data and true data, the training data indicating a positional relationship between two objects, the true data indicating whether the two objects come in contact with each other in the positional relationship; and a machine learning unit configured to train, through machine learning, a determination model using the obtained plurality of learn-
(Continued)

ing datasets to cause the determination model to output, in response to an input of training data included in each of the plurality of learning datasets, an output value fitting true data included in a corresponding learning dataset of the plurality of learning datasets.

15 Claims, 13 Drawing Sheets

(51) Int. Cl.
*G06N 5/04* (2023.01)
*G06N 3/044* (2023.01)

(52) U.S. Cl.
CPC .... *G05B 2219/40499* (2013.01); *G06N 3/044* (2023.01)

(58) Field of Classification Search
CPC ........... G05B 2219/40519; G05B 2219/40031; G05B 2219/40032; G06N 3/044; G06N 3/084; G06F 30/27
See application file for complete search history.

(56) References Cited

U.S. PATENT DOCUMENTS

| | | |
|---|---|---|
| 2018/0319013 A1 | 11/2018 | Shimodaira |
| 2019/0047143 A1 | 2/2019 | Matsudaira et al. |
| 2019/0184561 A1* | 6/2019 | Yip ........................ G06N 3/044 |
| 2019/0251437 A1* | 8/2019 | Finn ........................ G06N 3/045 |
| 2019/0299405 A1* | 10/2019 | Warashina ............. B25J 9/1697 |
| 2019/0340448 A1* | 11/2019 | Hayashi ................... G06N 3/08 |
| 2021/0039264 A1* | 2/2021 | Ishizuka ................ B25J 19/063 |
| 2021/0073096 A1* | 3/2021 | Kato ...................... B25J 9/1676 |
| 2022/0017106 A1* | 1/2022 | Ota ......................... G05D 1/02 |

FOREIGN PATENT DOCUMENTS

| | | |
|---|---|---|
| WO | 2018/135509 A1 | 7/2018 |
| WO | 2019097676 A1 | 5/2019 |
| WO | 2019/150726 A1 | 8/2019 |

OTHER PUBLICATIONS

Extended European search report (EESR) issued on Jan. 17, 2023 in a counterpart European patent application.
Dmitry Kalashnikov et al., "QT-Opt: Scalable Deep Reinforcement Learning for Vision-Based Robotic Manipulation", arXiv: 1806.10293v3 [cs.LG], Nov. 28, 2018, pp. 1-23, 2nd Conference on Robot learning, Zurich, Switzerland; Concise explanation of relevance provided in the specification.
English translation of the International Search Report ("ISR") of PCT/JP2020/028446 mailed on Sep. 24, 2020.
Written Opinion("WO") of PCT/JP2020/028446 mailed on Sep. 24, 2020.

* cited by examiner

MODEL GENERATION APPARATUS, MODEL GENERATION METHOD, CONTROL APPARATUS, AND CONTROL METHOD

FIELD

The present disclosure relates to a model generation apparatus, a model generation method, a control apparatus, and a control method.

BACKGROUND

A production line for products includes robot devices such as manipulators. Such manipulators may have varying mechanisms and end-effectors and handle varying workpieces in accordance with, for example, work (tasks) to be performed. Manually creating operation sequences for such varying components and teaching the robot devices to perform target work may be difficult. With a known technique, components including a manipulator mechanism, an end-effector, and workpieces are first categorized, and then the robot device is manually operated to perform a series of operations to be performed while the orientations of the robot device are being recorded. In this manner, the technique directly teaches the robot device to perform work.

However, this technique involves teaching a robot device to perform work for every change in the components including a manipulator mechanism, an end-effector, and workpieces. Teaching a robot device to perform work is costly with this technique. Methods for teaching a robot device to perform work through machine learning have thus been studied. For example, Non-Patent Literature 1 describes a method for causing a robot device to learn, through reinforcement learning, operations for gripping an object based on image data obtained from a camera. This method at least partially automates a series of processing steps for teaching operations for gripping an object to a robot device and thus reduces the cost for teaching work to a robot device.

CITATION LIST

Non-Patent Literature

Non-Patent Literature 1: Dmitry Kalashnikov et al., QT-Opt: Scalable Deep Reinforcement Learning for Vision-Based Robotic Manipulation. arXiv preprint arXiv: 1806.10293, 2018.

SUMMARY

The inventors have noticed issues associated with the above known control method for a robot device. For example, the movement of an object such as an end-effector, a workpiece, or an obstacle may be expressed in a coordinate space. In this case, a value indicating whether two objects come in contact with each other may be stored for each coordinate point to allow expression of the boundary at which two objects come in contact with each other. However, this method of expression uses a largely increased data volume for information indicating the boundary at which two objects come in contact with each other in accordance with the combination of objects, the number of dimensions of coordinates, and the resolution (resolving power). For example, the coordinates of an object may be expressed by the three-dimensional (3D) position and the 3D orientation. In this case, the coordinates of the object are represented in six dimensions (6D). Increasing the resolution (resolving power) of the information indicating the boundary of contact increases the volume of data used on the order of the sixth power. A system with a relatively small storage capacity, such as an embedded system, may thus have difficulty in storing information indicating the boundary of contact using the above expression method. This issue is not limited to defining the operations of a robot device but may occur in any situations involving two objects coming in contact with each other.

One or more embodiments may be directed to a technique for reducing the data volume for information indicating the boundary at which two objects come in contact with each other.

Apparatuses, methods, and programs according to one or more embodiments may have the structure described below.

A model generation apparatus according to one or more embodiments may include a data obtainer that obtains a plurality of learning datasets each including a combination of training data indicating a positional relationship between two objects and true data indicating whether the two objects come in contact with each other in the positional relationship, and a machine learning unit that trains, through machine learning, a determination model using the obtained plurality of learning datasets to cause the determination model to output, in response to an input of training data included in each of the plurality of learning datasets, an output value fitting true data included in a corresponding learning dataset of the plurality of learning datasets.

The model generation apparatus with this structure generates, through machine learning, a determination model for determining whether two objects come in contact with each other in a target positional relationship. The trained determination model generated through machine learning can determine, in response to a target positional relationship (e.g., coordinates) provided as a set of continuous values, whether two objects come in contact with each other in the positional relationship without largely increasing the data volume for the determination model. This structure largely reduces the data volume for information indicating the boundary at which two objects come in contact with each other.

Each object may be of any type that can be operated in a real space or in a virtual space. The objects may be items associated with the operation of the robot device, such as an end-effector, a workpiece, or an obstacle. In this case, the robot device may be an industrial robot such as a manipulator, or may be an automatically movable object. The industrial robot may be, for example, a vertically articulated robot, a SCARA robot, a parallel link robot, a Cartesian coordinate robot, or a cooperative robot. The automatically movable object may be, for example, a drone, an autonomous driving vehicle, or a mobile robot.

One object may include multiple items. For three or more items, the determination model may process the items as one object and determine whether contact occurs between these items and another item, or may process these items as individual objects and determine whether contact occurs between these items. Multiple trained determination models may be prepared, and each model may determine whether contact occurs for a different pair of objects. In some embodiments, the determination model may receive an input of information indicating a condition such as an object type, and may determine whether any contact occurs between two objects satisfying the input condition.

The machine learning model for the determination model may be of any type selected as appropriate in each embodiment. The determination model may be a machine learning model, such as a neural network, a support vector machine, a regression model, or a decision tree model. The determination as to whether two objects come in contact with each other may be performed using a real space or a virtual space.

In the model generation apparatus according to one or more embodiments, the positional relationship between the two objects may be expressed using relative coordinates. The relative coordinates refer to the coordinates of an object viewed from a reference object. Either of the two objects may be selected as a reference for the relative coordinates enabling a definite expression of the physical and relative positional relationship between two objects. However, the positional relationship may be expressed in any manner selected as appropriate in each embodiment. The positional relationship between two objects may be expressed using their absolute coordinates. The coordinates may represent at least one of position or orientation. In a 3D space, the position may be defined by a longitudinal axis, a transverse axis, and a vertical axis, and the orientation may be defined by rotations about the axes (roll, pitch, and yaw).

In the model generation apparatus according to one or more embodiments, at least one of the two objects may include an object to be moved by an operation of a robot device. The above-described structure reduces the data volume for information indicating the boundary at which two objects come in contact with each other for defining the operation of the robot device. An object to be moved by the operation of the robot device may be a component of the robot device such as an end-effector, may be the robot device, or may be an item other than a component of the robot device such as a workpiece held by an end-effector.

A control apparatus according to one or more embodiments may be an apparatus for controlling an operation of a robot device to perform a task of moving a first object in an environment including the first object and a second object. The apparatus including a processor configured to perform operations comprising operation as a state obtainer, an action determiner, a contact determiner, a command determiner, and a driver. The state obtainer obtains a current task state of the robot device. The task state is defined by a positional relationship between the first object and the second object. The action determiner determines a goal task state to be achieved subsequently to the obtained current task state to be closer to a task state as a final goal. The contact determiner determines whether the first object and the second object come in contact with each other in a target task state by providing the target task state of the first object and the second object to a trained determination model. The trained determination model is trained through machine learning to output an output value fitting true data in response to an input of training data. The training data indicates a positional relationship between the first object and the second object. The true data indicates whether the first object and the second object come in contact with each other in the positional relationship. The command determiner determines a control command for the robot device to change the task state of the robot device from the current task state to the goal task state. The driver provides the determined control command to the robot device to drive the robot device.

the above described structure uses a trained determination model generated through machine learning to largely reduce the data volume for information indicating the boundary at which the first object and the second object come in contact with each other. The control apparatus with this structure may thus appropriately drive the robot device to avoid unintended contact between the first object and the second object with a computer having relatively low performance, such as an embedded system.

A known control method directly associates time-series control commands for the robot device with their respective tasks. A slight change in at least either the environment in which a task is performed or an object may not be reflected in training results obtained with this method, possibly preventing the task from being performed appropriately. With the above structure, the control command for the robot device is not directly associated with the task, but is associated with the amount of change in the positional relationship (task state) between the objects. In other words, time-series control commands may be generated or taught in response to a change in the positional relationship without being associated with the respective tasks. Such a structure may train the robot device to perform tasks in versatile situations, thus reducing the cost for teaching the robot device to perform tasks.

The robot device may be an industrial robot such as a manipulator or an automatically movable object. For the robot device being a manipulator, the first object may be an end-effector of the manipulator, and the second object may be a workpiece to be held by the end-effector. In this case, the task to be performed by the manipulator may be to hold a workpiece with its end-effector. With the end-effector holding the workpiece, the first object may be the workpiece, and the second object may be another workpiece on which the workpiece is to be placed. In this case, the task to be performed by the manipulator may be to place the workpiece held by the end-effector on the other workpiece. The end-effector, the workpiece, and the other workpiece may be of any types that may be selected as appropriate in each embodiment. The end-effector may be, for example, a gripper, a suction device, or a screwdriver. The workpiece may be, for example, a connector or a peg. The other workpiece may be, for example, a socket or a hole.

The task may be any work to be performed by the robot device and may be selected as appropriate in each embodiment. The task may include transporting components, fitting components to each other, or turning screws. The task may include simple work such as holding a workpiece or releasing a workpiece. The task may include changing the coordinates of a target workpiece by, for example, holding the workpiece and placing the workpiece at specified coordinates (position and orientation). The task may include spraying paint onto a workpiece from specified relative coordinates using an atomizer as the end-effector. The task may include placing a camera attached to the end-effector at specified coordinates. The task may be predetermined or may be specified by an operator.

The final goal refers to a goal point (goal) to be reached upon completion of the task and may be set in accordance with a task to be performed. The goal includes the final goal and may be set as appropriate to perform the task. The number of goals to be set may be one (the final goal alone is set in this case) or two or more. The goals other than the final goal are waypoints between the start point and the goal point. The final goal may thus be simply referred to as a goal, and a goal other than the final goal may be simply referred to as a subgoal. The subgoal may also be referred to as a waypoint.

In the control apparatus according to one or more embodiments, the positional relationship between the first object and the second object may be expressed using relative coordinates. Such a structure allows appropriate and definitive expression of the physical and relative positional relationship between the first object and the second object. However, the positional relationship may be expressed in any manner selected as appropriate in each embodiment. The positional relationship between the first object and the second object may be expressed using, for example, their absolute coordinates.

The control apparatus according to one or more embodiments may further include a model generator that generates, using a result of the determination obtained by the trained determination model, an inference model for inferring the goal task state to be achieved subsequently based on the current task state and the task state as the final goal to avoid contact of the first object with the second object. The action determiner may determine the goal task state to be achieved subsequently to the current task state using the generated inference model.

The trained determination model may determine whether the first object and the second object come in contact with each other. The determination result obtained by the trained determination model may be used to build the inference model that may infer the goal task state based on the current task state and the task state as the final goal to avoid unintended contact between the first object and the second object. The inference model built with this structure may be used to determine the goal task state to avoid contact between the first object and the second object without a computational operation of the determination model for controlling the operation of the robot device. The computation for the control may thus be less costly.

Inferring the goal task state to avoid contact of the first object with the second object refers to determining the goal task state to avoid unintended contact between the first object and the second object. For example, the inferring may include determining, to be the goal task state, a task state in which the first object is in contact with the second object appropriately, such as when the end-effector holds the workpiece.

In the control apparatus according to one or more embodiments, the model generator may generate the inference model by training the inference model through machine learning. Such a structure may thus appropriately generate the inference model usable to perform a task. The machine learning model for the inference model may be of any type selected as appropriate in each embodiment. The inference model may include a functional expression or a data table. The inference model being a functional expression may include a neural network, a support vector machine, a regression model, or a decision tree model. The method of machine learning may be other than described in the above example and may be selected as appropriate for the configuration of the inference model. Examples of machine learning for the inference model include supervised learning and reinforcement learning.

In the control apparatus according to one or more embodiments, the machine learning may include reinforcement learning using a reward defined based on a result of determination obtained by the trained determination model as to whether the first object and the second object come in contact with each other in a target task state and based on a distance between the target task state and the task state as the final goal. The reward may be set higher for the first object and the second object not coming in contact with each other and for the distance being shorter, and may be set lower for the first object and the second object coming in contact with each other or for the distance being longer. The training through the machine learning may include repeatedly correcting a value of a computational parameter of the inference model to increase the reward. The inference model generated with this structure may determine the goal task state to avoid unintended contact between the first object and the second object and to allow the robot device to quickly achieve the task state as the final goal. The control apparatus may thus control the robot device to perform the task appropriately.

In the control apparatus according to one or more embodiments, the inference model may include a potential field defining a potential for each set of coordinates in a task space representing a set of the task states. The model generator may generate paths from a plurality of task states set as start points to the task state as the final goal through path planning to avoid contact of the first object with the second object using the trained determination model in the task space, and generate the potential field by setting a potential for each set of the coordinates in accordance with a frequency of passage through the generated paths. The action determiner may determine the goal task state to be achieved subsequently in accordance with a gradient of the potential set for coordinates corresponding to the current task state in the generated potential field. This structure can thus appropriately generate the inference model usable to perform a task.

The potential for each set of coordinates in the potential field indicates an evaluation value indicating the possibility of achieving the final goal provided to the positional relationship between the first object and the second object at the corresponding coordinates. More specifically, a higher potential indicates a higher possibility that the positional relationship at the coordinates achieves the final goal, and a lower potential indicates a lower possibility that the positional relationship at the coordinates achieves the final goal. Changing to a state with a higher gradient of potential allows the task state as the final goal to be achieved from any task state selected at the start point.

Another implementation of the model generation apparatus and the control apparatus according to one or more embodiments may be an information processing method, a program, or a storage medium storing the program readable by a computer for implementing the components of the model generation apparatus or the control apparatus. The computer-readable storage medium includes a medium storing a program or other information in an electrical, magnetic, optical, mechanical, or chemical manner. A control system according to one or more embodiments may include the model generation apparatus according to one or more embodiments and the control apparatus according to one or more embodiments. The model generation apparatus according to one or more embodiments may include a portion of the control apparatus associated with the model generator.

For example, a model generation method according to one or more embodiments is an information processing method implementable by a computer. The method includes obtaining a plurality of learning datasets each including a combination of training data indicating a positional relationship between two objects and true data indicating whether the two objects come in contact with each other in the positional relationship, and training, through machine learning, a determination model using the obtained plurality of learning datasets to cause the determination model to output, in response to an input of training data included in each of the plurality of learning datasets, an output value fitting true data included in a corresponding learning dataset of the plurality of learning datasets.

For example, a model generation program according to one or more embodiments is a program for causing a computer to perform operations including obtaining a plurality of learning datasets each including a combination of training data indicating a positional relationship between two objects and true data indicating whether the two objects come in contact with each other in the positional relationship, and training, through machine learning, a determination model using the obtained plurality of learning datasets to cause the determination model to output, in response to an input of training data included in each of the plurality of learning datasets, an output value fitting true data included in a corresponding learning dataset of the plurality of learning datasets.

For example, a control method according to one or more embodiments is an information processing method for controlling an operation of a robot device to perform a task of moving a first object in an environment including the first object and a second object. The method is implementable by a computer and includes obtaining a current task state, determining a goal task state, determining whether the first object and the second object come in contact with each other, determining a control command, and providing the determined control command. The obtaining the current task state includes obtaining a current task state of the first object and the second object. The task state is defined by a positional relationship between the first object and the second object. The determining the goal task state includes determining a goal task state to be achieved subsequently to the obtained current task state to be closer to a task state as a final goal. The determining whether the first object and the second object come in contact with each other includes determining whether the first object and the second object come in contact with each other in a target task state by providing the target task state of the first object and the second object to a trained determination model. The trained determination model is trained through machine learning to output an output value fitting true data in response to an input of training data. The training data indicates a positional relationship between the first object and the second object. The true data indicates whether the first object and the second object come in contact with each other in the positional relationship. The determining the control command includes determining a control command for the robot device to change the task state of the robot device from the current task state to the goal task state. The providing the determined control command includes providing the determined control command to the robot device to control the operation of the robot device.

For example, a control program according to one or more embodiments is a program for controlling an operation of a robot device to perform a task of moving a first object in an environment including the first object and a second object. The program causes a computer to perform operations including obtaining a current task state, determining a goal task state, determining whether the first object and the second object come in contact with each other, determining a control command, and providing the determined control command. The obtaining the current task state includes obtaining a current task state of the first object and the second object. The task state is defined by a positional relationship between the first object and the second object. The determining the goal task state includes determining a goal task state to be achieved subsequently to the obtained current task state to be closer to a task state as a final goal. The determining whether the first object and the second object come in contact with each other includes determining whether the first object and the second object come in contact with each other in a target task state by providing the target task state of the first object and the second object to a trained determination model. The trained determination model is trained through machine learning to output an output value fitting true data in response to an input of training data. The training data indicates a positional relationship between the first object and the second object. The true data indicates whether the first object and the second object come in contact with each other in the positional relationship. The determining the control command includes determining a control command for the robot device to change the task state of the robot device from the current task state to the goal task state. The providing the determined control command includes providing the determined control command to the robot device to control the operation of the robot device.

The structure according to one or more embodiments may reduce the data volume for information indicating the boundary at which two objects come in contact with each other.

DETAILED DESCRIPTION

Embodiments according to an aspect of the present invention (hereafter, may be referred to as the present embodiment) will now be described with reference to the drawings. The embodiments described below are mere examples of the present invention in any aspect. The embodiments may be variously modified or altered without departing from the scope of the present invention. More specifically, the present invention may be implemented as appropriate using the structure specific to each embodiment. Although data used in the present embodiments is described in a natural language, such data may be specifically defined using any computer-readable language, such as a pseudo language, commands, parameters, or a machine language.

1. Example Use

Figure 1:
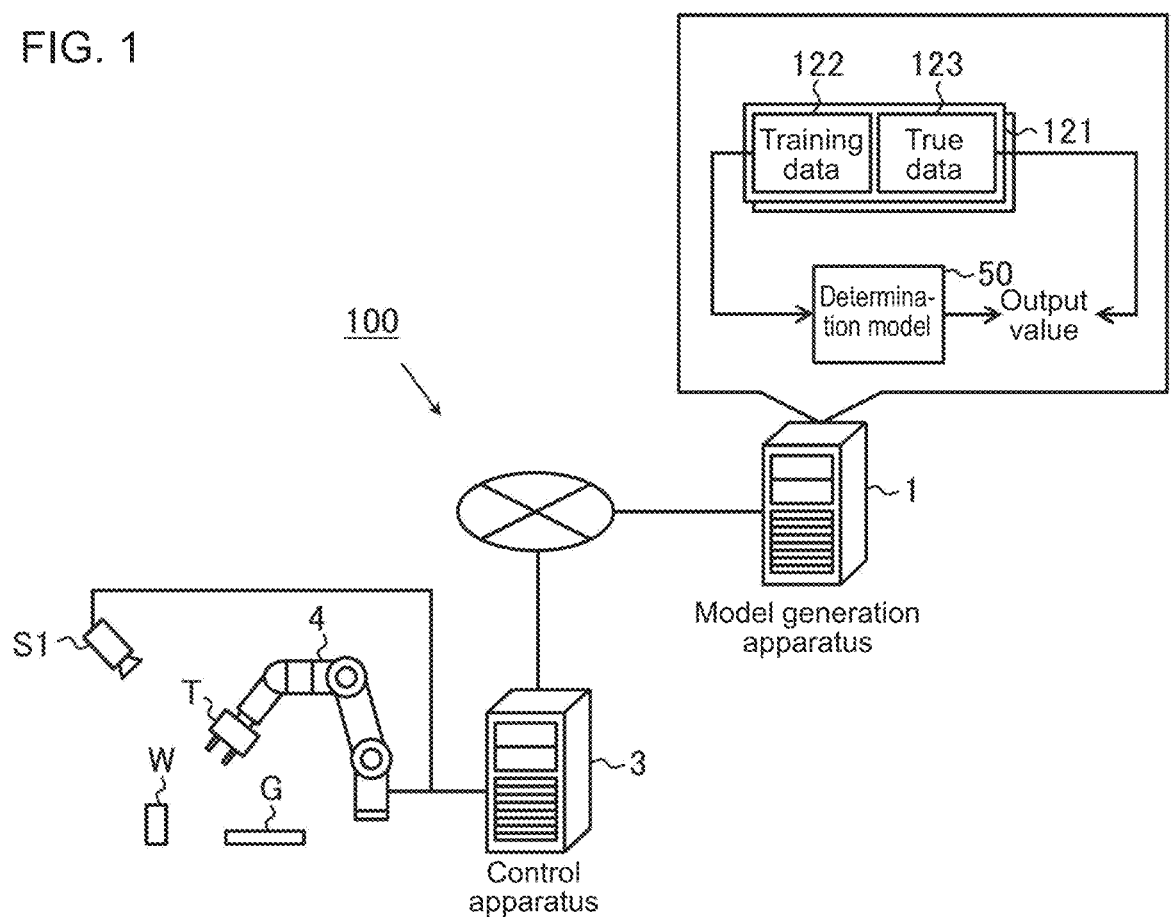
FIG. 1 is a schematic diagram illustrating a system according to one or more embodiments in one example use.

An example use of the present invention will now be described with reference to FIG. 1. is a schematic diagram illustrating a system according to one or more embodiments in an example use. As shown in FIG. 1, a control system 100 according to the present embodiment includes a model generation apparatus 1 and a control apparatus 3. The model generation apparatus 1 and the control apparatus 3 may be connected to each other with a network. The network may be selected as appropriate from, for example, the Internet, a wireless communication network, a movable communication network, a telephone network, and a dedicated network.

Model Generation Apparatus
Model Generation Apparatus

The model generation apparatus 1 according to the present embodiment is a computer that generates a determination model 50 for determining whether two objects come in contact with each other in a target positional relationship. More specifically, the model generation apparatus 1 according to the present embodiment obtains multiple learning datasets 121 each including a combination of training data 122 and true data 123. The training data 122 indicates a positional relationship between two objects. The true data 123 indicates whether the two objects come in contact with each other in the positional relationship.

In the present embodiment, the positional relationship between two objects is expressed using their relative coordinates. The relative coordinates refer to the coordinates of an object viewed from a reference object. Either of the two objects may be selected as a reference for the relative coordinates. The coordinates may represent at least one of position or orientation. In a three-dimensional (3D) space, the position may be defined by a longitudinal axis, a transverse axis, and a vertical axis, and the orientation may be defined by rotations about the axes (roll, pitch, and yaw). In the present embodiment, the relative coordinates may be represented in six dimensions (6D), or more specifically, using a relative position in 3D and a relative orientation in 3D. The relative coordinates may be defined in fewer dimensions than 6D as appropriate.

The model generation apparatus 1 according to the present embodiment uses the obtained multiple learning datasets 121 to train the determination model 50 through machine learning. Such machine learning includes training the determination model 50 to output, in response to an input of the training data 122 included in each learning dataset 121, an output value that fits the true data 123 included in the corresponding learning dataset 121. The determination model 50 trained through machine learning is built to be capable of determining whether two objects in a target positional relationship come in contact with each other.

In the present embodiment, the trained determination model 50 is used in a space including a manipulator 4 with an end-effector T, a workpiece W, and another workpiece G, to determine whether the workpiece W and the end-effector T come in contact with each other and whether the workpiece W and the other workpiece G come in contact with each other. The manipulator 4 is an example of the robot device. The end-effector T, the workpiece W, and the other workpiece G are examples of objects. The end-effector T, the workpiece W, and the other workpiece G may be of any types that may be selected as appropriate for the task. The end-effector T may be, for example, a gripper, a suction device, or a screwdriver. The workpiece W may be, for example, a connector or a peg. The other workpiece G may be, for example, a socket or a hole. The other workpiece G is an example of an object to which the workpiece W is to be joined. The end-effector T holding the workpiece W may be, for example, a gripper gripping a workpiece, a suction device attracting a workpiece, or a screwdriver holding a workpiece at its distal end.

More specifically, for example, the manipulator 4 in the present embodiment holds the workpiece W with the end-effector T and performs a task of joining the workpiece W being held to the other workpiece G. This task may include two tasks, or more specifically, a first task of holding the workpiece W with the end-effector T and a second task of transporting the workpiece W being held toward the other workpiece G. The trained determination model 50 is used to determine whether the end-effector T and the workpiece W unintendedly come in contact with each other when the first task is performed, or in other words, when the end-effector T is moved to hold the workpiece W. The trained determination model 50 is also used to determine whether the workpiece W and the other workpiece G unintendedly come in contact with each other when the second task is performed, or in other words, when the end-effector T holding the workpiece W is moved to transport the workpiece W toward the other workpiece G.

In one or more embodiments, the trained determination model 50 determines whether two objects come in contact with each other. At least one of the two objects is to be moved by the operation of the robot device (manipulator 4). One or both of the two objects may include an object to be moved by the operation of the robot device. However, exemplary arrangements may be used other than the above example. The structure according to one or more embodiments may be usable in any situation for determining whether two objects come in contact with each other.

For multiple objects to be determined for contact between them as described above, multiple trained determination models 50 may be prepared to determine whether any contact occurs between different objects. In some embodiments, the trained determination model 50 may receive an input of information indicating a condition for an object, such as an object type or an object identifier, and may determine whether any contact occurs between two objects satisfying the input condition. Any of these methods may be used. For ease of explanation, the trained determination model 50 will be described for any objects in the examples below.

Control Apparatus

The control apparatus 3 according to the present embodiment is a computer that controls the operation of the robot device to perform a task of moving a first object relative to a second object in an environment including the first object and the second object. The first task and the second task are examples of the task of moving the first object relative to the second object. For the first task, the end-effector T is an example of the first object, and the workpiece W is an example of the second object. For the second task, the workpiece W is an example of the first object, and the other workpiece G is an example of the second object. The manipulator 4 is an example of the robot device as described above.

The control apparatus 3 according to the present embodiment first obtains information indicating the current task state of the first object and the second object. The task state is defined by the positional relationship between the first object and the second object (or the two objects). In the present embodiment, the task state is observed with a camera S1 as a visual sensor. As described below, encoders are used to measure the angles of joints of the manipulator 4, and a touch sensor is used to measure the state in which the end-effector T is holding the workpiece W. In the present embodiment, these sensors can be used to observe the current task state.

Figure 2A:
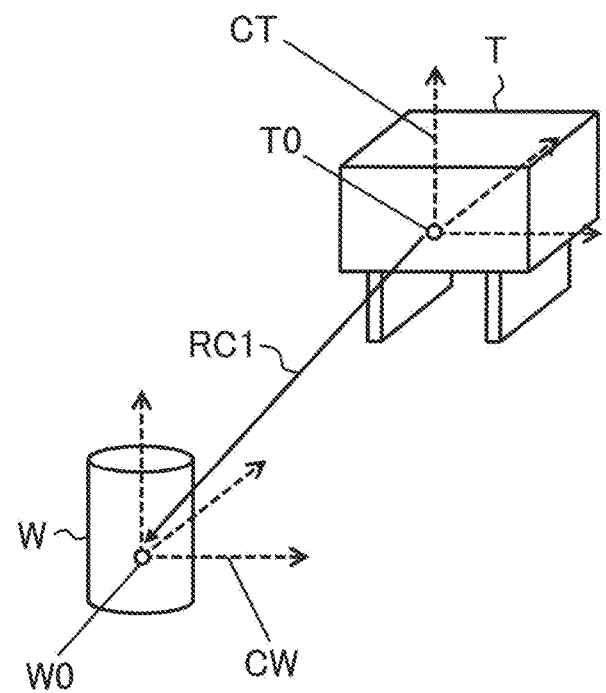
FIG. 2A is a schematic diagram illustrating two objects in one or more embodiments showing an example positional relationship.
Figure 2B:
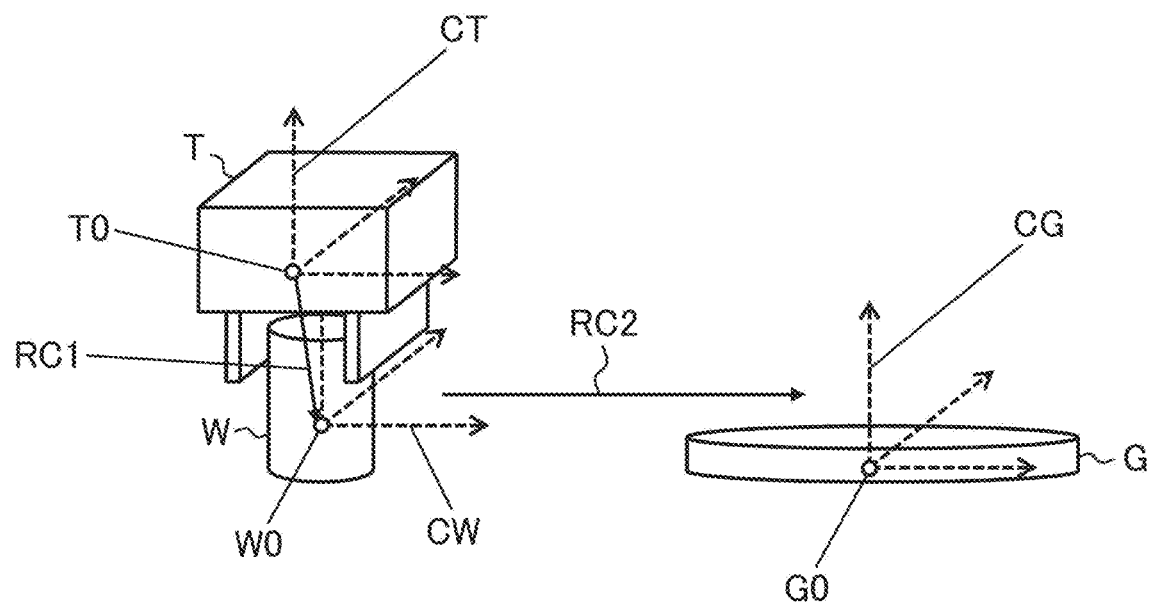
FIG. 2B is a schematic diagram illustrating two objects in one or more embodiments showing an example positional relationship.

Defining the task state using the positional relationship between the first object and the second object will now be described with reference to FIGS. 2A and 2B. FIG. 2A is a schematic diagram of the end-effector T and the workpiece W for performing the first task, showing their example positional relationship. FIG. 2B is a schematic diagram of the workpiece W and the other workpiece G for performing the second task, showing their example positional relationship. In the present embodiment, the positional relationship between two objects is expressed using their relative coordinates as described above.

In the present embodiment, as shown in FIG. 2A, a target point T0 on the end-effector T is the endpoint of the manipulator 4 when the end-effector T is not holding the workpiece W, such as when the first task is performed. In the first task, the workpiece W is the destination object to which the end-effector T is to be moved. The positional relationship between the end-effector T and the workpiece W is expressed using relative coordinates RC1 of the workpiece W relative to the end-effector T. The relative coordinates RC1 are defined in a local coordinate system CW having the origin at a target point W0 on the workpiece W as viewed from a local coordinate system CT having the origin at the target point T0 on the end-effector T. In the present embodiment, the task state of the manipulator 4 is defined by the relative coordinates RC1 when the first task is performed.

As shown in FIG. 2B, the target point W0 on the workpiece W is the endpoint of the manipulator 4 when the end-effector T is holding the workpiece W, such as when the second task is performed. In the second task, the other workpiece G is the destination object to which the end-effector T is to be moved. The positional relationship between the workpiece W and the other workpiece G is expressed using relative coordinates RC2 of the other workpiece G relative to the workpiece W. The relative coordinates RC2 are defined in a local coordinate system CG having the origin at a target point G0 on the other workpiece G as viewed from the local coordinate system CW having the origin at the target point W0 on the workpiece W. In the present embodiment, the task state of the manipulator 4 is defined by the relative coordinates RC2 when the second task is performed.

In other words, in the present embodiment, the task state is defined by the positional relationship (relative coordinates in the present embodiment) between the endpoint of the manipulator 4 and the destination object in both the situations in which the first task is performed and the second task is performed. The endpoint of the manipulator 4 corresponds to the first object, and the destination object corresponds to the second object. Each of the first task and the second task can be a task of moving the endpoint of the manipulator 4 relative to the destination object. The structure according to the present embodiment can simplify the control over the manipulator 4 and thus reduce the cost for creating or teaching the operation of the manipulator 4.

The target points (T0, W0, G0) may be set as appropriate. The relative coordinates may be defined in any manner as appropriate in each embodiment. For example, the relative coordinates RC1 and RC2 may be interchanged. More specifically, the relative coordinates RC1 may be in the local coordinate system CT having the origin at the target point T0 on the end-effector T as viewed from the local coordinate system CW having the origin at the target point W0 on the workpiece W. Moving the endpoint is not limited to moving the endpoint toward the destination object and may be determined as appropriate in each embodiment. For example, moving the endpoint may include moving the endpoint away from the destination object or to a predetermined position with reference to the destination object.

The control apparatus 3 according to the present embodiment determines the goal task state to be achieved subsequently to the current task state indicated by the obtained information to be closer to the task state as the final goal. For the first task, the end-effector T holding the workpiece W is an example of the task state as the final goal. For the second task, the workpiece W being at an intended position on the other workpiece G is an example of the task state as the final goal.

The control apparatus 3 according to the present embodiment provides, to the trained determination model 50, information indicating a target task state of the first object and the second object to determine whether the first object and the second object come in contact with each other in the target task state. The trained determination model 50 is trained through the above machine learning to output, in response to an input of training data (training data 122) indicating the positional relationship between the first object and the second object, an output value that fits true data (true data 123) indicating whether the first object and the second object come in contact with each other in the positional relationship.

The control apparatus 3 according to the present embodiment determines a control command for the robot device (manipulator 4) to change the task state of the robot device (manipulator 4) from the current task state to the goal task state. The control apparatus 3 then provides the determined control command to the robot device to drive the robot device. The control apparatus 3 according to the present embodiment can thus control the operation of the robot device to perform a task of moving the first object relative to the second object.

Effects

As described above, the model generation apparatus 1 according to the present embodiment generates, through machine learning, the determination model 50 for determining whether two objects come in contact with each other in a target positional relationship. The trained determination model 50 generated through machine learning can determine, in response to a target positional relationship (relative coordinates in the present embodiment) provided as a set of continuous values, whether two objects in the positional relationship come in contact with each other without largely increasing the data volume for the determination model 50. The structure according to the present embodiment largely reduces the data volume for information indicating the boundary at which two objects come in contact with each other.

Figure 3:
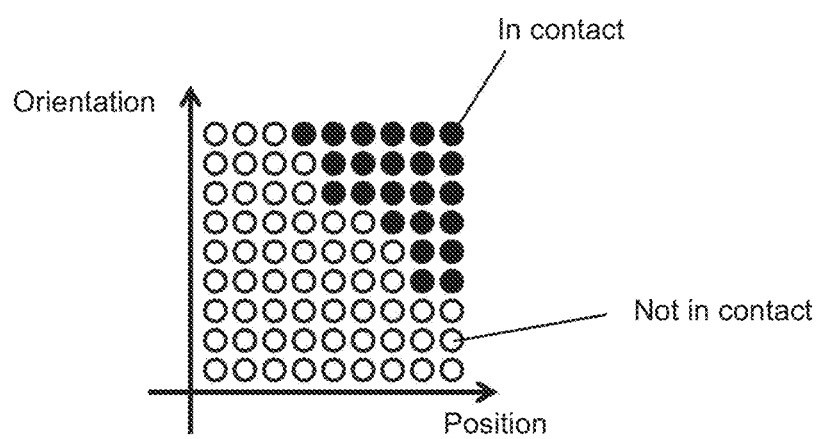
FIG. 3 is a schematic diagram illustrating example coordinate points each having a value indicating whether two objects come in contact with each other.

The effects will now be described further with reference to FIG. 3 in a specific example. FIG. 3 is a schematic diagram of example coordinate points each having a value indicating whether two objects come in contact with each other. The white circles indicate two objects not in contact with each other in the positional relationship corresponding to the coordinates. The black circles indicate two objects in contact with each other in the positional relationship corresponding to the coordinates. Although the coordinate points are represented in two dimensions in FIG. 3, the coordinate points are represented in 6D in a space of 6D relative coordinates described above. Increasing the resolution (resolving power) of the space increases the volume of data used on the order of the sixth power. For coordinate points set at a resolution available for operation in a real space, the data volume for such information can easily be on the order of gigabytes.

In the present embodiment, the trained determination model 50 stores information indicating whether two objects come in contact with each other in a target positional relationship. The trained determination model 50 can process a set of continuous values without increasing the number of computational parameters that may depend on the number of dimensions of the relative coordinates. For a determination model 50 including a three-layered neural network (described later), for example, the trained determination model 50 can reduce the volume of data to be used to about several megabytes. The structure according to the present embodiment largely reduces the data volume for information indicating the boundary at which two objects come in contact with each other. The control apparatus 3 can thus appropriately drive the robot device to avoid unintended contact between the first object and the second object with a computer having relatively low performance, such as an embedded system.

A known control method for the robot device directly associates time-series control commands for the robot device with their respective tasks. In other words, the known control method directly describes tasks being associated with the sequence of control commands. A slight change in at least either the environment in which a task is performed or an object may not be reflected in training results obtained with this method. This possibly disables the task from being performed appropriately.

In one situation, the robot device may be taught to perform a task of holding a workpiece with its end-effector. The robot device can hold a workpiece correctly placed at a target position with the end-effector based on the training results. However, the workpiece may be oriented or positioned differently from when training is performed. This changes the coordinates of the workpiece for the end-effector to hold and thus changes the task to be performed by the robot device. The robot device may fail to hold the workpiece appropriately with the end-effector with the sequence of control commands resulting from the training results.

A slight change in at least either the environment in which a task is performed or an object may not be reflected in training results obtained with the known method. To allow the robot device to perform the task appropriately, the robot device is to be newly trained to perform the task. To allow the robot device to operate in versatile situations, the robot device is to be trained using control commands for different states for each task. Teaching the robot device to perform tasks is thus costly.

In the present embodiment, the state of the task to be performed by the manipulator 4 is represented by a relative relationship between objects, such as the end-effector T, the workpiece W, and the other workpiece G, or more specifically, using the positional relationship between the objects. Each control command for the manipulator 4 is not directly associated with the task, but is associated with the amount of change in the relative positional relationship between the objects. In other words, time-series control commands for the manipulator 4 can be generated or taught in response to a change in the relative positional relationship between the objects without being associated with the respective tasks. In the above example, a change in the coordinates of the workpiece is reflected in determining the positional relationship between the end-effector and the workpiece. The robot device can thus appropriately hold the workpiece based on the training results. The structure according to the present embodiment can train the manipulator 4 to perform tasks in versatile situations, thus reducing the cost for teaching the manipulator 4 to perform tasks.

2. Example Configuration

Hardware Configuration
Model Generation Apparatus

Figure 4:
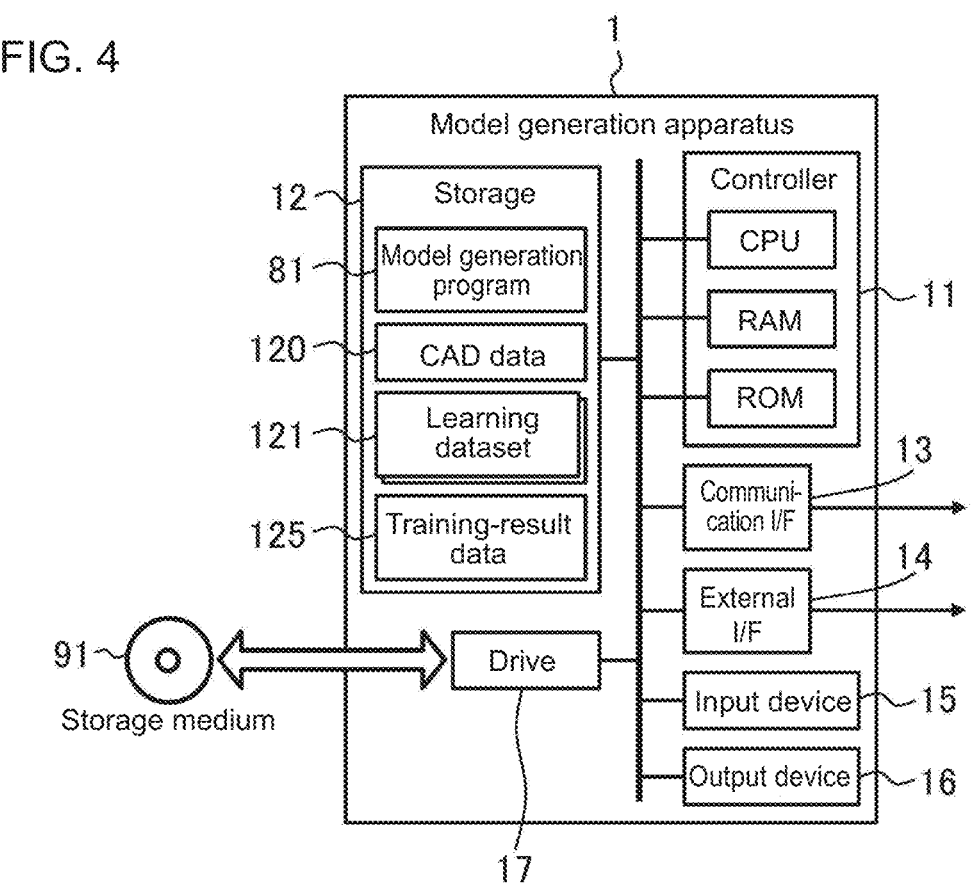
FIG. 4 is a schematic diagram illustrating a model generation apparatus according to one or more embodiments showing an example hardware configuration.

The hardware configuration of the model generation apparatus 1 according to the present embodiment will now be described with reference to FIG. 4. FIG. 4 is a schematic diagram of the model generation apparatus 1 according to the present embodiment showing its example hardware configuration.

As shown in FIG. 4, the model generation apparatus 1 according to the present embodiment is a computer including a controller 11, a storage 12, a communication interface 13, an external interface 14, an input device 15, an output device 16, and a drive 17 that are electrically connected to one another. In FIG. 4, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on programs and various sets of data. The storage 12 is an example memory and may include a hard disk drive and a solid-state drive. In the present embodiment, the storage 12 stores various types of information such as a model generation program 81, computer-aided design (CAD) data 120, multiple learning datasets 121, and training-result data 125.

The model generation program 81 causes the model generation apparatus 1 to perform information processing described later (FIG. 9) associated with machine learning of the determination model 50. The model generation program 81 includes a series of commands for the information processing. The CAD data 120 includes structure information indicating a geometric structure, such as a model (e.g., a 3D model) for each object (the end-effector T, the workpiece W, or the other workpiece G). The CAD data 120 may be generated using known software. The multiple learning datasets 121 are used for training the determination model 50 through machine learning. The training-result data 125 represents information about the trained determination model 50 generated through machine learning. The training-result data 125 results from executing the model generation program 81. This will be described in detail later.

The communication interface 13 is, for example, a wired local area network (LAN) module or a wireless LAN module for wired or wireless communication through a network. The model generation apparatus 1 uses the communication interface 13 to communicate data with other information processing apparatuses (e.g., the control apparatus 3) with a network.

The external interface 14 is an interface for connection with an external device and may be, for example, a universal serial bus (USB) port or a dedicated port. The type and the number of external interfaces 14 may be selected as appropriate for the type and the number of external devices to be connected. The model generation apparatus 1 may be connected to the manipulator 4 and the camera S1 through the external interface 14 to determine whether objects come in contact with each other in a real space.

The input device 15 is, for example, a mouse or a keyboard. The output device 16 is, for example, a display or a speaker. An operator may operate the model generation apparatus 1 using the input device 15 and the output device 16.

The drive 17 is, for example, a compact disc (CD) drive or a digital versatile disc (DVD) drive for reading a program stored in a storage medium 91. The type of drive 17 may be selected as appropriate for the type of storage medium 91. At least one of the model generation program 81, the CAD data 120, or the multiple learning datasets 121 may be stored in the storage medium 91.

The storage medium 91 stores programs or other information in an electrical, magnetic, optical, mechanical, or chemical manner to allow a computer or another device or machine to read the recorded programs or other information. The model generation apparatus 1 may obtain at least one of the model generation program 81, the CAD data 120, or the multiple learning datasets 121 from the storage medium 91.

In FIG. 4, the storage medium 91 is a disc storage medium, such as a CD or a DVD. However, the storage medium 91 is not limited to a disc. One example of the storage medium other than a disc is a semiconductor memory such as a flash memory.

For the specific hardware configuration of the model generation apparatus 1, components may be eliminated, substituted, or added as appropriate in each embodiment. For example, the controller 11 may include multiple hardware processors. The hardware processors may include a microprocessor, a field-programmable gate array (FPGA), a digital signal processor (DSP), and other processors. The storage 12 may be the RAM and the ROM included in the controller 11. At least one of the communication interface 13, the external interface 14, the input device 15, the output device 16, or the drive 17 may be eliminated. The model generation apparatus 1 may include multiple computers. In this case, each computer may have the same or a different hardware configuration. The model generation apparatus 1 may also be an information processor dedicated to a relevant service, or may be a general-purpose server or a general-purpose personal computer (PC).

Control Apparatus

Figure 5:
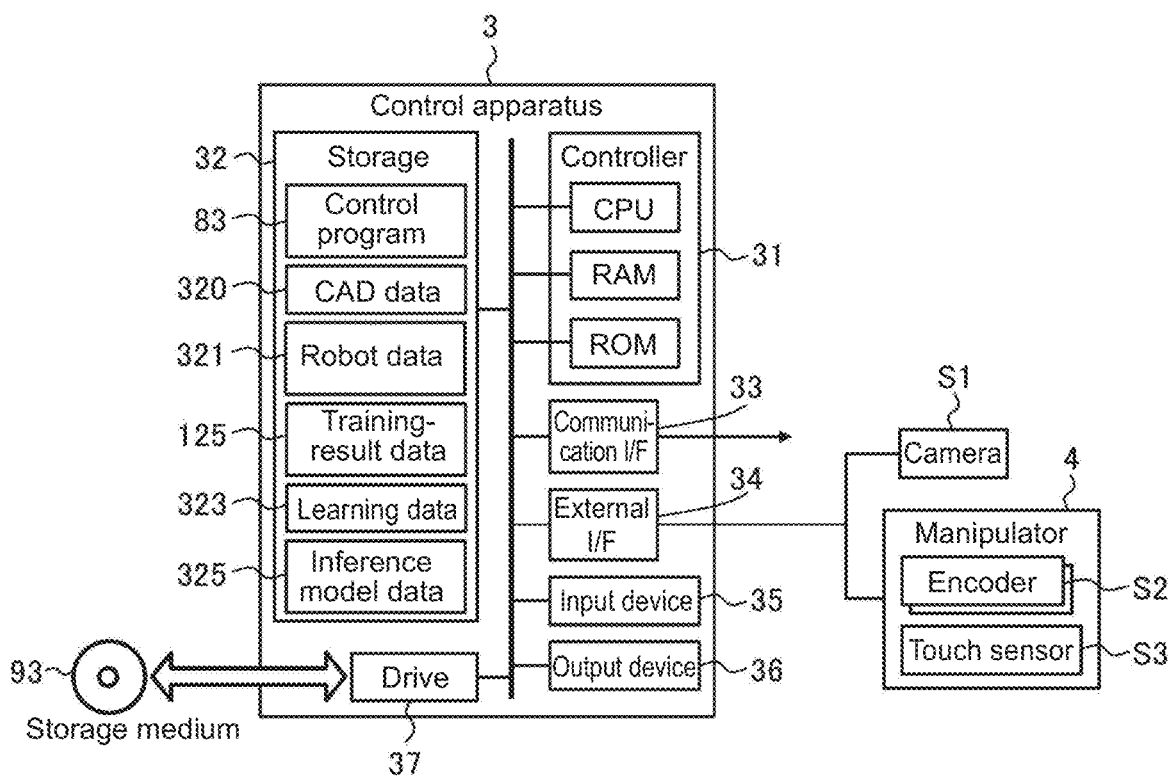
FIG. 5 is a schematic diagram illustrating a control apparatus according to one or more embodiments showing an example hardware configuration.

The hardware configuration of the control apparatus 3 according to the present embodiment will now be described with reference to FIG. 5. FIG. 5 is a schematic diagram of the control apparatus 3 according to the present embodiment showing its example hardware configuration.

As shown in FIG. 5, the control apparatus 3 according to the present embodiment is a computer including a controller 31, a storage 32, a communication interface 33, an external interface 34, an input device 35, an output device 36, and a drive 37 that are electrically connected to one another. In FIG. 5, the communication interface and the external interface are abbreviated as a communication I/F and an external I/F as in FIG. 4.

The components of the control apparatus 3 from the controller 31 to the drive 37 may have the same structure as the corresponding components, or from the controller 11 to the drive 17, in the above model generation apparatus 1. More specifically, the controller 31 includes, for example, a CPU as a hardware processor, a RAM, and a ROM, and performs various information processing operations based on programs and data. The storage 32 includes, for example, a hard disk drive and a solid-state drive. The storage 32 stores various types of information such as a control program 83, CAD data 320, robot data 321, the training-result data 125, learning data 323, and inference model data 325.

The control program 83 causes the control apparatus 3 to perform information processing described later (FIG. 10) for generating an inference model for inferring a goal task state and the information processing described later (FIGS. 15A and 15B) for the control over the operation of the robot device (manipulator 4). The control program 83 includes a series of commands for the information processing. Similarly to the CAD data 120, the CAD data 320 includes structure information indicating a geometric structure, such as a model for each object (the end-effector T, the workpiece W, or the other workpiece G). The robot data 321 includes structure information indicating the structure of the manipulator 4, such as parameters for the joints. The training-result data 125 is used for defining the trained determination model 50. The learning data 323 is used for generating an inference model. The inference model data 325 represents information about the generated inference model. This will be described in detail later.

The communication interface 33 is an interface for wired or wireless communication through a network, and may be a wired LAN module or a wireless LAN module. The control apparatus 3 uses the communication interface 33 to communicate data with other information processing apparatuses (e.g., the model generation apparatus 1) with a network.

The external interface 34 is an interface for connection with external devices and may be, for example, a USB port or a dedicated port. The type and the number of external interfaces 34 may be selected as appropriate for the type and the number of external devices to be connected. The control apparatus 3 may be connected to the camera S1 and the manipulator 4 through the external interface 34. In the present embodiment, the manipulator 4 includes an encoder S2 for measuring the angle of each joint and a touch sensor S3 for measuring the force acting on the end-effector T.

The camera S1, the encoder S2, and the touch sensor S3 may be of any type selected as appropriate in each embodiment. The camera S1 may be, for example, a typical digital camera for obtaining RGB images, a depth camera for obtaining depth images, or an infrared camera for imaging the amount of infrared radiation. The touch sensor S3 may be, for example, a tactile sensor.

The control apparatus 3 can obtain sensing data (image data, angle data, and pressure distribution data) from the sensors (the camera S1, each encoder S2, and the touch sensor S3) through the external interface 34. The control apparatus 3 may be connected to the camera S1 and the manipulator 4 in any manner. For example, when the camera S1 and the manipulator 4 include communication interfaces, the control apparatus 3 may be connected to the camera S1 and the manipulator 4 through the communication interface 33.

The input device 35 is, for example, a mouse or a keyboard. The output device 36 is, for example, a display or a speaker. An operator may operate the control apparatus 3 using the input device 35 and the output device 36.

The drive 37 is, for example, a CD drive or a DVD drive for reading a program stored in a storage medium 93. Similarly to the storage medium 91, the storage medium 93 may be a disc storage medium or may be a storage medium other than a disc. At least one of the control program 83, the CAD data 320, the robot data 321, the training-result data 125, or the learning data 323 may be stored in the storage medium 93. The control apparatus 3 may obtain at least one of the control program 83, the CAD data 320, the robot data 321, the training-result data 125, or the learning data 323 from the storage medium 93.

For the specific hardware configuration of the control apparatus 3, components may be eliminated, substituted, or added as appropriate in each embodiment. For example, the controller 31 may include multiple hardware processors. The hardware processors may include a microprocessor, an FPGA, a DSP, and other processors. The storage 32 may be the RAM and the ROM included in the controller 31. At least one of the communication interface 33, the external interface 34, the input device 35, the output device 36, or the drive 37 may be eliminated. The control apparatus 3 may include multiple computers. In this case, each computer may have the same or a different hardware configuration. The control apparatus 3 may also be an information processor dedicated to a relevant service, or may be a general-purpose server, a general-purpose PC, or a programmable logic controller (PLC).

Manipulator

Figure 6:
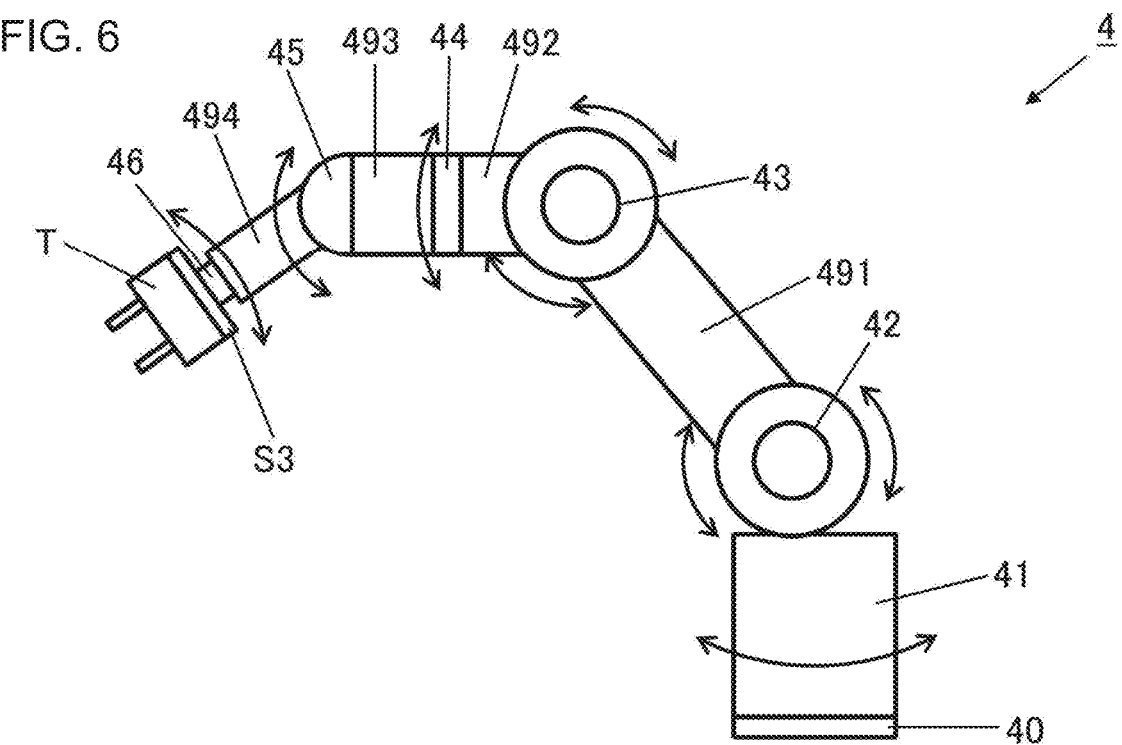
FIG. 6 is a schematic diagram illustrating an example robot device in one or more embodiments.

The hardware configuration of the manipulator 4 in the present embodiment will now be described with reference to FIG. 6. FIG. 6 is a schematic diagram of the manipulator 4 in the present embodiment showing its example hardware configuration.

The manipulator 4 in the present embodiment is a vertically articulated six-axis industrial robot with a base 40 and six joints 41 to 46. Each of the joints 41 to 46 incorporates a servomotor (not shown) and is rotatable about its axis. The first joint 41 is connected to the base 40 and has its distal end rotating about the axis of the base. The second joint 42 is connected to the first joint 41 and has its distal end rotating in the back-and-forth direction. The third joint 43 is connected to the second joint 42 with a link 491 and has its distal end rotating vertically. The fourth joint 44 is connected to the third joint 43 with a link 492 and has its distal end rotating about the axis of the link 492. The fifth joint 45 is connected to the fourth joint 44 with a link 493 and has its distal end rotating vertically. The sixth joint 46 is connected to the fifth joint 45 with a link 494 and has its distal end rotating about the axis of the link 494. The sixth joint 46 has its distal end receiving the touch sensor S3 and the end-effector T.

Each of the joints 41 to 46 further incorporates the encoder S2. Each encoder S2 measures the angle (control amount) of the corresponding one of the joints 41 to 46. The measurement data (angle data) for each encoder S2 can be used to control the angle of the corresponding one of the joints 41 to 46. The touch sensor S3 detects the force acting on the end-effector T. The measurement data (pressure distribution data) from the touch sensor S3 may be used to estimate the position and the orientation of the workpiece W held by the end-effector T, or to detect any abnormal force acting on the end-effector T.

The manipulator 4 may have any other hardware configuration. For the specific hardware configuration of the manipulator 4, components may be eliminated, substituted, or added as appropriate in each embodiment. For example, the manipulator 4 may include a sensor other than the encoder S2 and the touch sensor S3 to observe the control amount or other attributes. For example, the manipulator 4 may further include a torque sensor. In this case, the manipulator 4 may measure the force acting on the end-effector T with the torque sensor and may be controlled to avoid the end-effector T receiving an excessive force based on the measurement value of the torque sensor. The manipulator 4 may have any number of axes other than six axes. The manipulator 4 may be a known industrial robot.

Software Configuration

Model Generation Apparatus

Figure 7:
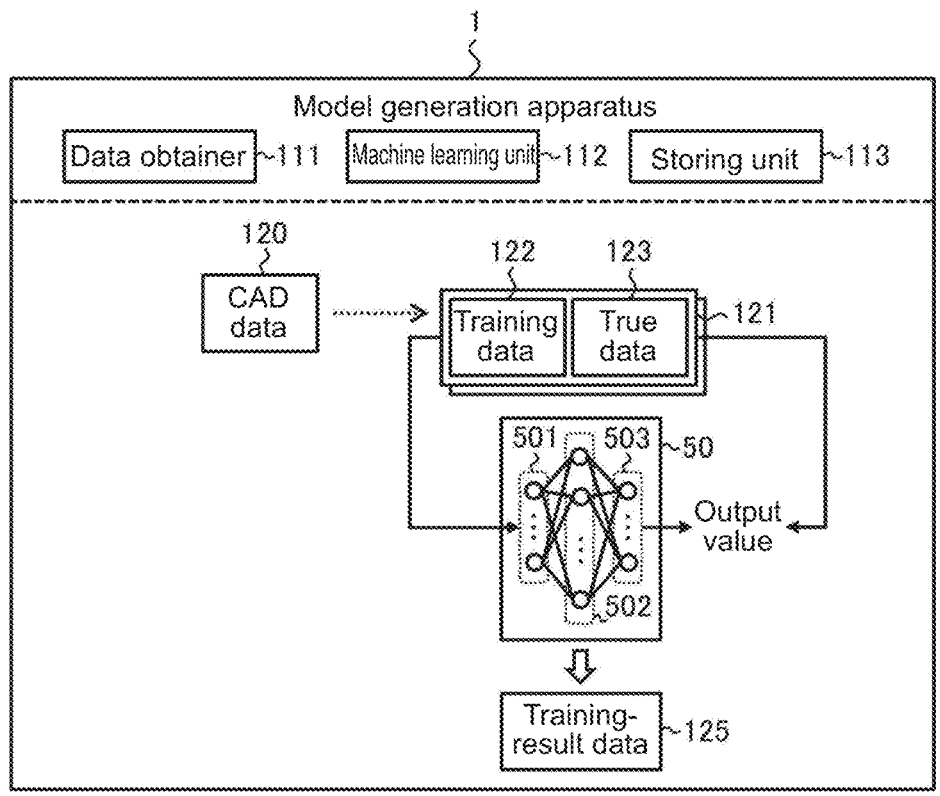
FIG. 7 is a schematic diagram illustrating a model generation apparatus according to one or more embodiments showing an example software configuration.

The software configuration of the model generation apparatus 1 according to the present embodiment will now be described with reference to FIG. 7. FIG. 7 is a schematic diagram of the model generation apparatus 1 according to the present embodiment showing its example software configuration.

The controller 11 in the model generation apparatus 1 loads the model generation program 81 stored in the storage 12 into the RAM. The CPU in the controller 11 then interprets and executes a command included in the model generation program 81 loaded in the RAM to control each unit. The model generation apparatus 1 according to the present embodiment thus operates as a computer including a data obtainer 111, a machine learning unit 112, and a storing unit 113 as software modules as shown in FIG. 7. In other words, in the present embodiment, each software module in the model generation apparatus 1 is implemented by the controller 11 (CPU).

The data obtainer 111 obtains multiple learning datasets 121. Each learning dataset 121 includes a combination of the training data 122 and the true data 123. The training data 122 indicates the positional relationship between two objects. The true data 123 indicates whether two objects come in contact with each other in the positional relationship. The training data 122 is used as input data for machine learning. The true data 123 is used as a supervisory signal (label) for machine learning. The training data 122 and the true data 123 may be in any format selected as appropriate in each embodiment. For example, the training data 122 may represent the relative coordinates between two objects, or may represent values resulting from conversion of the relative coordinates into a feature quantity. The CAD data 120 can be used to determine whether target two objects come in contact with each other in a target positional relationship. The CAD data 120 can thus be used to generate each learning dataset 121.

The machine learning unit 112 trains the determination model 50 through machine learning using the obtained multiple learning datasets 121. Such machine learning includes training the determination model 50 to output, in response to an input of the training data 122 included in each learning dataset 121, an output value that fits the true data 123 included in the corresponding learning dataset 121. The trained determination model 50 trained through machine learning is built to be capable of determining whether two objects come in contact with each other. The storing unit 113 generates information about the built trained determination model 50 as the training-result data 125 and stores the generated training-result data 125 into a predetermined storage area.

Configuration of Determination Model

The determination model 50 in one example will now be described. The determination model 50 in the present embodiment includes a multilayered neural network for deep learning. In the example shown in FIG. 7, the determination model 50 includes a three-layered fully coupled neural network. The determination model 50 includes an input layer 501, an intermediate (hidden) layer 502, and an output layer 503. However, the configuration of the determination model 50 is not limited to the above example and may be selected as appropriate in each embodiment. For example, the determination model 50 may include two or more intermediate layers. The intermediate layer 502 may be eliminated.

Each of the layers 501 to 503 may include any number of neurons (nodes) that may be selected as appropriate in each embodiment. For example, the number of neurons in the input layer 501 may be determined in accordance with the number of dimensions of the relative coordinates expressing the positional relationship between two objects. The number of neurons in the output layer 503 may be determined in accordance with the manner of expressing whether two objects come in contact with each other. To express whether two objects come in contact with each other using one numerical value (e.g., a numerical value of 0 to 1), for example, the output layer 503 may include one neuron. To express whether two objects come in contact with each other using two numerical values, or more specifically, a first numerical value indicating the probability of contact and a second numerical value indicating the probability of no contact, for example, the output layer 503 may include two neurons.

Neurons in neighboring layers are coupled to each other as appropriate. In the present embodiment, each neuron is coupled to all neurons in its adjacent layers. The neurons may be coupled in a manner other than in this example and may be determined as appropriate in each embodiment. Each coupling has a preset weight (coupling weight). Each neuron has a preset threshold. An output of each neuron is determined basically depending on whether the sum of the product of each input and the corresponding weight exceeds the threshold. The threshold may be expressed using an activation function. The sum of the product of each input and the corresponding weight may be input into the activation function for computation to determine the output of each neuron. The activation function may be of any type selected as appropriate in each embodiment. The coupling weight between neurons included in each of the layers 501 to 503 and the threshold of each neuron are examples of the computational parameters of the determination model 50.

The machine learning unit 112 in the present embodiment trains, through machine learning, the determination model 50 including the neural network using multiple learning datasets 121. More specifically, the machine learning unit 112 adjusts, for each learning dataset 121, the value of each computational parameter of the determination model 50 to output an output value that fits the true data 123 from the output layer 503 in response to an input of the training data 122 into the input layer 501. The trained determination model 50 is thus generated to be capable of determining whether two objects come in contact with each other.

The storing unit 113 generates information indicating the configuration of the built trained determination model 50 and indicating the computational parameters as the training-result data 125. The storing unit 113 stores the generated training-result data 125 into a predetermined storage area. The details of the training-result data 125 are not limited to the above example and may be modified to regenerate the trained determination model 50. For the apparatuses using the determination models 50 having the same configuration, for example, the training-result data 125 may not include information indicating the configuration of the determination model 50.

Control Apparatus

Figure 8:
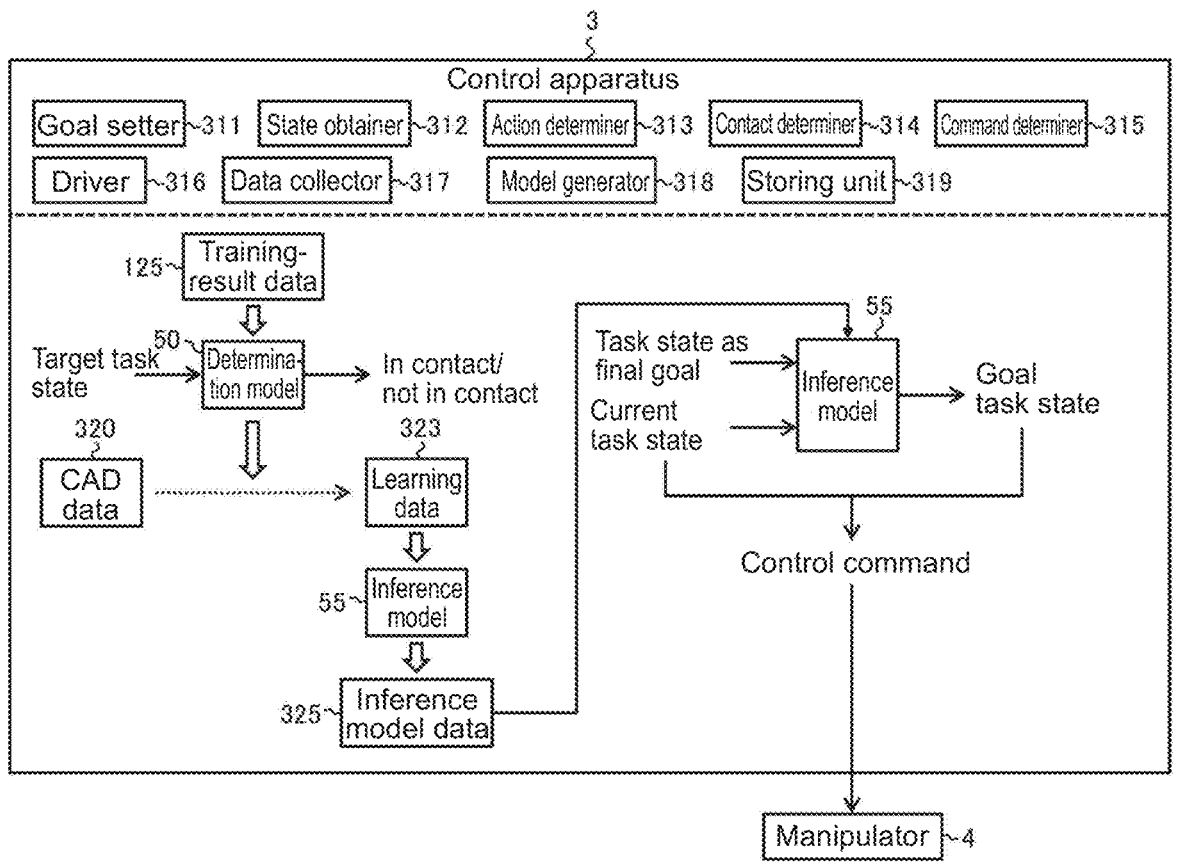
FIG. 8 is a schematic diagram illustrating a control apparatus according to one or more embodiments showing an example software configuration.

The software configuration of the control apparatus 3 according to the present embodiment will now be described with reference to FIG. 8. FIG. 8 is a schematic diagram of the control apparatus 3 according to the present embodiment showing its example software configuration.

The controller 31 in the control apparatus 3 loads the control program 83 stored in the storage 32 into the RAM. The CPU in the controller 31 then interprets and executes a command included in the control program 83 loaded in the RAM to control each unit. The control apparatus 3 according to the present embodiment thus operates as a computer including a goal setter 311, a state obtainer 312, an action determiner 313, a contact determiner 314, a command determiner 315, a driver 316, a data collector 317, a model generator 318, and a storing unit 319 as software modules as shown in FIG. 8. In other words, in the present embodiment, each software module in the control apparatus 3 is implemented by the controller 31 (CPU) as in the model generation apparatus 1.

The goal setter 311 sets the task state as the final goal in accordance with the task to be performed. The task state is defined by the positional relationship between the first object and the second object used in the task to be performed. In the present embodiment, the positional relationship is expressed using their relative coordinates. The final goal refers to a goal point (goal) to be reached upon completion of the task. The state obtainer 312 obtains information indicating the current task state of the robot device (manipulator 4). Being current refers to being at a time point at which the operation of the robot device is controlled, or more specifically, being at a time point immediately before a control command for the robot device is determined. The first object and the second object may be selected as appropriate for the task to be performed. For the first task, for example, the first object is the end-effector T, and the second object is the workpiece W. For the second task, the first object is the workpiece W held by the end-effector T, and the second object is the other workpiece G.

The action determiner 313 determines the goal task state to be achieved subsequently to the current task state indicated by the obtained information to be closer to the task state as the final goal. The goal includes the final goal and may be set as appropriate to perform the task. The number of goals to be set including the final goal may be one (the final goal alone is set in this case) or two or more. The goals other than the final goal are waypoints between the start point and the goal point of the task. The final goal may thus be simply referred to as a goal, and a goal other than the final goal may be simply referred to as a subgoal. The subgoal may also be referred to as a waypoint. The subsequent goal refers to the goal task state to be achieved subsequently to the current task state (a temporary task state for a goal other than the final goal). For example, the subsequent goal may be the goal closest to the current task state toward the final goal.

The contact determiner 314 includes the trained determination model 50 stored as the training-result data 125. The contact determiner 314 refers to the training-result data 125 to define the trained determination model 50. The trained determination model 50 trained through machine learning is capable of determining whether the first object and the second object come in contact with each other. The contact determiner 314 provides, to the trained determination model 50, information indicating a target task state of the first object and the second object to determine whether the first object and the second object come in contact with each other in the target task state.

The command determiner 315 determines a control command for the robot device (manipulator 4) to change the task state of the robot device (manipulator 4) from the current task state to the goal task state. The driver 316 provides the determined control command to the robot device to drive the robot device. In the present embodiment, the operation of the manipulator 4 is controlled through the above series of processing steps.

The determination result obtained by the trained determination model 50 as to whether contact occurs may be directly used for controlling the operation of the robot device. In some embodiments, the determination result obtained by the trained determination model 50 as to whether contact occurs may be used for generating an inference model 55 for inferring the goal task state to be achieved subsequently based on the current task state and the task state as the final goal. The determination result obtained by the trained determination model 50 may thus be indirectly used for controlling the operation of the robot device. In the present embodiment, the determination result obtained by the trained determination model 50 is used in the latter manner.

More specifically, the data collector 317 and the model generator 318 use the determination result obtained by the trained determination model 50 to generate the inference model 55 that determines the goal task state to be achieved subsequently to avoid contact of the first object with the second object. The data collector 317 uses the determination result obtained by the trained determination model 50 to collect the learning data 323 to be used for generating the inference model 55. The learning data 323 may be collected by further using the CAD data 320. The model generator 318 uses the collected learning data 323 to generate the inference model 55. The learning data 323 and the inference model 55 will be described in detail later.

The storing unit 319 generates information about the generated inference model 55 as the inference model data 325 and stores the generated inference model data 325 into a predetermined storage area. In the present embodiment, the action determiner 313 includes the generated inference model 55 stored as the inference model data 325. The action determiner 313 determines the goal task state to be achieved subsequently to the current task state using the generated inference model 55.

Others

Each software module in the model generation apparatus 1 and the control apparatus 3 will be described in detail in the operation examples below. In the present embodiment, each software module in the model generation apparatus 1 and the control apparatus 3 is implemented by a general-purpose CPU. However, some or all of the software modules may be implemented by one or more dedicated processors. For the software configurations of the model generation apparatus 1 and the control apparatus 3, software modules may be eliminated, substituted, or added as appropriate in each embodiment.

3. Operation Example

Model Generation Apparatus

Figure 9:
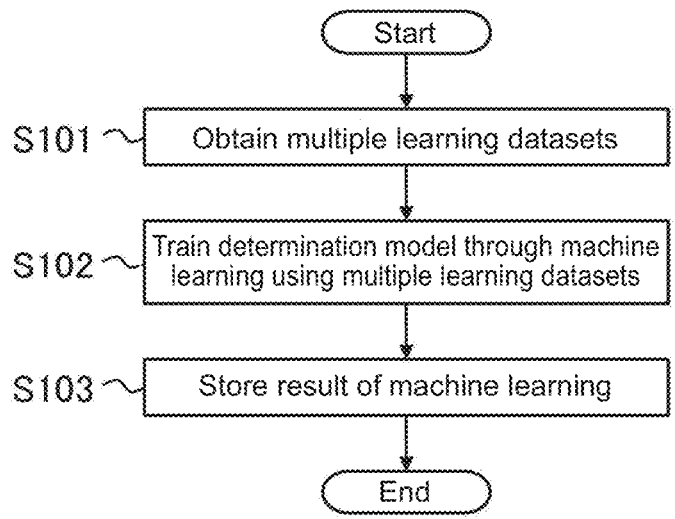
FIG. 9 is a flowchart illustrating an example procedure performed by a model generation apparatus according to one or more embodiments.

An operation example of the model generation apparatus 1 will now be described with reference to FIG. 9. FIG. 9 is a flowchart of an example procedure performed by the model generation apparatus 1 according to the present embodiment for training the determination model 50 through machine learning. The procedure described below is an example of a model generation method in an aspect of the present invention. However, the procedure below is a mere example, and each of its steps may be modified in any possible manner. In the procedure below, steps may be eliminated, substituted, or added as appropriate in each embodiment.

Step S101

In step S101, the controller 11 operates as the data obtainer 111 and obtains multiple learning datasets 121 to be used for training the determination model 50 through machine learning. Each learning dataset 121 includes a combination of the training data 122 and the true data 123. The training data 122 indicates the positional relationship between two objects. The true data 123 indicates whether two objects come in contact with each other in the positional relationship.

Each learning dataset 121 may be generated with any method selected as appropriate in each embodiment. For example, two objects are placed in various positional relationships in a virtual space using the CAD data 120. In the present embodiment, the positional relationship between two objects is expressed using their relative coordinates. In the present embodiment, at least one of two objects is to be moved by the operation of the robot device (manipulator 4). For the first task, the end-effector T and the workpiece W are examples of the objects. For the second task, the workpiece W held by the end-effector T and the other workpiece G are examples of the objects. Of these two objects, one is the endpoint of the manipulator 4, and the other is the destination object. The positions of the objects may be specified by an operator or may be determined randomly. In some embodiments, one object may be stationary, and the other object may be moved variously under a rule to vary the positional relationship between the two objects. The rule for positioning the other object may be set as appropriate. This allows the relative coordinates in each positional relationship to be obtained as the training data 122 included in each learning dataset 121. The CAD data 120 includes a model for each object. The CAD data 120 can thus be used to determine whether target two objects come in contact with each other in a target positional relationship. The CAD data 120 is used to determine whether two objects come in contact with each other in each positional relationship. The determination result as the true data 123 is then associated with the corresponding training data 122. Each learning dataset 121 is generated in this manner, or may be generated with another method. Each learning dataset 121 may be generated using an actual object in a real space.

Each learning dataset 121 may be generated automatically through a computer operation or at least partially manually through an operation performed by an operator. Each learning dataset 121 may be generated by the model generation apparatus 1 or by a computer other than the model generation apparatus 1. When the model generation apparatus 1 generates each learning dataset 121, the controller 11 may perform the series of processing steps described above automatically or in response to a manual operation performed on the input device 15 by an operator to obtain multiple learning datasets 121. When another computer generates each learning dataset 121, the controller 11 may obtain multiple learning datasets 121 generated by the other computer through, for example, a network or the storage medium 91. In this case, the model generation apparatus 1 may not include the CAD data 120. Some of the learning datasets 121 may be generated by the model generation apparatus 1, and the remaining other learning datasets 121 may be generated by one or more other computers.

The number of learning datasets 121 to be obtained may be selected as appropriate in each embodiment. Upon obtaining multiple learning datasets 121, the controller 11 advances the processing to subsequent step S102.

Step S102

In step S102, the controller 11 operates as the machine learning unit 112 and trains the determination model 50 through machine learning using the obtained multiple learning datasets 121. In the present embodiment, the controller 11 trains the determination model 50 through machine learning to output, in response to an input of the training data 122 included in each learning dataset 121 into the input layer 501, an output value that fits the true data 123 included in the corresponding learning dataset 121 from the output layer 503. The controller 11 thus builds the trained determination model 50 capable of determining whether two objects come in contact with each other in a target positional relationship.

The procedure for machine learning may be determined as appropriate in each embodiment. In one example, the controller 11 first prepares the determination model 50 to be processed. The configuration of the determination model 50 (e.g., the number of layers, the number of neurons in each layer, and the couplings between neurons in adjacent layers) to be prepared, the default values of the coupling weights between neurons, and the default threshold of each neuron may be preset using a template or may be input by an operator. For retraining, the controller 11 may prepare the determination model 50 based on training-result data previously obtained through past machine learning.

The controller 11 then uses the training data 122 included in each learning dataset 121 as input data and uses the true data 123 as a supervisory signal to perform a training process for training the determination model 50 (neural network). The training process may include batch gradient descent, stochastic gradient descent, and mini-batch gradient descent.

In the first step, for example, the controller 11 inputs, for each learning dataset 121, the training data 122 into the determination model 50 and performs a computational operation of the determination model 50. The controller 11 inputs the training data 122 into the input layer 501 and then determines neuronal firing in each of the layers 501 to 503 sequentially from the layer on the input end (or in other words, performs forward propagation computation). Through the computational operation, the controller 11 obtains, from the output layer 503 in the determination model 50, an output value corresponding to the result of determination as to whether two objects come in contact with each other in the positional relationship represented by the training data 122.

In the second step, the controller 11 calculates an error (loss) between the output value obtained from the output layer 503 and the true data 123 based on a loss function. A loss function is used to evaluate a difference (or in other words, the degree of mismatch) between an output from the learning model and a true result. An error calculated using the loss function is greater as a difference between the output value obtained from the output layer 503 and the true data 123 is greater. The loss function used for calculating such an error may be of any type selected as appropriate in each embodiment.

In the third step, the controller 11 calculates an error in the values of the computational parameters (e.g., the coupling weights between neurons and the threshold of each neuron) for the determination model 50 using the gradient of the calculated error in the output value by the error back propagation method. In the fourth step, the controller 11 updates the values of the computational parameters of the determination model 50 based on the calculated error. The computational parameters may be updated by the degree adjusted based on the learning rate. The learning rate may be specified by an operator or may be a preset value in the program.

Through the first to fourth steps described above performed repeatedly, the controller 11 adjusts, for each learning dataset 121, the value of each computational parameter of the determination model 50 to reduce the sum of the errors between the output values obtained from the output layer 503 and the corresponding true data 123. For example, the controller 11 may repeat the above first to fourth steps until the sum of the errors is less than or equal to a threshold. The threshold may be determined as appropriate in each embodiment. The controller 11 can thus build the trained determination model 50 trained through machine learning to output, in response to an input of the training data 122 included in each learning dataset 121 into the input layer 501, an output value that fits the true data 123 included in the corresponding learning dataset 121 from the output layer 503. Fitting herein may include an allowable difference based on, for example, a threshold between the output value from the output layer 503 and the supervisory signal (true data 123). Upon training of the determination model 50 through machine learning, the controller 11 advances the processing to subsequent step S103.

Step S103

In step S103, the controller 11 operates as the storing unit 113 and stores information about the trained determination model 50 built through machine learning into a predetermined storage area as the training-result data 125. In the present embodiment, the controller 11 generates information indicating the configuration and the computational parameters of the trained determination model 50 built in step S102 as the training-result data 125. The controller 11 stores the generated training-result data 125 into a predetermined storage area.

The predetermined storage area may be, for example, the RAM in the controller 11, the storage 12, an external storage, a storage medium, or a combination of these. The storage medium is, for example, a CD or a DVD. The controller 11 may store the training-result data 125 into the storage medium through the drive 17. The external storage may be a data server, such as a network attached storage (NAS). In this case, the controller 11 may use the communication interface 13 to store the training-result data 125 into the data server through a network. The external storage may be connected to the model generation apparatus 1.

Upon storage of the training-result data 125, the controller 11 ends the series of processing steps for generating the trained determination model 50.

The generated training-result data 125 may be provided to the control apparatus 3 at any selected time. For example, the controller 11 may transfer the training-result data 125 to the control apparatus 3 in step S103 or in a step separate from step S103. The control apparatus 3 may receive the transferred data to obtain the training-result data 125. In another example, the control apparatus 3 may use the communication interface 33 to access the model generation apparatus 1 or a data server through a network and obtain the training-result data 125. In still another example, the control apparatus 3 may obtain the training-result data 125 through the storage medium 93. For example, the control apparatus 3 may prestore the training-result data 125.

Further, the controller 11 may update or newly generate the training-result data 125 by regularly or irregularly repeating the processing in steps S101 to S103 above. During the repeated processes, at least some of multiple learning datasets 121 may undergo changes, modifications, additions, and deletions as appropriate. The controller 11 may provide the updated or newly generated training-result data 125 to the control apparatus 3 through every training process to update the training-result data 125 stored in the control apparatus 3.

Control Apparatus (A) Generation of Inference Model

Figure 10:
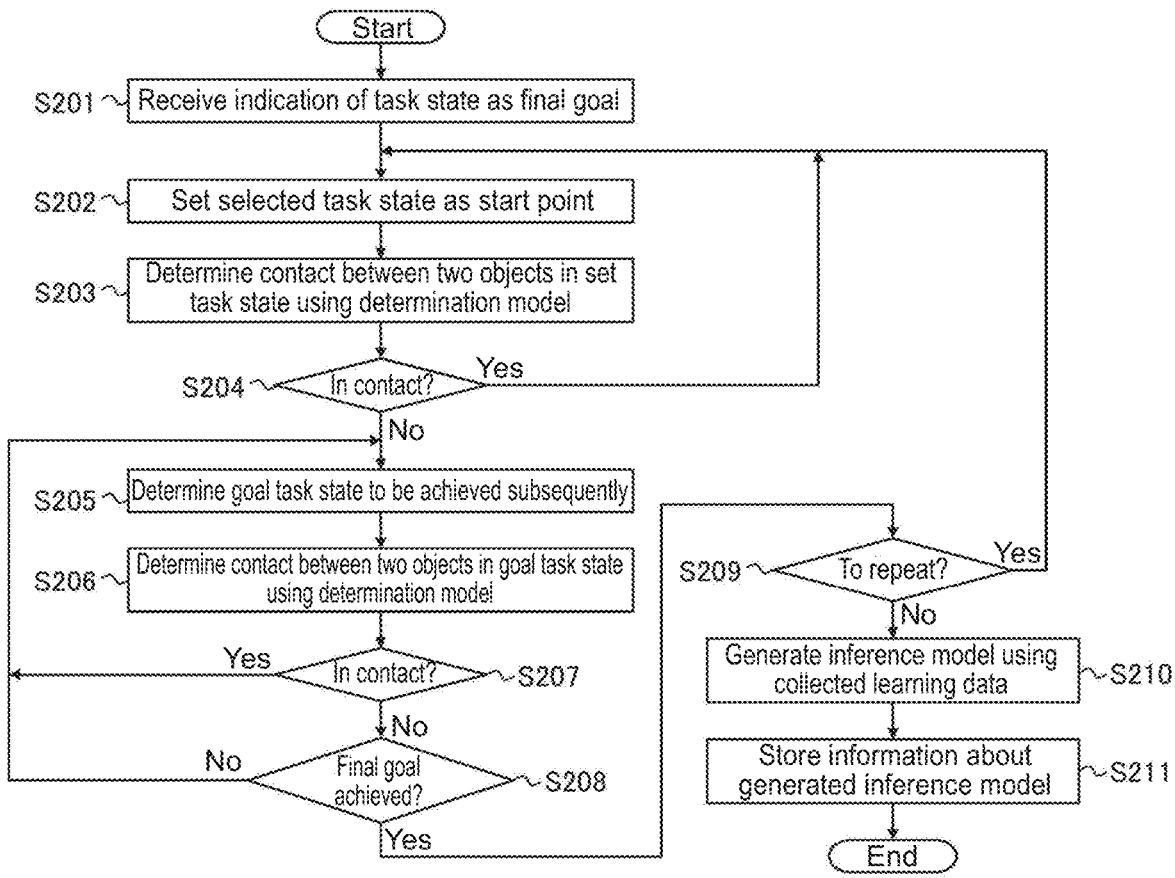
FIG. 10 is a flowchart illustrating an example procedure performed by a control apparatus according to one or more embodiments for generating an inference model.

An operation example of the control apparatus 3 for generating the inference model 55 will now be described with reference to FIG. 10. FIG. 10 is a flowchart of an example procedure performed by the control apparatus 3 according to the present embodiment for generating the inference model 55. The procedure below is a mere example, and each of its steps may be modified in any possible manner. In the procedure below, steps may be eliminated, substituted, or added as appropriate in each embodiment.

Step S201

In step S201, the controller 31 receives an indication of a task state as a final goal specified for the task to be performed by the manipulator 4. The task state is expressed using the positional relationship between the first object and the second object. In the present embodiment, the positional relationship is expressed using their relative coordinates.

The relative coordinates for the final task state may be specified with any method selected as appropriate in each embodiment. For example, the relative coordinates for the final task state may be directly specified through an operator input using the input device 35. In another example, the relative coordinates for the final task state may be specified in accordance with the task to be performed selected through an operator input. In still another example, the relative coordinates for the final goal may be specified by the models for the objects being placed in a positional relationship at the final goal in a virtual space using the CAD data 320. The models for the objects may be placed automatically with a simulator or manually through an operator input. For the task state specified as the final goal, the controller 31 advances the processing to subsequent step S202.

Steps S202 to S204

In step S202, the controller 31 sets any selected task state as a start point. The task state set as the start point corresponds to the state at the start of the task. The task state as the start point may be set randomly or specified through an operator input. The start point may be specified by an operator similarly to the final goal being specified as described above. The task state as the start point may be determined using any selected algorithm. In one example, actual objects placed in a real space are imaged with a camera to obtain image data including the objects. The obtained image data may undergo image processing (e.g., matching using the CAD data 320) to determine the task state as the start point. The task state as the start point may be determined in another manner as appropriate using the CAD data 320.

In step S203, the controller 31 operates as the contact determiner 314 and determines whether two objects come in contact with each other in the task state set as the start point using the trained determination model 50. More specifically, the controller 31 refers to the training-result data 125 to define the trained determination model 50. The controller 31 then inputs the relative coordinates for the task state set in step S202 into the input layer 501 in the trained determination model 50. The controller 31 then determines neuronal firing in each of the layers 501 to 503 sequentially from the layer on the input end as the computational operation of the trained determination model 50. The controller 31 thus obtains, from the output layer 503 in the trained determination model 50, an output value corresponding to the result of determination as to whether two objects come in contact with each other in the task state set as the start point.

In step S204, the controller 31 determines a branch destination of the processing based on the determination result in step S203. When determining that two objects come in contact with each other in the task state set as the start point in step S203, the controller 31 returns the processing to step S202 and resets the task state at the start point. When determining that two objects do not come in contact with each other in the task state set as the start point, the controller 31 identifies the set task state at the start point as the current task state of the manipulator 4 and advances the processing to subsequent step S205.

Figure 11A:
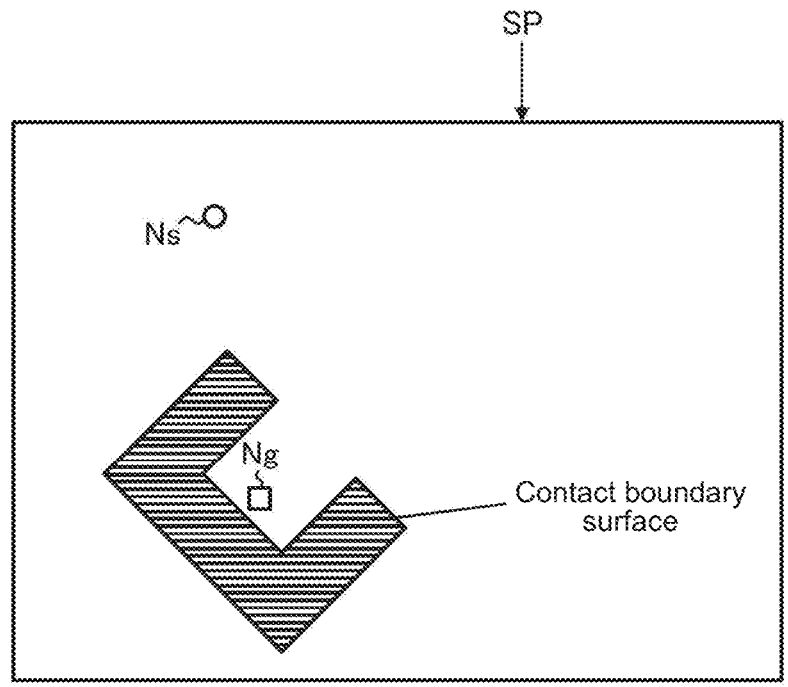
FIG. 11A is a schematic diagram illustrating an example task space in one or more embodiments.

FIG. 11A is a schematic diagram of a task space SP in an example situation in which the task state at the start point and the task state as the final goal are set through the processing in steps S201 to S204 above. The task space SP represents a set of relative coordinates indicating the task state. Information representing the task space SP may or may not be stored in the control apparatus 3. The nodes (points)

in the task space SP correspond to the relative coordinates between two objects. In the example of FIG. 11A, a node Ns corresponds to the relative coordinates for the task state at the start point, and a node Ng corresponds to the relative coordinates for the task state as the final goal. In the present embodiment, the boundary surface (contact boundary surface) indicating whether two objects come in contact with each other in the task space SP is derived based on the determination result obtained by the trained determination model 50.

Steps 205 to S207

In step S205, the controller 31 determines the goal task state to be achieved subsequently to the current task state to be closer to the task state as the final goal.

The goal task state may be determined with any method selected as appropriate in each embodiment. In one example, the relative coordinates for the goal task state may be determined through an operator input. The relative coordinates for the goal task state may be determined using any selected algorithm or using the CAD data 320 as appropriate as in setting the task state as the start point. The controller 31 may determine, for example, the relative coordinates for the goal task state by randomly changing the relative coordinates for the task state at the start point. The controller 31 may select, for example, a node away from the node Ns by a predetermined distance to be closer to the node Ng in the task space SP. The controller 31 may obtain the task state corresponding to the selected node as a goal task state. When, for example, the inference model 55 is generated through reinforcement learning (described later), the goal task state may be determined using the inference model 55 during reinforcement learning.

For example, the goal task state may be determined with a known method such as path planning. In one example, the controller 31 may set a candidate node for the goal task state in the task space SP. The node may be set automatically by, for example, random sampling or manually through an operator input. Some nodes may be set automatically, and the remaining other nodes may be set manually. In response to candidate nodes being set for the goal task state, the controller 31 may select a combination of possible destination nodes as appropriate. A combination of possible destination nodes may be selected using, for example, the nearest neighbor algorithm. A combination of possible destination nodes may be expressed using edges connecting the nodes to one another in the task space SP. The controller 31 then searches for a path from the node Ns at the start point to the node Ng at the final goal. The path may be searched for using, for example, Dijkstra's algorithm. The controller 31 may obtain, as a goal task state, the task state corresponding to a node included in the path obtained through the search.

In step S206, the controller 31 operates as the contact determiner 314 and determines whether two objects come in contact with each other in the determined goal task state using the trained determination model 50. The controller 31 may perform the processing in step S206 in the same manner as in step S203 above except that the controller 31 determines the goal task state instead of the task state at the start point. More specifically, the controller 31 inputs the relative coordinates for the goal task state into the trained determination model 50 and performs a computational operation of the trained determination model 50. The controller 31 thus obtains, from the trained determination model 50, an output value corresponding to the result of determination as to whether two objects come in contact with each other in the goal task state.

In step S207, the controller 31 determines a branch destination of the processing based on the determination result in step S206. When determining that two objects come in contact with each other in the goal task state in step S206, the controller 31 returns the processing to step S205 and resets the goal task state. When determining that two objects do not come in contact with each other in the goal task state, the controller 31 advances the processing to subsequent step S208.

The branch destination in step S207 is not limited to the above example. For example, when determining that two objects come in contact with each other in the goal task state, the controller 31 may return the processing to step S202 and restart the processing from setting the start point. For example, the goal task state may be determined multiple times. When determining that two objects come in contact with each other in the determined latest goal task state, the controller 31 may return the processing to step S205 and restart, from the start point, determining the goal task state to be achieved subsequently. The sequence of goal task states determined until the contact occurs may be collected as failure states that cannot achieve the task state as the final goal.

Figure 11B:
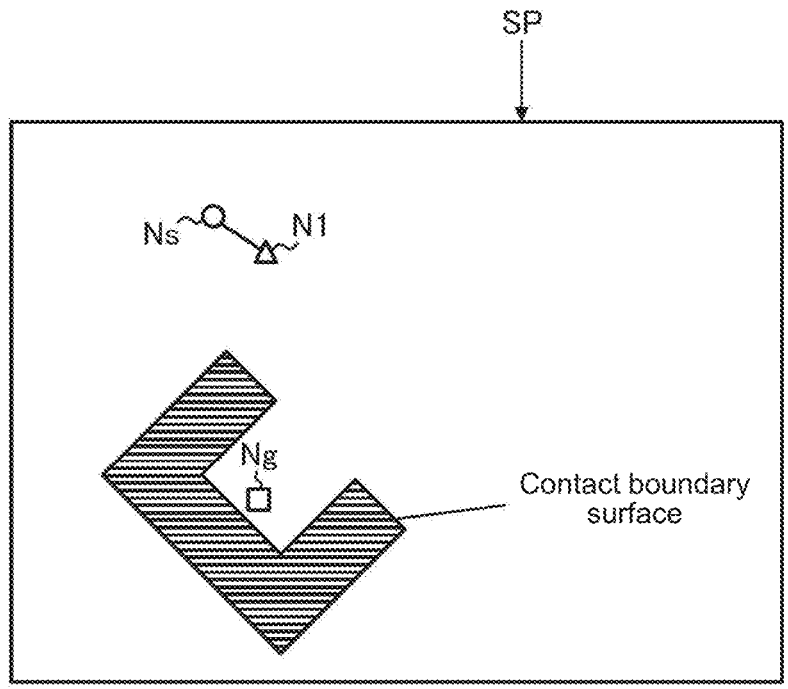
FIG. 11B is a schematic diagram illustrating an example task space in one or more embodiments.

FIG. 11B is a schematic diagram of a task space SP in an example situation in which the goal task state is determined through the processing in steps S205 to S207 above. In the example of FIG. 11B, a node N1 corresponds to the relative coordinates for the task state determined to be the goal task state to be achieved subsequently to the task state at the start point (node Ns). In the example of FIG. 11B, the goal task state corresponding to a single change is determined in step S205. However, any number of goal task states other than one may be determined in step S205. In step S205, the controller 31 may determine goal task states corresponding to multiple changes (the sequence of goal task states) toward the task state as the final goal.

Step S208

In step S208, the controller 31 causes a change from the current task state of the manipulator 4 to the goal task state determined in step S205. The controller 31 then determines whether the task state of the manipulator 4 has achieved the task state as the final goal, or in other words, whether the task state after the change is the task state as the final goal. The task state may be changed in a virtual space through a simulation. When determining that the task state as the final goal has been achieved, the controller 31 advances the processing to subsequent step S209. When determining that the task state as the final goal has not been achieved, the controller 31 returns the processing to step S205 and determines the task state of another goal.

Figure 11C:
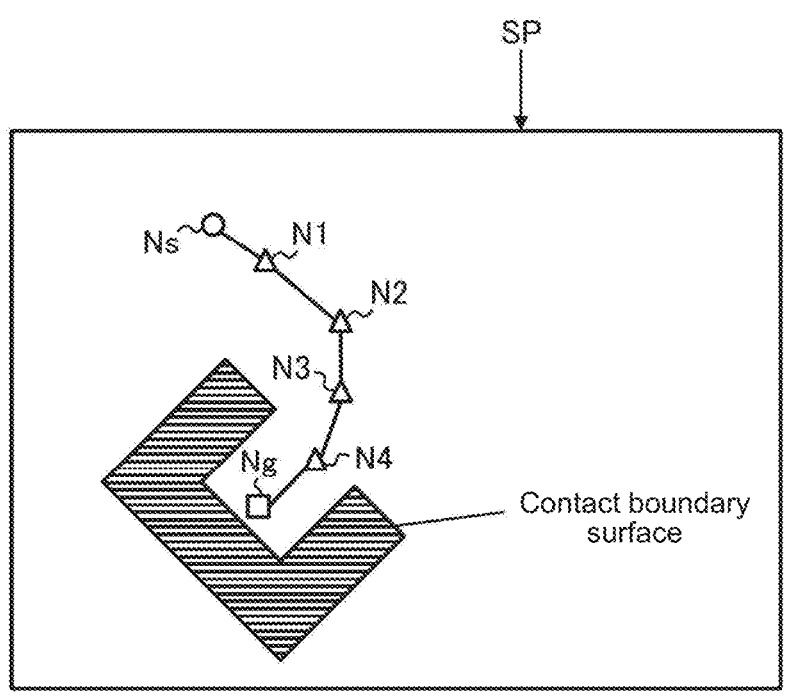
FIG. 11C is a schematic diagram illustrating an example task space in one or more embodiments.

FIG. 11C is a schematic diagram of a task space SP in an example situation in which the sequence of task states changing from the task state at the start point to the task state as the final goal is determined through the processing up to step S208 above. The nodes N1 to N4 correspond to the relative coordinates for the task states determined as the goal task states between the node Ns at the start point and the node Ng at the final goal. The node N(k+1) represents the goal task state to be achieved subsequently to the node N(k), where k is 1 to 3. As illustrated in FIG. 11C, the controller 31 can obtain the sequence of goal task states changing from the start point to the final goal through the processing up to step S208.

Step S209

In step S209, the controller 31 determines whether to repeat the processing in steps S202 to S208. The determination as to whether the processing is to be repeated may be performed as appropriate in each embodiment.

For example, the processing may be repeated a predefined number of times. The predefined number of times may be a preset value or may be specified by an operator. In this case, the controller 31 determines whether the count for the series of processes from step S202 to step S208 has reached the predefined number of times. When determining that the count has not reached the predefined number of times, the controller 31 returns the processing to step S202 and repeats the processing in steps S202 to S208. When determining that the count has reached the predefined number of times, the controller 31 advances the processing to subsequent step S210.

For example, the controller 31 may prompt an operator to indicate whether to repeat the processing. In this case, the controller 31 determines whether to repeat the processing in steps S202 to S208 in response to the operator's indication. In response to the operator indicating to repeat the processing, the controller 31 returns the processing to step S202 and repeats the processing in steps S202 to S208. In response to the operator indicating not to repeat the processing, the controller 31 advances the processing to subsequent step S210.

The processing up to step S209 yields one or more sequences of goal task states changing from the start point to the final goal illustrated in FIG. 11C. The controller 31 operates as the data collector 317 and collects one or more sequences of goal task states changing from the start point to the final goal. The controller 31 then uses the collected sequence of goal task states to generate the learning data 323. The controller 31 may directly use the collected sequence of goal task states as the learning data 323, or may perform information processing on the collected sequence of goal task states to generate the learning data 323. The learning data 323 may have any structure determined as appropriate for the method for generating the inference model 55. The structure of the learning data 323 will be described later.

Steps S210 and S211

In step S210, the controller 31 operates as the model generator 318. More specifically, the controller 31 uses the learning data 323 obtained using the determination result from the trained determination model 50 to generate the inference model 55 for inferring the goal task state to be achieved subsequently based on the current task state and the task state as the final goal while avoiding contact of the first object with the second object. The method for generating the inference model 55 will be described later.

In step S211, the controller 31 operates as the storing unit 319. More specifically, the controller 31 generates information about the generated inference model 55 as the inference model data 325 and stores the generated inference model data 325 into a predetermined storage area. The predetermined storage area may be, for example, the RAM in the controller 31, the storage 32, an external storage, a storage medium, or a combination of these. The storage medium is, for example, a CD or a DVD. The controller 31 may store the inference model data 325 into the storage medium through the drive 37. The external storage may be, for example, a data server such as a NAS. In this case, the controller 31 may use the communication interface 33 to store the inference model data 325 into the data server through a network. The external storage may be connected to the control apparatus 3.

Upon storage of the inference model data 325, the controller 31 ends the series of processing steps for generating the inference model 55.

Generating Inference Model

An example method for generating the inference model 55 in step S210 above will now be described. In the present embodiment, the controller 31 can generate the inference model 55 with at least one of the two methods described below.

(1) First Method

With the first method, the controller 31 generates the inference model 55 through machine learning. In this case, the inference model 55 includes a machine learning model. The machine learning model may be of any type selected as appropriate in each embodiment. The inference model 55 may include a functional expression or a data table. The inference model 55 being a functional expression may include a neural network, a support vector machine, a regression model, or a decision tree. The method of machine learning may be other than described in the above example and may be selected as appropriate for the configuration of the inference model 55. Examples of machine learning for the inference model 55 include supervised learning and reinforcement learning. Two examples of the machine learning model for the inference model 55 and the machine learning method will now be described.

(1-1) First Example

Figure 12:
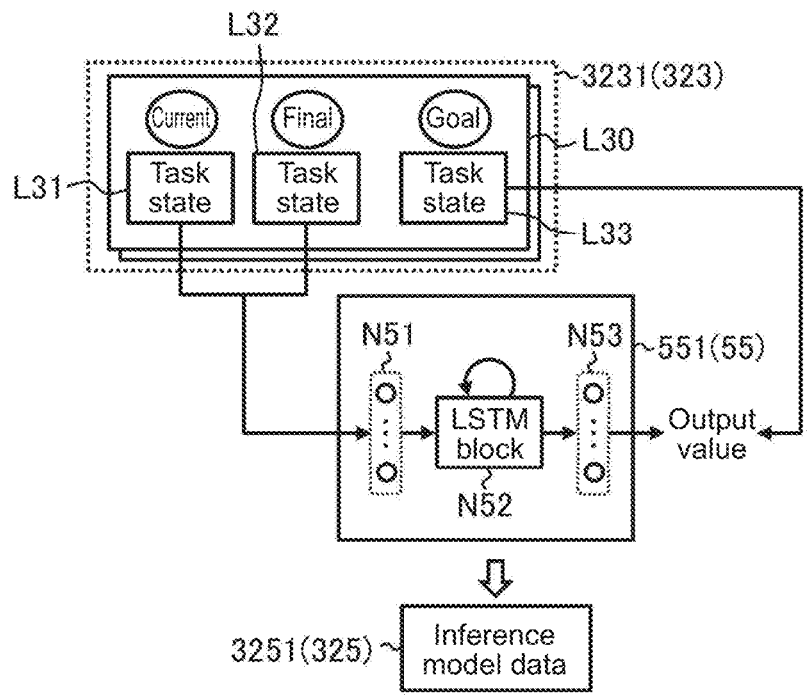
FIG. 12 is a schematic diagram illustrating an inference model used in one or more embodiments, showing an example configuration and an example method for generating the model.

FIG. 12 is a schematic diagram of the machine learning model for the inference model 55 and the machine learning method in a first example. In the first example, the inference model 55 uses a neural network, and the method of machine learning is supervised learning. In the example of FIG. 12, examples of the inference model 55, the learning data 323, and the inference model data 325 are an inference model 551, learning data 3231, and inference model data 3251 for ease of explanation.

(1-1-1) Example Configuration of Inference Model

In the first example, the inference model 551 includes a three-layered recurrent neural network. More specifically, the inference model 551 includes an input layer N51, a long short-term memory (LSTM) block N52, and an output layer N53. The LSTM block N52 corresponds to an intermediate layer.

The LSTM block N52 includes an input gate and an output gate to learn the timing for storing and outputting information (S. Hochreiter; J. Schmidhuber, Long Short-term Memory, Neural Computation, Nov. 15, 1997, 9(8), 1735-1780.). The LSTM block N52 may also include a forget gate to adjust the timing when information is forgotten (Felix A. Gers; Jurgen Schmidhuber; Fred Cummins, Learning to Forget: Continual Prediction with LSTM, Neural Computation, October 2000, 2451-2471.). The architecture of the LSTM block N52 may be constructed as appropriate in each embodiment.

However, the configuration of the inference model 551 is not limited to the above example and may be selected as appropriate in each embodiment. The inference model 551 may include a recurrent neural network with a different configuration. In some embodiments, the inference model 551 may include a fully coupled neural network or a convolutional neural network instead of a recurrent neural network, similarly to the above determination model 50. In some embodiments, the inference model 551 may include a combination of two or more types of neural networks. The inference model 551 may include two or more intermediate layers. The intermediate layer may be eliminated. The other configuration of the inference model 551 may be the same as that of the above determination model 50.

(1-1-2) Example Structure of Learning Data

The learning data 3231 used in supervised learning for the inference model 551 includes multiple learning datasets L30 each including a combination of training data (input data) and true data (supervisory signal). The training data may include the relative coordinates for a current task state L31 for training and the relative coordinates for a task state L32 as the final goal for training. The true data may include the relative coordinates for a goal task state L33 for training. The training data and the true data may be in any format selected as appropriate in each embodiment. For example, the training data may represent the relative coordinates, or may represent values resulting from conversion of the relative coordinates into a feature quantity.

The controller 31 can generate each learning dataset L30 from one or more sequences of goal task states obtained through the processing up to step S209. For example, the task state as the final goal indicated by the node Ng can be used as the task state L32 as the final goal for training. The controller 31 may set the task state at the start point indicated by the node Ns as the current task state L31 for training. In this case, the controller 31 may set the task state indicated by the node N1 as the goal task state L33 for training in the corresponding true data. Similarly, the controller 31 may set the task state indicated by the node N(k) as the current task state L31 for training. In this case, the controller 31 may set the task state indicated by the node N(k+1) as the goal task state L33 for training in the corresponding true data. The controller 31 may set the task state indicated by the node N4 as the current task state L31 for training. In this case, the controller 31 may set the task state as the final goal indicated by the node Ng as the goal task state L33 for training in the corresponding true data. The controller 31 can thus generate each learning dataset L30 from one or more sequences of obtained goal task states.

(1-1-3) Step S210

In step S210 above, the controller 31 trains the inference model 551 through machine learning (supervised learning) using the obtained multiple learning datasets L30. In the first example, the controller 31 trains, for each learning dataset L30, the inference model 551 through machine learning to output an output value that fits the true data from the output layer N53 in response to an input of the training data into the input layer N51. The controller 31 can generate the trained inference model 551 capable of inferring the goal task state to be achieved subsequently based on the current task state and the task state as the final goal.

The inference model 551 may use the same method of machine learning as the above determination model 50. In the first step, the controller 31 inputs, for each learning dataset L30, training data into the input layer N51 in the inference model 551 and performs a computational operation of the inference model 551. The controller 31 thus obtains, from the output layer L53 in the inference model 551, an output value corresponding to the result of inference of the goal task state to be achieved subsequently to the current task state. In the second step, the controller 31 calculates an error between the output value obtained from the output layer L53 and the true data based on a loss function.

In the third step, the controller 31 then calculates an error in the values of the computational parameters of the inference model 551 using the gradient of the error in the calculated output value by the error back propagation method. The controller 31 calculates an error in the values of the computational parameters (e.g., the coupling weights between neurons and the threshold of each neuron) for the inference model 551 using the gradient of the calculated error. In the fourth step, the controller 31 updates the values of the computational parameters of the inference model 551 based on each calculated error. The computational parameters may be updated by the degree adjusted based on the learning rate. The learning rate may be specified by an operator or may be a preset value in the program.

Through the first to fourth steps described above performed repeatedly, the controller 31 adjusts, for each learning dataset L30, the value of each computational parameter of the inference model 551 to reduce the sum of the errors between the output values obtained from the output layer N53 and the true data. For example, the controller 31 may repeat the above first to fourth steps until the sum of the errors is less than or equal to a threshold. The threshold may be determined as appropriate in each embodiment. In some embodiments, the controller 31 may repeat the above first to fourth steps a predetermined number of times. The adjustment may be repeated the number of times specified with, for example, a preset value in the program or with an input from an operator.

The controller 31 can thus build the trained inference model 551 trained through machine learning (supervised learning) to output, in response to an input of the training data included in each learning dataset L30 into the input layer N51, an output value that fits the true data included in the corresponding learning dataset L30 from the output layer N53. In other words, the controller 31 can build the trained inference model 551 capable of inferring the goal task state to be achieved subsequently based on the current task state and the task state as the final goal.

In step S211, the controller 31 generates information indicating the configuration and the computational parameters of the inference model 551 trained through supervised learning as the inference model data 3251. The controller 31 stores the generated inference model data 3251 into a predetermined storage area. The details of the inference model data 3251 are not limited to the above example and may be modified to regenerate the trained inference model 551. For the apparatuses each using the inference model 551 having the same configuration, for example, the inference model data 3251 may not include information indicating the configuration of the inference model 551.

(1-1-4) Others

When the method of machine learning is supervised learning, the inference model 551 may not rely on a neural network but may have other configurations. The inference model 551 may include a machine learning model other than a neural network. For example, the machine learning model for the inference model 551 may include a support vector machine, a regression model, or a decision tree. The method of supervised learning may be other than described in the above example and may be selected as appropriate for the configuration of the machine learning model.

(1-2) Second Example

Figure 13:
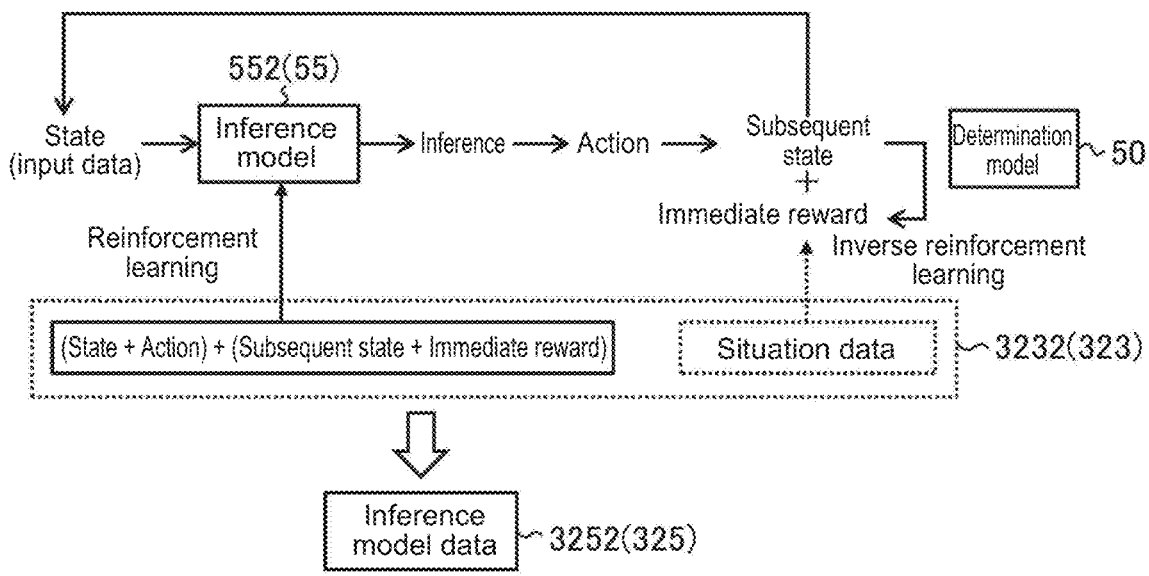
FIG. 13 is a schematic diagram illustrating an inference model used in one or more embodiments, showing an example configuration and an example method for generating the model.

FIG. 13 is a schematic diagram of a machine learning model for the inference model 55 and the machine learning method in a second example. In the second example, the method of machine learning is reinforcement learning. In the example of FIG. 13, examples of the inference model 55, the learning data 323, and the inference model data 325 are an inference model 552, learning data 3232, and inference model data 3252 for ease of explanation.

(1-2-1) Example Configuration of Inference Model

In the second example, the inference model 552 may be value-based, policy-based, or both value-based and policy-based. The inference model 552 being value-based may include a value function, such as a state-value function or an action-value function (Q function). The state-value function returns the value of a given state. The action-value function returns the value of each action in a given state. The inference model 552 being policy-based may include a policy function. The policy function returns the probability of selecting each action in a given state. The inference model 552 being both value-based and policy-based may include a value function (critic) and a policy function (actor). Each function may include a data table or a functional expression. The inference model 552 being a functional expression may include a neural network, a linear function, or a decision tree. A multilayered neural network including multiple intermediate (hidden) layers may be used for each function to perform training through deep reinforcement learning.

(1-2-2) Example Structure of Learning Data

Reinforcement learning basically uses an agent expected to interact with a training environment through an action in accordance with a policy. An agent is, for example, a CPU. The inference model 552 has the configuration described above and operates as a policy and determines an action. The agent observes a state for an action to be reinforced in a defined training environment. In the present embodiment, the state to be observed is a task state defined using relative coordinates, and the action to be performed is a change from a current task state to a goal task state. The policy is defined to determine (infer) the goal task state to be achieved subsequently based on the current task state and the task state as the final goal.

The agent may provide an observed current task state (input data) to the inference model 552 to infer the goal task state to be achieved subsequently. The agent may determine the goal task state based on the inference result. In some embodiments, the goal task state may be determined randomly. The agent can thus determine an action to be performed. The task state to be observed changes to the subsequent task state once the agent performs the action of changing to the determined goal task state. The agent may possibly receive an immediate reward from the training environment.

Through repeated trial and error for determining and performing the action, the agent updates the inference model 552 to maximize the total immediate reward (referred to as the value). This reinforces an optimum action, or more specifically, an action expected to obtain a high value, and defines a policy (trained inference model 552) that enables the selection of such an action.

In reinforcement learning, the learning data 3232 includes state-change data resulting from the trial-and-error process. The state-change data indicates a state change from the current task state to the subsequent task state through the action, from which an immediate reward may possibly be obtained. A single set of state-change data may be data representing the trajectories of all state changes for a single episode, or may be data representing state changes of a predetermined number of times (one or more times). Through the processing from steps S202 to S209 above, the controller 31 may obtain the above state-change data through the trial-and-error process using the inference model 552 that is being trained.

A reward function may be used to calculate an immediate reward in accordance with the state change. The reward function may be expressed using, for example, a data table, a functional expression, or a rule. The reward function being a functional expression may include a neural network, a linear function, or a decision tree. The reward function may be defined manually by, for example, an operator.

In some embodiments, the reward function may be defined to provide an immediate reward based on the result of determination obtained by the above trained determination model 50 as to whether the first object and the second object come in contact with each other in the target task state to be achieved and based on the distance between the target task state and the task state as the final goal. More specifically, the immediate reward may be set higher for the first object and the second object not coming in contact with each other and for the distance between the target task state and the task state as the final goal being shorter. The immediate reward may be set lower for the first object and the second object coming in contact with each other or for the distance being longer. Formula 1 below is an example reward function that provides an immediate reward in this manner.

$$(\text{reward}) = \frac{F(s_c)}{\|s_g - s_c\|_2^2} \qquad \text{Formula 1}$$

$s_c$ indicates the goal task state determined by the policy. $s_g$ indicates the task state as the final goal. $F(s_c)$ indicates the result of determination obtained by the trained determination model 50 as to whether the first object and the second object come in contact with each other in the task state $s_c$. The value of $F(s_c)$ may be set low (e.g., 0) for the objects determined to come in contact with each other, and may be set high (e.g., 1) for the objects determined not to come in contact with each other. The output value from the trained determination model 50 corresponding to the setting may be directly used as $F(s_c)$.

In some embodiments, the reward function may be estimated through inverse reinforcement learning using situation data obtained from an expert. The situation data may be data representing a demonstration by an expert (its trajectory). In the present embodiment, the situation data may include data representing the path along which the first object has actually moved from the task state at any selected start point to the task state as the final goal. The situation data may be generated with any method selected as appropriate in each embodiment. For example, the situation data may be generated by recording the trajectory of a demonstration performed by an expert using, for example, a sensor.

The method of inverse reinforcement learning may be selected as appropriate in each embodiment. Example methods of inverse reinforcement learning include maximum entropy inverse reinforcement learning, minimum relative entropy inverse reinforcement learning, and inverse reinforcement learning using adversarial generative networks (e.g., Justin Fu et al., Learning Robust Rewards with Adversarial Inverse Reinforcement Learning, arXiv:1710.11248, 2018.). For the reward function using inverse reinforcement learning, the learning data 3232 may further include situation data used for inverse reinforcement learning.

(1-2-3) Step S210

In step S210 above, the controller 31 updates the values of the computational parameters of the inference model 552 to maximize the value based on the obtained state-change data. The values of the computational parameters of the inference model 552 may be adjusted with any method selected as appropriate for the configuration of the inference model 552. For the inference model 552 including a neural network, for example, the values of the computational parameters of the inference model 552 may be adjusted in the same manner as described in the first example by, for example, the error back propagation method.

The controller 31 adjusts the value of each computational parameter of the inference model 552 to maximize the resultant value (expected value) (e.g., until the update is less than or equal to a threshold). More specifically, training the inference model 552 includes repeatedly correcting the value of each computational parameter included in the inference model 552 to have a higher reward until the predetermined condition (e.g., until the update is less than or equal to a threshold) is satisfied. The controller 31 can thus generate the trained inference model 552 capable of inferring the goal task state to be achieved subsequently based on the current task state and the task state as the final goal.

The controller 31 may adjust the value of each computational parameter of the above inference model 552 after collecting the learning data 3232 through the processing in steps S202 to S209. In some embodiments, the controller 31 may adjust the value of each computational parameter of the above inference model 552 while repeating the processing in steps S202 to S210.

For the inference model 552 being value-based, the method of reinforcement learning may be a temporal difference (TD) method, a TD($\lambda$) method, a Monte Carlo method, or dynamic programming. The action may be determined by trial and error through on-policy learning or off-policy learning. Example methods of reinforcement learning include Q-learning and SARSA. In trial and error, a random action may be used with probability $\epsilon$ (epsilon-Greedy learning).

For the inference model 552 being policy-based, the method of reinforcement learning may be a policy gradient method, trust region policy optimization (TRPO), or proximal policy optimization (PPO). In this case, the controller 31 calculates the gradients of the computational parameters for the policy function to yield a higher value and updates the values of the computational parameters for the policy function based on the calculated gradients. The gradients for the policy function may be calculated using, for example, the REINFORCE algorithm.

For the inference model 55 being both value-based and policy-based, the method of reinforcement learning may be an actor critic method, an advantage actor critic (A2C) algorithm, or an asynchronous advantage actor critic (A3C) algorithm.

For inverse reinforcement learning, the controller 31 further obtains situation data before the above reinforcement learning process. The situation data may be generated by the control apparatus 3 or by another computer. When the situation data is generated by another computer, the controller 31 may obtain the situation data generated by the other computer through, for example, a network or the storage medium 93. The controller 31 then performs inverse reinforcement learning using the obtained situation data to define a reward function. The controller 31 uses the reward function defined through inverse reinforcement learning to perform the above reinforcement learning process. The controller 31 thus uses the reward function defined through inverse reinforcement learning to generate the trained inference model 552 capable of inferring the goal task state to be achieved subsequently based on the current task state and the task state as the final goal.

In step S211, the controller 31 generates information indicating the trained inference model 552 built through reinforcement learning as the inference model data 3252. The information indicating the trained inference model 552 may include computational parameters, such as the values of entries in a data table or the values of coefficients in a functional expression. The controller 31 stores the generated inference model data 3252 into a predetermined storage area. The inference model 55 generated in the second example can determine the goal task state to avoid unintended contact between the first object and the second object and to allow the robot device to quickly achieve the task state as the final goal.

(1-3) Brief Summary

In the present embodiment, the inference model 55 including the machine learning model may have at least one of the two configurations described above. The controller 31 can use at least one of the two methods of machine learning to generate the trained inference model 55 capable of inferring the goal task state to be achieved subsequently based on the current task state and the task state as the final goal to avoid contact of the first object with the second object. The first method can thus appropriately generate the inference model 55 usable to perform a task.

(2) Second Method

Figure 14A:
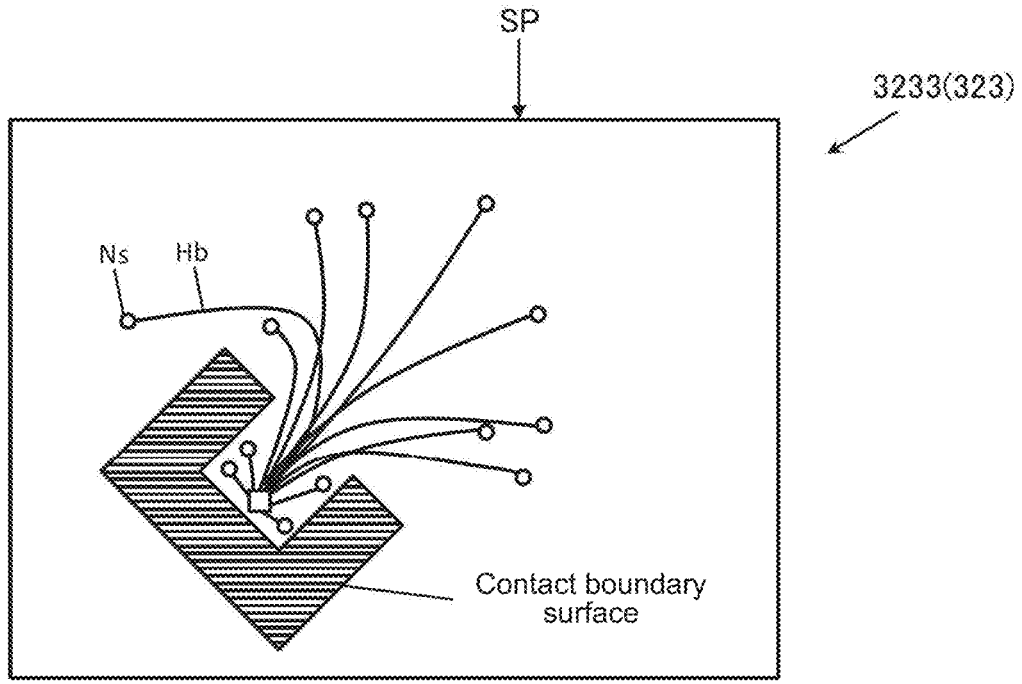
FIG. 14A is a schematic diagram illustrating example learning data in one or more embodiments.
Figure 14B:
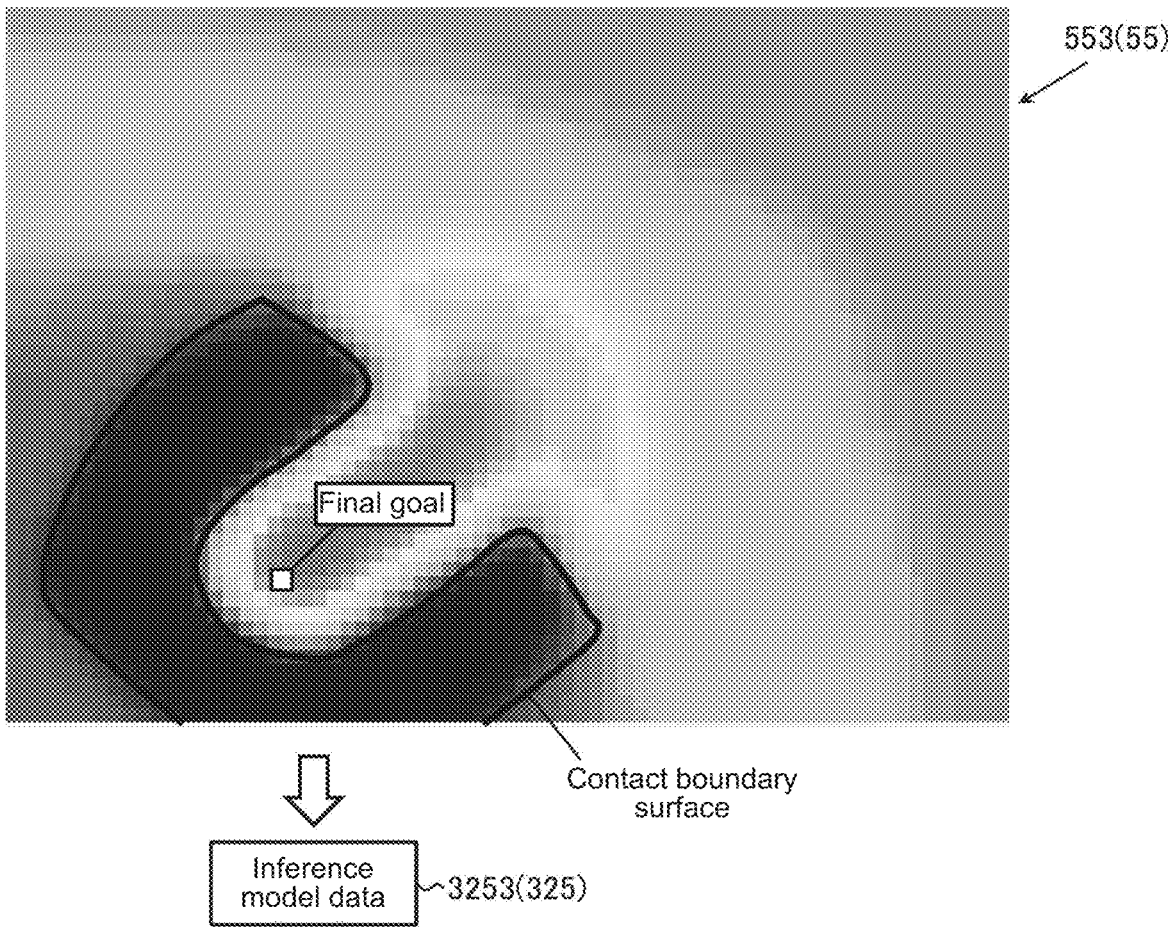
FIG. 14B is a schematic diagram illustrating an inference model in one or more embodiments showing an example configuration.

FIG. 14A is a schematic diagram of example learning data 323 with a second method. FIG. 14B is a schematic diagram of an inference model 55 with the second method showing its example configuration. With the second method, the inference model 55 includes a potential field defining the potential at each set of coordinates in the task space SP representing a set of task states. In FIGS. 14A and 14B, examples of the inference model 55, the learning data 323, and the inference model data 325 are an inference model 553, learning data 3233, and inference model data 3253 for ease of explanation.

The controller 31 performs path planning to avoid contact of the first object with the second object using the trained determination model 50 in the task space SP through the processing in steps S202 to S209. As shown in FIG. 14A, the controller 31 can thus generate the learning data 3233 representing paths Hb from multiple task states provided as the start points (nodes Ns) to the task state as the final goal. The start points (nodes Ns) may be provided randomly.

In step S210 above, the controller 31 generates a potential field by setting a potential for each set of coordinates in accordance with the frequency of passage through the paths Hb represented by the generated learning data 3233. The potential field may be derived with any method selected as appropriate in each embodiment. The controller 31 may derive the potential field from the learning data 3233 through estimation using, for example, kernel density estimation or a Gaussian mixture model (GMM). The potential field (inference model 553) shown in FIG. 14B can thus be obtained.

The potential for each set of coordinates in the potential field indicates an evaluation value indicating the possibility of achieving the final goal provided to the positional relationship between the first object and the second object at the corresponding coordinates. More specifically, a higher potential indicates a higher possibility that the positional relationship at the coordinates achieves the final goal, and a lower potential indicates a lower possibility that the positional relationship at the coordinates achieves the final goal. Changing to a state with a higher gradient of potential allows the task state as the final goal to be achieved appropriately from any task state selected at the start point. The second method can thus appropriately generate the inference model 55 usable to perform a task.

In step S211, the controller 31 generates information indicating the generated potential field as the inference model data 3253. The potential field may be expressed using a data table or a functional expression. The controller 31 stores the generated inference model data 3253 into a predetermined storage area.

(3) Brief Summary

In the present embodiment, the inference model 55 may be generated with at least one of the two methods described above. The controller 31 can use at least one of the two methods to generate the inference model 55 for inferring the goal task state to be achieved subsequently based on the current task state and the task state as the final goal to avoid contact of the first object with the second object.

$$T_C = \begin{bmatrix} R_{rc} & t_{rc} \\ 0 & 1 \end{bmatrix} \quad \text{Formula 2}$$

Inferring the goal task state to avoid contact of the first object with the second object refers to determining the goal task state to avoid unintended contact between the first object and the second object. For example, the inferring may include determining, to be the goal task state, a task state in which the first object is in contact with the second object appropriately, such as when the end-effector T holds the workpiece W. In other words, a contact state to be avoided is an inappropriate state of contact in which, for example, an excessive force acts between the first object and the second object, or in which either the first object or the second object is in contact with or joined to the other object at an incorrect orientation. Avoiding contact of the first object with the second object may thus be rephrased as avoiding contact of the first object with the second object in an inappropriate state.

(B) Operation Control Over Robot Device

Figure 15A:
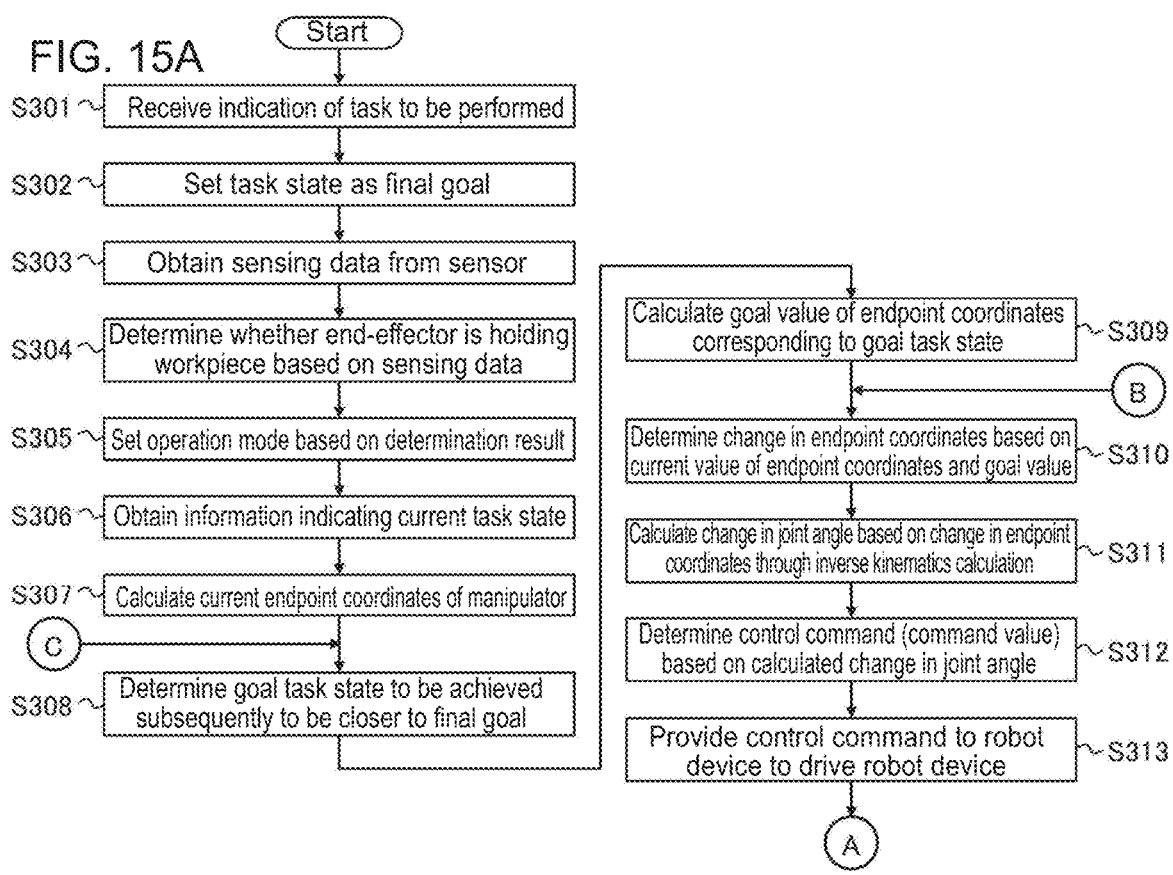
FIG. 15A is a flowchart illustrating an example procedure performed by a control apparatus according to one or more embodiments for a control over an operation of a robot device.
Figure 15B:
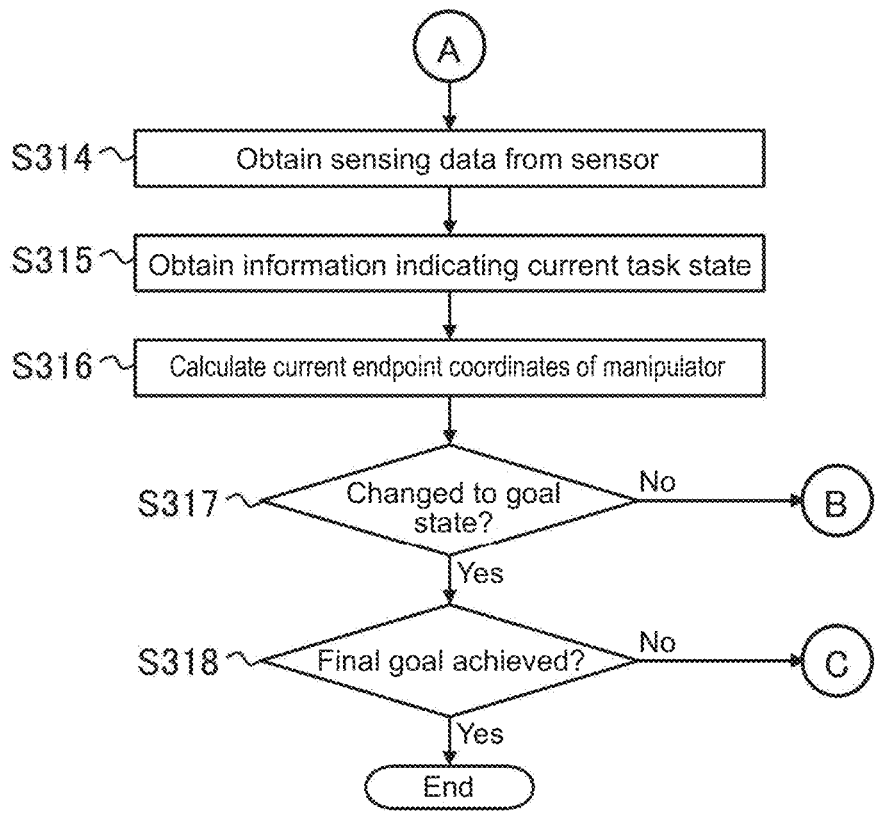
FIG. 15B is a flowchart illustrating an example procedure performed by a control apparatus according to one or more embodiments for a control over an operation of a robot device.
Figure 16:
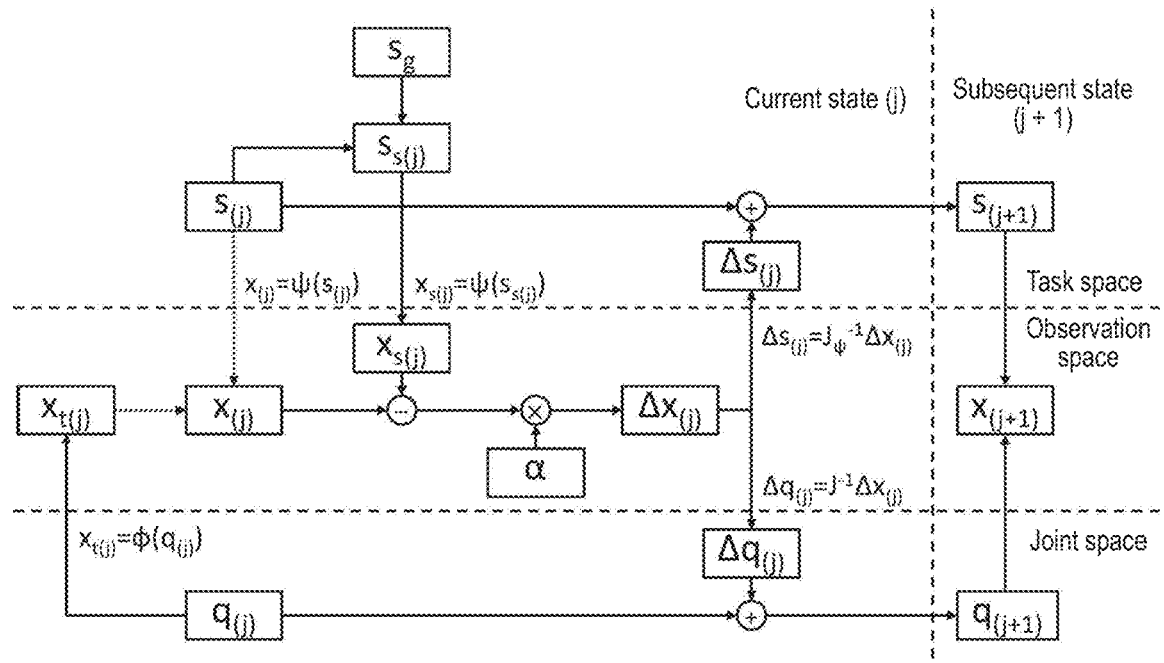
FIG. 16 is a diagram illustrating example computational processes for elements in one or more embodiments.

An example operation of the control apparatus 3 according to the present embodiment for the operation control over the robot device (manipulator 4) will now be described with reference to FIGS. 15A, 15B and 16. FIGS. 15A and 15B are flowcharts of an example procedure performed by the control apparatus 3 according to the present embodiment for the operation control over the robot device (manipulator 4). FIG. 16 is a diagram showing example computational processes for elements during operation control. The procedure described below including the procedure for generating the inference model 55 above is an example of a control method in an aspect of the present invention. However, the procedure below is a mere example, and each of its steps may be modified in any possible manner. In the procedure below, steps may be eliminated, substituted, or added as appropriate in each embodiment. The control over the operation of the robot device (manipulator 4) described below may be performed in a real space or in a virtual space.

Steps S301 and S302

In step S301, the controller 31 receives an indication of a task to be performed. The controller 31 may receive an indication of a task in any manner selected as appropriate in each embodiment. For example, the controller 31 may receive an input of a task name of the task to be performed through the input device 35. The controller 31 may output, to the output device 36, a list of tasks that can be performed and prompt an operator to select a task to be performed from the list. In this manner, the controller 31 receives an indication of the task to be performed.

In the present embodiment or embodiments, the controller 31 can receive a task of moving a first object relative to a second object in an environment including the first object and the second object. More specifically, an example task to be indicated includes a series of operations for driving the manipulator 4 to hold the workpiece W with the end-effector T and joining the workpiece W being held to the other workpiece G. In the present embodiment, the first task of moving and holding the workpiece W is performed using a target point T0 on the end-effector T as the endpoint of the manipulator 4 and using the workpiece W as a destination object to which the endpoint is to be moved. After the workpiece W is being held, the second task of joining the workpiece W to the other workpiece G is performed using a target point W0 on the workpiece W held by the end-effector T as the endpoint of the manipulator 4 and using the other workpiece G to which the workpiece W is to be joined as a destination object to which the endpoint is to be moved. In each task, the endpoint of the manipulator 4 corresponds to the first object, and the destination object corresponds to the second object.

In step S302, the controller 31 operates as the goal setter 311 and sets a task state $s_g$ as a final goal in accordance with the specified task. In the present embodiment as described above, the task state is defined by the positional relationship between the endpoint of the manipulator 4 and the destination object. The positional relationship is expressed using their relative coordinates. The relative coordinates for the task state $s_g$ as the final goal may be provided by a simulator, such as a CAD simulator, or may be specified by an operator. The relative coordinates for the task state $s_g$ as the final goal may be set with the same method as in step S201 above. Upon setting the task state $s_g$ as the final goal, the controller 31 advances the processing to subsequent step S303.

Step S303

In step S303, the controller 31 obtains sensing data from each sensor observing the environment in which a task is performed.

In the present embodiment, the camera S1 is used as a visual sensor for observing the environment in which a task is performed. The manipulator 4 includes the encoder S2 for measuring the angle of each joint (joints 41 to 46) and the touch sensor S3 for measuring the force acting on the end-effector T. The controller 31 can obtain image data including the environment in which a task is performed as sensing data from the camera S1. The controller 31 can obtain a current value $q_{(j)}$ (current measurement value) of the angle of each joint in the manipulator 4 from the corresponding encoder S2 as the sensing data. For ease of explanation, a symbol such as (j) may be added to indicate a particular time, for example, being current, and no such symbol is added when a particular time is not to be indicated. The controller 31 further obtains measurement data about the force acting on the end-effector T from the touch sensor S3 as the sensing data. The controller 31 may directly obtain sensing data from the sensors (the camera S1, each encoder S2, and the touch sensor S3), or may indirectly obtain sensing data through, for example, another computer. The camera S1 and the touch sensor S3 are examples of sensors that observe the state of the workpiece W relative to the end-effector T. Upon obtaining the sensing data, the controller 31 advances the processing to subsequent step S304.

Step S304

In step S304, the controller 31 determines whether the end-effector T is holding the workpiece W based on the obtained sensing data. The determination may be performed as appropriate for the sensing data.

In the present embodiment, for example, image data including the environment in which the task is performed is obtained with the camera S1 as sensing data. The controller 31 may use the CAD data 320 for matching the models for the end-effector T and the workpiece W with the obtained image data. The controller 31 may then determine whether the end-effector T is holding the workpiece W based on the positional relationship between the end-effector T and the workpiece W resulting from the matching. The matching may be performed using a known image processing method.

In the present embodiment, for example, measurement data about the force acting on the end-effector T may be obtained as the sensing data. The controller 31 may determine whether the end-effector T is holding the workpiece W based on the distribution of the force indicated by the measurement data. When the measurement data shows the force acting on the end-effector T comparable to the holding of the workpiece W with the end-effector T, the controller 31 may determine that the end-effector T is holding the workpiece W. Otherwise, the controller 31 may determine that the end-effector T is not holding the workpiece W.

Upon determining whether the end-effector T is holding the workpiece W based on the sensing data, the controller 31 advances the processing to subsequent step S305.

Step S305

In step S305, the controller 31 sets the operation mode of the manipulator 4 based on the determination result in step S304. More specifically, when determining that the end-effector T is not holding the workpiece W, the controller 31 sets the target point T0 on the end-effector T to the endpoint of the manipulator 4, and sets the operation mode to a mode for performing the first task of holding the workpiece W with the end-effector T. When determining that the end-effector T is holding the workpiece W, the controller 31 sets the target point W0 on the workpiece W to the endpoint of the manipulator 4, and sets the operation mode to a mode for performing the second task of joining the workpiece W to the other workpiece G. Upon setting the operation mode, the controller 31 advances the processing to subsequent step S306.

Step S306

In step S306, the controller 31 operates as the state obtainer 312 and obtains the current task state $s_{(j)}$ of the manipulator 4.

As described above, when the end-effector T is not holding the workpiece W in the present embodiment, the task state s is defined using the relative coordinates of the workpiece W relative to the end-effector T. When the end-effector T is holding the workpiece W, the task state s is defined using the relative coordinates of the other workpiece G relative to the workpiece W. In the present embodiment, the controller 31 uses the CAD data 320 for matching the image data obtained with the camera S1 with each object. The controller 31 can obtain the current task state $s_{(j)}$ through the matching.

Figure 17:
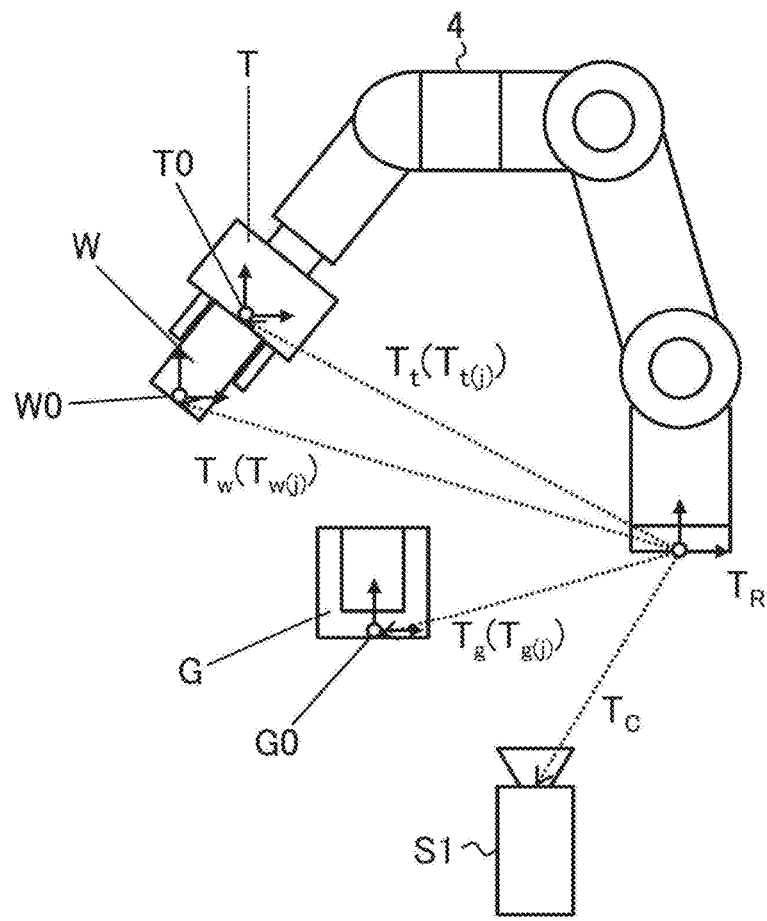
FIG. 17 is a schematic diagram illustrating objects in one or more embodiments in an illustrated positional relationship.

An example method for obtaining the current task state $s_{(j)}$ will now be described further with reference to FIG. 17. FIG. 17 is a schematic diagram of objects in the illustrated positional relationship. In the example of FIG. 17, the base 40 included in the manipulator 4 is used as the origin in an observation space. However, the origin may be set at another position selected as appropriate in each embodiment. The homogeneous coordinates $(T_C)$ of the camera S1 with respect to the origin can be written using Formula 2 below.

$R_{rc}$ indicates a rotation element in the coordinate system of the camera S1 as viewed from the coordinate system including the origin, and $t_{rc}$ indicates a translation element in the coordinate system. For ease of explanation, the camera S1 is calibrated to have the homogeneous coordinates $(T_R)$ of the origin satisfying Formula 3 below.

$$T_R = \begin{bmatrix} I & 0 \\ 0 & 1 \end{bmatrix}$$ Formula 3

I is a unit matrix. In the example of FIG. 17, the coordinates of the end-effector T $(T_t)$ are the relative coordinates of the target point T0 on the end-effector T relative to the origin. The relative coordinates of the target point W0 on the workpiece W relative to the origin are the coordinates of the workpiece W $(T_w)$. The relative coordinates of the target point G0 on the other workpiece G relative to the origin are the coordinates of the other workpiece G $(T_g)$. The controller 31 can obtain the value of each set of coordinates $(T_t, T_w, T_g)$ through matching of the image data with a model for the corresponding object using the CAD data 320.

$$\Delta x = J(q) \cdot \Delta q = [\, j_1 \ \ldots \ j_n \,] \begin{bmatrix} \Delta q_1 \\ \vdots \\ \Delta q_n \end{bmatrix}$$ Formula 13

$$s = T_w^{-1} \cdot T_t$$ Formula 4

When the end-effector T is not holding the workpiece W, the task state s and the coordinates $(T_t, T_w)$ of the end-effector T and the workpiece W may have the relationship written using Formula 4 above. The controller 31 can calculate the current task state $s_{(j)}$ by substituting the current values $(T_{t(j)}, T_{w(j)})$ of the coordinates of the end-effector T and the workpiece W obtained through the matching into Formula 4 above and performing a computational operation written as Formula 4.

$$s = T_g^{-1} \cdot T_w$$ Formula 5

When the end-effector T is holding the workpiece W, the task state s and the coordinates $(T_w, T_g)$ of the workpiece W and the other workpiece G may have the relationship written using Formula 5 above. The controller 31 can calculate the current task state $s_{(j)}$ by substituting the current values $(T_{w(j)}, T_{g(j)})$ of the coordinates of the workpiece W and the other workpiece G obtained through the matching into Formula 5 above and performing a computational operation written as Formula 5. The coordinates $(T_t, T_w, T_g)$ may be selected as appropriate. For example, the coordinates $(T_t, T_w, T_g)$ may be represented in the homogeneous coordinate system. The same applies to the processing described below.

When the camera S1 is not calibrated, the controller 31 may further calculate the coordinates $(T_R)$ of the origin in the image data obtained with the camera S1. The origin may be detected using a marker or another mark. More specifically, the coordinates $(T_R)$ of the origin may be calculated by matching each mark in the image data. The controller 31 can calculate the current task state $s_{(j)}$ using the calculated coordinates $(T_R)$ of the origin in each of the operations described above. The same processing applies to subsequent steps including matching using the CAD data 320.

Upon receiving the current task state $s_{(j)}$, the controller 31 advances the processing to subsequent step S307. The processing in step S306 may be performed at the timing not limited to the above example. The processing in step S306 may be performed at any selected time before the processing in step S308 (described later) is performed. For example, matching using the CAD data 320 may also be performed in step S304 above. In this case, the processing in step S306 may be performed together with the processing in step S304 above.

Step S307

In step S307, the controller 31 calculates the current value $x_{(j)}$ of the endpoint coordinates of the manipulator 4 from the obtained sensing data. In the present embodiment, the current value $x_{(j)}$ of the endpoint coordinates may be calculated using sensing data obtained with at least one of the camera S1, the encoder S2, or the touch sensor S3. The controller 31 can calculate the current value $x_{(j)}$ of the endpoint coordinates with at least one of the two methods described below.

(1) First Method

As shown in FIG. 16, with the first method, the controller 31 derives the current value $x_{(j)}$ of the endpoint coordinates of the manipulator 4 in the observation space from the current value $q_{(j)}$ of the angle of each joint of the manipulator 4 in a joint space defined by the corresponding encoder S2 through the forward kinematics calculation. The processing will be described for when the end-effector T is not holding the workpiece W and for when the end-effector T is holding the workpiece W.

(1-1) When not Holding Workpiece W

When the end-effector T is not holding the workpiece W, the target point T0 on the end-effector T is set to the endpoint. In this case, the controller 31 calculates the current value $x_{(j)}$ of the endpoint coordinates defined based on the current value $q_{(j)}$ of the angle of each joint through the forward kinematics calculation using a first transformation matrix group ($\varphi$) derived by a first homogeneous transformation matrix of the joint as a transformation function.

$$x_t = \varphi(q) \quad \text{Formula 6}$$

$$\varphi(q) = {}_0T^1 \cdot \ldots \cdot {}_{n-1}T^n \quad \text{Formula 7}$$

More specifically, the coordinates $(x_t)$ of the target point T0 on the end-effector T and the angle (q) of each joint may have the relationship written using Formula 6 above based on forward kinematics. The angle (q) is a variable having the number of dimensions corresponding to the number of joints. The first transformation matrix group ($\varphi$) and the first homogeneous transformation matrix (${}_{m-1}T^m$) for each joint may have the relationship written using Formula 7 above (where m is from 0 to n, and n is the number of joints). The first homogeneous transformation matrix represents relative coordinates in the coordinate system for a target joint as viewed from the coordinate system for a position closer to the endpoint than the target joint. The first homogeneous transformation matrix is used to transform the coordinate system for the position closer to the base into the coordinate system for the target joint.

The parameters of the first homogeneous transformation matrix for each joint have known values except for the angle of the joint. In the present embodiment, the parameters are included in the robot data 321. The parameters may be set using a known method, such as Denavit-Hartenberg (DH) notation or modified DH notation. The controller 31 refers to the robot data 321 to derive the first transformation matrix group ($\varphi$) written using Formula 7 above. As written using Formula 6 above, the controller 31 substitutes the current value $q_{(j)}$ of the angle of each joint into the derived first transformation matrix group ($\varphi$) and performs a computational operation of the first transformation matrix group ($\varphi$). Through the forward kinematics calculation, the controller 31 can calculate the current value $x_{t(j)}$ of the coordinates of the end-effector T (the target point T0 on the end-effector T). The controller 31 obtains the calculated current value $x_{t(j)}$ as the current value $x_{(j)}$ of the endpoint coordinates.

(1-2) When Holding Workpiece W

When the end-effector T is holding the workpiece W, the target point W0 on the workpiece W is set to the endpoint. In this case, the controller 31 first obtains a second homogeneous transformation matrix (${}_tT^w$) for transforming coordinates from the coordinate system for the target point T0 on the end-effector T into the coordinate system for the target point W0 on the workpiece W.

The second homogeneous transformation matrix (${}_tT^w$) may be obtained with any method selected as appropriate in each embodiment. For example, the workpiece W held by the end-effector T may be at a constant position and orientation relative to the end-effector T. The second homogeneous transformation matrix (${}_tT^w$) may thus be defined as a constant.

In some embodiments, the controller 31 may derive the second homogeneous transformation matrix (${}_tT^w$) from the sensing data obtained in step S303. As an example method for the derivation, the controller 31 may use the CAD data 320 for matching the models for the end-effector T and the workpiece W with the image data obtained with the camera S1. The controller 31 can obtain the coordinates $(T_t)$ of the end-effector T and the coordinates $(T_w)$ of the workpiece W through the matching. The camera S1 may be calibrated as in the example described above. The controller 31 can then calculate the second homogeneous transformation matrix (${}_tT^w$) from the coordinates $(T_t)$ of the end-effector T and the coordinates $(T_w)$ of the workpiece W using Formula 8 below.

$${}_tT^w = T_t^{-1} \cdot T_w \quad \text{Formula 8}$$

The matching using the CAD data 320 may be performed near the coordinates $(x_t)$ of the target point T0 on the end-effector T calculated through the forward kinematics calculation. When the matching and the forward kinematics calculation are accurate, the coordinates $(T_t)$ of the end-effector T obtained through the matching agree with the coordinates $(x_t)$ calculated through the forward kinematics calculation. The controller 31 may thus use the coordinates $(x_t)$ calculated through the forward kinematics calculation as the coordinates $(T_t)$. The controller 31 can thus derive the second homogeneous transformation matrix (${}_tT^w$). In the computational operation written as Formula 4 above in step S306 above, the current value $(x_{t(j)})$ of the coordinates calculated through the forward kinematics calculation may also be used instead of the current value $(T_{t(j)})$ of the coordinates of the end-effector T obtained through the matching.

Another example of the derivation may use the distribution of force acting on the end-effector T measured with the touch sensor S3 that depends on the position and the orientation of the workpiece W relative to the end-effector T. More specifically, the controller 31 may estimate the relative coordinates (the relative position and the relative orientation) of the workpiece W relative to the end-effector T based on the measurement data obtained with the touch sensor S3. The controller 31 can derive the second homogeneous transformation matrix ($_tT^w$) through the estimation.

The second homogeneous transformation matrix ($_tT^w$) may be derived from the sensing data with any method other than the analytical method described above. The second homogeneous transformation matrix ($_tT^w$) may be derived using a trained machine learning model capable of estimating the second homogeneous transformation matrix ($_tT^w$) from the sensing data through machine learning, similarly to, for example, the determination model 50 and the inference model 551. In this case, the controller 31 inputs the obtained sensing data into the trained machine learning model and performs a computational operation of the trained machine learning model. In this manner, the controller 31 obtains, from the trained machine learning model, an output value corresponding to an estimation result of the second homogeneous transformation matrix ($_tT^w$).

The controller 31 then multiplies the first transformation matrix group ($\varphi$) by the obtained second homogeneous transformation matrix ($_tT^w$) to calculate a second transformation matrix group ($\varphi(q) \cdot _tT^w$). The second transformation matrix group can be written using Formula 9 below. The first homogeneous transformation matrix is an example first transformation formula. The second homogeneous transformation matrix is an example second transformation formula. The first transformation matrix group ($\varphi$) is an example first transformation formula group. The second transformation matrix group ($\varphi(q) \cdot _tT^w$) is an example second transformation formula group. Each transformation formula may be in any format usable for computing the endpoint coordinates. For example, each transformation formula may be a transformation matrix other than in the homogeneous coordinate system, or may be a formula other than the matrix.

$$\varphi(q) \cdot _tT^w = x_{(j)} T^w \qquad \text{Formula 9}$$

The controller 31 calculates the current value $x_{(j)}$ of the endpoint coordinates defined based on the current value $q_{(j)}$ of the angle of each joint through the forward kinematics calculation using the calculated second transformation matrix group as a transformation function. More specifically, the controller 31 substitutes the current value $q_{(j)}$ of the angle of each joint into the second transformation matrix group ($\varphi(q) \cdot _tT^w$) and performs a computational operation of the second transformation matrix group ($\varphi(q) \cdot _tT^w$). Through the forward kinematics calculation, the controller 31 can calculate the current value of the coordinates of the workpiece W (the target point W0 on the workpiece W). The controller 31 obtains the calculated current value of the coordinates of the workpiece W as the current value $x_{(j)}$ of the endpoint coordinates.

The second homogeneous transformation matrix ($_tT^w$) derived from the sensing data as described above can reflect any change in the state of the end-effector T holding the workpiece W. The current value of the coordinates of the workpiece W, or in other words, the current value of the endpoint coordinates of the manipulator 4, can be appropriately calculated in response to any change in the state of the end-effector T holding the workpiece W.

(2) Second Method

With the second method, the controller 31 derives the current value $x_{(j)}$ of the endpoint coordinates of the manipulator 4 through matching of the image data obtained with the camera S1 with a model for each object using the CAD data 320. In this case, the controller 31 may derive the current value $x_{(j)}$ of the endpoint coordinates of the manipulator 4 based on the current task state $s_{(j)}$ obtained in the task space in step S306 above.

$$x = \psi(s) = T_w \cdot s \qquad \text{Formula 10}$$

When the end-effector T is not holding the workpiece W, the task state s and the coordinates x of the endpoint may have the relationship written using Formula 10 above based on the positional relationship between the objects shown in FIG. 17. In this case, the transformation function ($\psi$) for transforming from the task space to the observation space is defined using the coordinates ($T_w$) of the workpiece W. The controller 31 can calculate the current value $x_{(j)}$ of the endpoint coordinates of the manipulator 4 by substituting the current task state $s_{(j)}$ obtained in step S306 above and the current value ($T^w(j)$) of the coordinates of the workpiece W obtained through matching into Formula 10 above and performing a computational operation written as Formula 10.

$$x = \psi(s) = T_g \cdot s \qquad \text{Formula 11}$$

Similarly, when the end-effector T is holding the workpiece W, the task state s and the coordinates x of the endpoint may have the relationship written using Formula 11 above. In this case, the transformation function ($\psi$) for transforming from the task space to the observation space is defined using the coordinates ($T_g$) of the other workpiece G. The controller 31 can calculate the current value $x_{(j)}$ of the endpoint coordinates of the manipulator 4 by substituting the current task state $s_{(j)}$ obtained in step S306 above and the current value ($T_{g(j)}$) of the coordinates of the other workpiece G obtained through matching into Formula 11 above and performing a computational operation written as Formula 11.

The current value $x_{(j)}$ of the endpoint coordinates of the manipulator 4 may be derived through matching using the CAD data 320 with any method other than the above example method. When the end-effector T is not holding the workpiece W, the controller 31 may calculate the current value ($T_{t(j)}$) of the coordinates of the end-effector T through the matching, and obtain the calculated current value ($T_{t(j)}$) as the current value $x_{(j)}$ of the endpoint coordinates. Similarly, when the end-effector T is holding the workpiece W, the controller 31 may calculate the current value ($T_{w(j)}$) of the coordinates of the workpiece W through the matching, and obtain the calculated current value ($T_{w(j)}$) as the current value $x_{(j)}$ of the endpoint coordinates. In other words, the controller 31 may directly derive the current value $x_{(j)}$ of the endpoint coordinates of the manipulator 4 through the matching.

(3) Brief Summary

In the present embodiment, the controller 31 can use at least one of the two methods to calculate the current value $x_{(j)}$ of the endpoint coordinates of the manipulator 4. Upon calculating the current value $x_{(j)}$ of the endpoint coordinates of the manipulator 4, the controller 31 advances the processing to subsequent step S308. The processing in step S307 may be performed at the timing not limited to the above example. The processing in step S307 may be performed at any selected time before the processing in step S310 (described later) is performed. For example, the processing in step S307 may be performed before the processing in step S306. For matching using the CAD data 320, for example, the processing in step S307 may be performed together with the processing in step S306 or S304 above.

Step S308

In step S308, the controller 31 operates as the action determiner 313 and determines the goal task state $s_{s(j)}$ to be achieved subsequently to the obtained current task state $s_{(j)}$ to be closer to the task state $s_g$ as the final goal. In the present embodiment, the controller 31 determines the goal task state $s_{s(j)}$ to be achieved subsequently to the current task state $s_{(j)}$ by referring to the inference model data 325 and using the inference model 55 generated in the processing in step S210 above.

The computational operation of the inference model 55 for inferring the goal task state $s_{s(j)}$ to be achieved subsequently may be selected as appropriate for the configuration of the inference model 55. For the inference model 55 generated with the first method described above and being a functional expression, the controller 31 substitutes the current task state $s_{(j)}$ and the task state $s_g$ as the final goal into the functional expression and performs a computational operation of the functional expression. For the inference model 55 including a neural network, the controller 31 inputs the current task state $s_{(j)}$ and the task state $s_g$ as the final goal into the input layer and then determines neuronal firing in each of the layers sequentially from the layer on the input end. For the inference model 55 including a data table, the controller 31 compares the current task state $s_{(j)}$ and the task state $s_g$ as the final goal with the data table. The controller 31 obtains the result of inference of the goal task state $s_{s(j)}$ to be achieved subsequently as an output from the inference model 55. The controller 31 can determine the goal task state $s_{s(j)}$ to be achieved subsequently based on the inference result.

For the inference model 55 generated with the second method described above, or in other words, including a potential field, the controller 31 refers to the value of the potential set for the coordinates corresponding to the current task state $s_{(j)}$ in the generated potential field. The controller 31 determines the goal task state $s_{s(j)}$ to be achieved subsequently in accordance with the gradient of the potential set for the coordinates corresponding to the current task state $s_{(j)}$. More specifically, the controller 31 determines the goal task state $s_{s(j)}$ to change to a state with a higher gradient of potential (e.g., to change by a predetermined distance toward the state with the highest gradient of potential).

Any number of goal task states may be determined. In step S308, the controller 31 may use the determined goal task state as the current task state and further determine the goal task state to be achieved subsequently. The controller 31 may repeat the processing to determine the goal task state multiple times. Upon determining the goal task state $s_{s(j)}$ to be achieved subsequently, the controller 31 advances the processing to subsequent step S309.

Step S309

In step S309, the controller 31 operates as the command determiner 315 and calculates the goal value $x_{s(j)}$ of the endpoint coordinates based on the determined goal task state $s_{s(j)}$. As shown in FIG. 16, the controller 31 can use the transformation function ($\psi$) above to transform the goal task state $s_{s(j)}$ in the task space into the goal value $x_{s(j)}$ of the endpoint coordinates in the observation space.

More specifically, when the end-effector T is not holding the workpiece W, the transformation function ($\psi$) from the task space to the observation space is written using Formula 10 above. The controller 31 can calculate the goal value $x_{s(j)}$ of the endpoint coordinates by substituting the determined goal task state $s_{s(j)}$ into Formula 10 above and performing a computational operation written as Formula 10. When the end-effector T is holding the workpiece W, the transformation function ($\psi$) from the task space to the observation space is written using Formula 11 above. The controller 31 can calculate the goal value $x_{s(j)}$ of the endpoint coordinates by substituting the determined goal task state $s_{s(j)}$ into Formula 11 above and performing a computational operation written as Formula 11. Upon calculating the goal value $x_{s(j)}$ of the endpoint coordinates, the controller 31 advances the processing to subsequent step S310.

Step S310

In step S310, the controller 31 operates as the command determiner 315 and calculates an amount of change ($\Delta x_{(j)}$) in the endpoint coordinates based on the current value $x_{(j)}$ of the endpoint coordinates and the goal value $x_{s(j)}$ of the endpoint coordinates. More specifically, as shown in FIG. 16, the controller 31 determines the amount of change ($\Delta x_{(j)}$) in the endpoint coordinates based on the deviation of the current value $x_{(j)}$ of the endpoint coordinates from the goal value $x_{s(j)}$. For example, the amount of change ($\Delta x$) and the deviation ($x_s-x$) of the current value of the endpoint coordinates from the goal value may have the relationship written using Formula 12 below. The amount of change ($\Delta x$) in the endpoint coordinates is an example of the difference between the current value and the goal value of the endpoint coordinates.

$$\Delta x = \alpha \times (x_s - x) \qquad \text{Formula 12}$$

$\alpha$ is a coefficient. For example, the value of $\alpha$ may be determined as appropriate in a range of more than 0 to less than or equal to 1. $\alpha$ may be eliminated. The controller 31 can determine the amount of change ($\Delta x_{(j)}$) in the endpoint coordinates by substituting the current value $x_{(j)}$ of the endpoint coordinates obtained in step S307 and the goal value $x_{s(j)}$ of the endpoint coordinates obtained in step S309 into Formula 12 above and performing a computational operation written as Formula 12. Upon determining the amount of change (($\Delta x_{(j)}$) in the endpoint coordinates, the controller 31 advances the processing to subsequent step S311.

Step S311

In step S311, the controller 31 operates as the command determiner 315 and calculates an amount of change ($\Delta q_{(j)}$) in the angle of each joint from the determined amount of change ($\Delta x_{(j)}$) in the endpoint coordinates through the inverse kinematics calculation using the inverse function of the transformation function for the forward kinematics calculation described above. More specifically, the amount of change ($\Delta x$) in the endpoint coordinates and the amount of change ($\Delta q$) in the angle of each joint may have the relationship written using Formula 13 below.

J is a Jacobian matrix derived from the transformation function in the above forward kinematics calculation. $j_i$ indicates a matrix element at the i-th joint, and $\Delta q_i$ indicates the amount of change at the i-th joint.

$$j_i = \begin{bmatrix} z_i \times (a_t - a_i) \\ z_i \end{bmatrix} \qquad \text{Formula 14}$$

$$j_i = \begin{bmatrix} z_i \times (a_w - a_i) \\ z_i \end{bmatrix} \qquad \text{Formula 15}$$

Figure 18A:
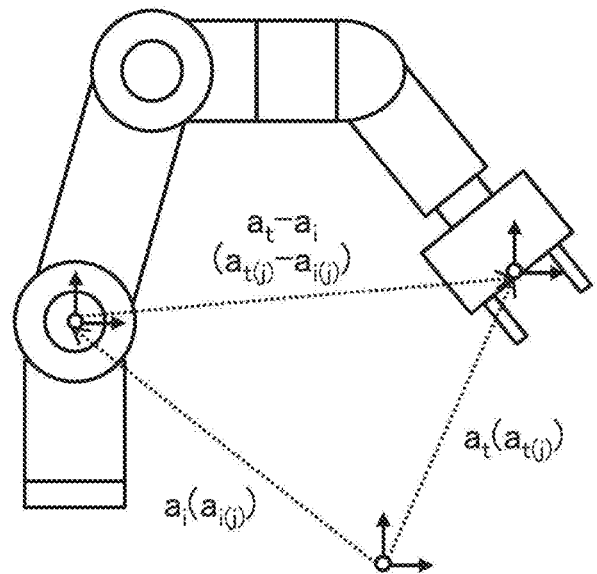
FIG. 18A is a schematic diagram illustrating an end-effector not holding a workpiece, showing an example relationship between each joint and an endpoint.
Figure 18B:
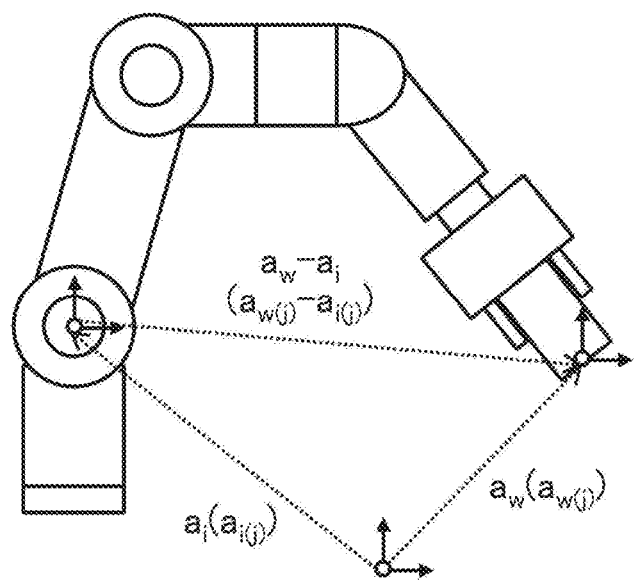
FIG. 18B is a schematic diagram illustrating an end-effector holding a workpiece, showing an example relationship between each joint and an endpoint.

An example calculation with the Jacobian matrix will now be described with further reference to FIGS. 18A and 18B. FIG. 18A is a schematic diagram of the end-effector T not holding the workpiece W, showing an example relationship between each joint and the endpoint. FIG. 18B is a schematic diagram of the end-effector T holding the workpiece W, showing an example relationship between each joint and the endpoint.

As shown in FIG. 18A, when the end-effector T is not holding the workpiece W, the elements at the joints of the Jacobian matrix are calculated based on the positional relationship between the joints and the end-effector T. For example, the controller 31 can calculate the elements at the joints using Formula 14 below. As shown in FIG. 18B, when the end-effector T is holding the workpiece W, the elements at the joints of the Jacobian matrix are calculated based on the positional relationship between the joints and the workpiece W. For example, the controller 31 can calculate the elements at the joints using Formula 15 below.

$z_i$ indicates a rotation element of the rotational axis at the homogeneous coordinates of the i-th joint, and $a_i$ indicates a translation element at the homogeneous coordinates of the i-th joint. $z_i$ and $a_i$ are extracted from the first homogeneous transformation matrix at the i-th joint. $a_t$ indicates a translation element at the homogeneous coordinates of the end-effector T. $a_w$ indicates a translation element at the homogeneous coordinates of the workpiece W. $a_t$ is extracted from the coordinates ($T_t$) of the end-effector T. $a_w$ is extracted from the coordinates ($T_w$) of the workpiece W. Each element $j_i$ of the Jacobian matrix indicates a differential element at each joint in the first homogeneous transformation matrix.

The controller 31 calculates the Jacobian matrix in accordance with the operation mode using Formulas 14 and 15 above. In the present embodiment, the element (at) of the end-effector T and the element ($a_w$) of the workpiece W are simply replaced with each other in the elements of the Jacobian matrix between when the end-effector T is not holding the workpiece W and when the end-effector T is holding the workpiece W. The controller 31 thus calculates the Jacobian matrix through a simple computational process.

The controller 31 calculates the inverse matrix ($J^{-1}$) of the calculated Jacobian matrix. The controller 31 performs the inverse kinematics calculation using the calculated inverse matrix ($J^{-1}$). More specifically, the controller 31 derives the relationship between each amount of change ($\Delta x$, $\Delta q$) and the inverse matrix ($J^{-1}$) from Formula 13 above as written using Formula 16 below.

$$\Delta q = J^{-1} \cdot \Delta x \qquad \text{Formula 16}$$

The controller 31 can calculate the amount of change ($\Delta q_{(j)}$) in the angle of each joint by substituting the calculated inverse matrix ($J^{-1}$) and the amount of change ($\Delta x_{(j)}$) in the endpoint coordinates into Formula 16 and performing a computational operation written as Formula 16 above. Upon calculating the amount of change ($\Delta q_{(j)}$) in the angle of each joint, the controller 31 advances the processing to subsequent step S312.

Step S312

In step S312, the controller 31 operates as the command determiner 315 and determines a command value for each joint based on the calculated amount of change in the angle of each joint. The command value may be determined with a known method such as proportional-integral-derivative (PID) control and PI control. A command value for each joint is an example of a control command for the robot device. In the present embodiment, the controller 31 can determine the control command for the manipulator 4 to change the task state of the manipulator 4 from the current task state $s_{(j)}$ to the goal task state $s_{s(j)}$ through the processing in steps S309 to S312. Upon determining the control command, the controller 31 advances the processing to subsequent step S313.

Step S313

In step S313, the controller 31 operates as the driver 316 and provides the determined control command to the manipulator 4 to drive the manipulator 4. In the present embodiment, the controller 31 drives each joint of the manipulator 4 using the determined command value. The driving may be performed in any manner selected as appropriate in each embodiment. For example, the controller 31 may directly drive each joint of the manipulator 4. In some embodiments, the manipulator 4 may include a controller (not shown). In this case, the controller 31 may indirectly drive each joint of the manipulator 4 by providing a command value for each joint to the controller. Upon driving the manipulator 4 in accordance with the determined control command, the controller 31 advances the processing to subsequent step S314.

Steps S314 to S316

The processing in steps S314 to S316 may be the same as the processing in steps S303, S306, and S307 above except that the cycle advances from (j) to (j+1). More specifically, in step S314, the controller 31 obtains sensing data from each sensor. In step S315, the controller 31 operates as the state obtainer 312 and obtains the current task state $s_{(j+1)}$ of the manipulator 4. In step S316, the controller 31 calculates the current value $x_{(j+1)}$ of the endpoint coordinates of the manipulator 4 from the obtained sensing data. Upon calculating the current value $x_{(j+1)}$ of the endpoint coordinates, the controller 31 advances the processing to subsequent step S317.

Step S317

In step S317, the controller 31 determines whether the task state of the manipulator 4 has changed to the goal task state $s_{s(j)}$ after the driving in step S313.

The determination method may be selected as appropriate in each embodiment. For example, as shown in FIG. 16, the angle ($q_{(j+1)}$) of a joint after the driving and the angle ($q_{(j)}$) of the joint before the driving may have the relationship written using Formula 17 below.

$$q_{(j+1)} = q_{(j)} + \Delta q_{(j)} \qquad \text{Formula 17}$$

The controller 31 may determine whether the angle of a joint obtained with an encoder S2 in step S314 agrees with the sum of the angle ($q_{(j)}$) of the joint obtained with the encoder S2 before the driving and the amount of change ($\Delta q_{(j)}$) calculated in step S311. In response to the angle of the joint after the driving agreeing with the sum ($q_{(j)} + \Delta q_{(j)}$) of the angle of the joint before the driving and the calculated amount of change, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

Similarly to the transformation function in the forward kinematics calculation, for example, a Jacobian matrix $J_\psi$ may be derived for the transformation function ($\psi$). The Jacobian matrix $J_\psi$ indicates a differential element in the transformation function ($\psi$). The derived Jacobian matrix $J_\psi$ may be used to calculate an inverse matrix ($J_\psi^{-1}$). The amount of change ($\Delta x$) in the endpoint coordinates, the amount of change ($\Delta s$) in the task state, and the inverse matrix ($J_\psi^{-1}$) may have the relationship written using Formula 18 below.

$$\Delta s = J_\psi^{-1} \cdot \Delta x \qquad \text{Formula 18}$$

The controller 31 can calculate the amount of change ($\Delta s_{(j)}$) in the task state by substituting the calculated inverse matrix ($J_\psi^{-1}$) and the amount of change ($\Delta x_{(j)}$) in the endpoint coordinates into Formula 18 and performing a computational operation written as Formula 18 above. The task state $s_{(j+1)}$ after the driving and the task state $s_{(j)}$ before the driving may have the relationship written using Formula 19 below, similarly to Formula 17 above.

$$s_{(j+1)} = s_{(j)} + \Delta s_{(j)} \qquad \text{Formula 19}$$

The controller 31 may determine whether the current task state obtained in step S315 after the driving agrees with the sum of the current task state $s_{(j)}$ obtained in step S306 before the driving and the above calculated amount of change ($\Delta s_{(j)}$). In response to the current task state obtained after the driving agreeing with the sum ($s_{(j)} + \Delta s_{(j)}$) of the current task state obtained before the driving and the calculated amount of change, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$. In the present embodiment, the task space is defined using the relative coordinates between two objects, and the task space and the observation space can be represented in the same dimensions. The inverse matrix $(J_\psi^{-1})$ in Formula 18 may be replaced with a unit matrix, and the amount of change ($\Delta x$) in the endpoint coordinates may be directly used as the amount of change ($\Delta s$) in the task state. For a task state defined using the relative coordinates of the workpiece Was viewed from the other workpiece G, for example, the inverse matrix $(J_\psi^{-1})$ in Formula 18 may be replaced with a unit matrix.

In some embodiments, the controller 31 may determine whether the current task state obtained in step S315 agrees with the goal task state $s_{s(j)}$ determined in step S308. In response to the obtained current task state agreeing with the goal task state $s_{s(j)}$, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

For example, the current value ($x_{(j+1)}$) of the endpoint coordinates after the driving and the current value ($x_{(j)}$) of the endpoint coordinates before the driving may have the relationship written using Formula 20 below, similarly to Formula 17 above.

$$x_{(j+1)} = x_{(j)} + \Delta x_{(j)} \qquad \text{Formula 20}$$

The controller 31 may determine whether the current value of the endpoint coordinates after the driving calculated in step S316 agrees with the sum of the current value ($x_{(j)}$) of the endpoint coordinates before the driving calculated in step S307 and the amount of change ($\Delta x_{(j)}$) determined in step S310. In response to the current value of the endpoint coordinates after the driving agreeing with the sum ($x_{(j)} + \Delta x_{(j)}$) of the current value of the endpoint coordinates before the driving and the calculated amount of change, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

In some embodiments, the controller 31 may determine whether the current value of the endpoint coordinates calculated in step S316 agrees with the goal value ($x_{s(j)}$) of the endpoint coordinates calculated in step S309. In response to the current value of the endpoint coordinates after the driving agreeing with the goal value ($x_{s(j)}$) of the endpoint coordinates calculated before the driving, the controller 31 may determine that the task state of the manipulator 4 has changed to the goal task state $s_{s(j)}$. Otherwise, the controller 31 may determine that the task state of the manipulator 4 has not changed to the goal task state $s_{s(j)}$.

The controller 31 can thus determine whether the task state of the manipulator 4 has changed to the goal task state $s_{s(j)}$ in any of the above manners. Agreeing in each determination above may include complete agreeing between two values, and may also include agreeing between two values including a difference of less than or equal to a threshold (allowable error). When determining that the task state of the manipulator 4 has changed to the goal task state $s_{s(j)}$, the controller 31 advances the processing to subsequent step S318. Otherwise, the controller 31 returns the processing to step S310 and drives the manipulator 4 again. The controller 31 may use the current value of the endpoint coordinates calculated in step S316 as the current value $x_{(j)}$ to perform the processing in step S310 and subsequent steps.

Step S318

In step S318, the controller 31 determines whether the task state $s_g$ as the final goal has been achieved.

The determination method may be selected as appropriate in each embodiment. For example, the controller 31 may determine whether the current task state $s_{(j+1)}$ obtained in step S315 agrees with the task state $s_g$ as the final goal. In response to the current task state $s_{(j+1)}$ agreeing with the task state $s_g$ as the final goal, the controller 31 determines that the task state $s_g$ as the final goal has been achieved. Otherwise, the controller 31 determines that the task state $s_g$ as the final goal has not been achieved. As in the above example, agreeing in each determination above may include complete agreeing between two values, and may also include agreeing between two values including a difference of less than or equal to a threshold (allowable error).

When determining that the task state $s_g$ as the final goal has been achieved, the controller 31 ends the series of processing steps for operation control over the manipulator 4. When determining that the task state $s_g$ as the final goal has not been achieved, the controller 31 returns the processing to step S308. The controller 31 then performs the processing in steps S308 to S313 using the results from steps S315 and S316. The controller 31 repeats the series of processing steps to achieve the task state $s_g$ as the final goal. The control apparatus 3 according to the present embodiment can thus control the operation of the manipulator 4 to perform a specified task.

In response to determination that the task state $s_g$ as the final goal has not been achieved, the branch destination is not limited to step S308 above. When the manipulator 4 performs a series of tasks, for example, the task state $s_g$ as the final goal may be the task state as the final goal of the task to be performed last. In the present embodiment, for performing a task of causing the end-effector T to hold the workpiece W and joining the workpiece W being held to the other workpiece G, the task state $s_g$ as the final goal may be the state in which the workpiece W is joined to the other workpiece G. In this case, the series of tasks may start from the start point for the first task. In this case, in response to determination that the task state $s_g$ as the final goal has not been achieved, the branch destination may be step S303 above instead of step S308 above. The controller 31 can thus drive the manipulator 4 while monitoring the operation mode through the processing in steps S304 and S305. The series of tasks can be performed while smoothly switching from one to another. When the workpiece W is held by the end-effector T in the present embodiment, the operation mode can be smoothly switched to the mode for the task of transporting the workpiece W toward the other workpiece G.

Features

As described above, the model generation apparatus 1 according to the present embodiment generates, through machine learning, the determination model 50 for determining whether two objects come in contact with each other in a target positional relationship through the processing in steps S101 and S102. The trained determination model 50 generated through machine learning can determine, in response to a target positional relationship provided as a set of continuous values, whether two objects come in contact with each other in the positional relationship without largely increasing the data volume for the determination model 50. The structure according to the present embodiment largely reduces the data volume for information indicating the boundary at which two objects come in contact with each other.

In the present embodiment, the trained determination model 50 determines whether two objects come in contact with each other. At least one of the two objects is to be moved by the operation of the manipulator 4. This structure largely reduces the data volume for information indicating the boundary at which two objects come in contact with each other for defining the operation of the manipulator 4. This allows the control apparatus 3 including the RAM, the ROM, and the storage 32 each with a relatively small storage capacity to use the trained determination model 50 to appropriately drive the manipulator 4 to avoid unintended contact of the endpoint with the destination object.

In the present embodiment, the inference model 55 is generated for determining the goal task state to avoid contact of the first object with the second object using the trained determination model 50 through the processing in steps S201 to S210. For controlling the operation of the manipulator 4, in step S308, the goal task state is determined using the generated inference model 55. For controlling the operation of the manipulator 4, the goal task state can thus be determined to avoid contact of the first object with the second object, or in other words, to avoid unintended contact of the endpoint of the manipulator 4 with the destination object without a computational operation of the trained determination model 50. The computation for the operation control over the manipulator 4 can thus be less costly.

In the present embodiment, the state of each task to be performed by the manipulator 4 is expressed using a relative positional relationship between objects, such as the end-effector T (end-effector), the workpiece W, and the other workpiece G. The control command is not directly associated with each task, but with the amount of change in the relative positional relationship between the objects. In other words, time-series control commands for the manipulator 4 can be generated or taught in response to a change in the relative positional relationship between the objects without being associated with the respective tasks. For example, in steps S306 and S315 above, the positional relationship (task state) between the end-effector T and the workpiece W is determined to reflect a change in the coordinates of the workpiece W. The manipulator 4 can thus appropriately hold the workpiece W with the end-effector T based on the training results. The structure according to the present embodiment can train the manipulator 4 to perform tasks in versatile situations, thus reducing the cost for teaching the manipulator 4 to perform tasks.

In the present embodiment, the positional relationship between objects is expressed using their relative coordinates. This allows appropriate and definitive expression of the positional relationship between two objects, thus allowing easy determination of the positional relationship (or the task state in control) between the two objects.

In the present embodiment, the endpoint coordinates of the manipulator 4 may be calculated with the first method through the forward kinematics calculation in steps S307 and S316 above. With the first method, when the end-effector T is not holding the workpiece W, the end-effector T is set to the endpoint, and the forward kinematics calculation is performed using the first transformation matrix group ($\varphi$) derived by the first homogeneous transformation matrix of each joint (each of the joints 41 to 46) as a transformation function. When the end-effector T is holding the workpiece W, the workpiece W is set to the endpoint, and the forward kinematics calculation is performed using an extended transformation function. More specifically, the forward kinematics calculation is performed using the second transformation matrix group ($\varphi(q) \cdot_t T^w$) as a transformation function. The second transformation matrix group ($\varphi(q) \cdot_t T^w$) is obtained by multiplying the first transformation matrix group ($\varphi$) by the second homogeneous transformation matrix ($_t T^w$) for transforming the coordinates from the coordinate system for the end-effector T into the coordinate system for the workpiece W. In other words, when the end-effector T holds the workpiece W in the present embodiment, the reference point for the kinematics changes from the end-effector T to the workpiece W.

Thus, the forward kinematics calculation in steps S307 and S316 can be performed substantially in the same manner as the inverse kinematics calculation in step S311 for when the end-effector T is not holding the workpiece W and for when the end-effector T is holding the workpiece W. In other words, the first task of holding the workpiece W with the end-effector T and the second task of joining the workpiece W held by the end-effector T to the other workpiece G can be processed as the same task of moving the endpoint of the manipulator 4 relative to the destination object. The structure according to the present embodiment can perform unified control in versatile situations for when the end-effector T is not holding the workpiece W and for when the end-effector T is holding the workpiece W. The structure according to the present embodiment can simplify the control over the manipulator 4 and thus reduce the cost for creating or teaching the operation of the manipulator 4.

4. Modifications

The embodiment of the present invention described in detail above is a mere example of the present invention in all respects. The embodiment may be variously modified or altered without departing from the scope of the present invention. For example, the embodiment may be modified in the forms described below. The same components as those in the above embodiment are hereafter given the same reference numerals, and the operations that are the same as those in the above embodiment will not be described. The modifications described below may be combined as appropriate.

4.1

In the above embodiment, the end-effector T, the workpiece W, and the other workpiece G are examples of objects. However, the objects to be determined for contact between them are not limited to the above example and may be of any types that can be operated in a real space or in a virtual space. The objects may be items associated with the operation of the robot device, such as an obstacle, in addition to the end-effector T, the workpiece W, or the other workpiece G described above.

One object may include one item or may include multiple items. For three or more items, the determination model 50 may process the items as one object and determine whether contact occurs between these items and another item. In some embodiments, the determination model 50 may process the items as individual objects and determine whether contact occurs between the items.

In the above embodiment, at least one of two objects is to be moved by the operation of the robot device. An object to be moved by the operation of the robot device may be a component of the robot device such as an end-effector, may be the robot device, or may be an item other than a component of the robot device such as a workpiece held by an end-effector. However, the objects may be of any other types. The two objects may be any items other than objects to be moved by the operation of the robot device.

In the above embodiment, the manipulator 4 is an example of the robot device. However, the robot device may be of any type, such as an automatically movable object or an autonomous robot, in addition to an industrial robot such as the manipulator 4. The automatically movable object may be, for example, a drone, an autonomous driving vehicle, or a mobile robot. In the above embodiment, the manipulator 4 is a vertically articulated robot. However, the industrial robot may be of any other type. The industrial robot may be, for example, a SCARA robot, a parallel link robot, a Cartesian coordinate robot, or a cooperative robot, in addition to the above vertically articulated robot.

In the above embodiment, the work of holding the workpiece W with the end-effector T and the work of joining the workpiece W being held to the other workpiece G are examples of the task to be performed by the robot device. The task may be any work to be performed by the robot device and may be selected as appropriate in each embodiment. The task may include fitting components to each other or turning screws, in addition to holding and transporting the workpiece W as described above.

The task may include simple work such as holding a workpiece or releasing a workpiece. The task may include changing the coordinates of a target workpiece by, for example, holding the workpiece and placing the workpiece at specified coordinates (position and orientation). The task may include spraying paint onto a workpiece from specified relative coordinates using an atomizer as the end-effector. The task may include placing a camera attached to the end-effector at specified coordinates. The task may be predetermined or may be specified by an operator.

In the above embodiment, the camera S1, the encoders S2, and the touch sensor S3 are used as sensors for observing the environment in which a task is performed. The camera S1 and the touch sensor S3 are examples of sensors that observe the state of the workpiece W relative to the end-effector T. However, any other types of sensors may be used. The sensors may include a proximity sensor, a force sensor, a torque sensor, or a pressure sensor, in addition to a camera, an encoder, or a touch sensor. The proximity sensor may be located in an area from which the end-effector T and its surroundings can be observed to detect an item approaching the end-effector T. The force sensor, the torque sensor, or the pressure sensor may be located, in the same manner as the touch sensor S3, in an area from which the force acting on the end-effector T can be measured to observe the force acting on the end-effector T. At least any of the proximity sensor, the force sensor, the torque sensor, or the pressure sensor may be used as a sensor for observing the state of the workpiece W relative to the end-effector T. The camera S1 may be movable in any manner using the manipulator 4 or another robot device. In this case, the coordinates of the camera S1 may be calibrated as appropriate. This allows control over the area to be observed with the camera S1 as appropriate.

In the above embodiment, the endpoint of the manipulator 4 may not be set based on whether the manipulator 4 is holding the workpiece W but may be set in any other appropriate manner. For example, the end-effector T may be set to the endpoint of the manipulator 4 independently of whether the manipulator 4 is holding the workpiece VV.

4.2

In the above embodiment, the control apparatus 3 uses the trained determination model 50 for generating the inference model 55. However, the trained determination model 50 may be used in any other manner. The control apparatus 3 may use the trained determination model 50 for controlling the operation of the manipulator 4.

Figure 19:
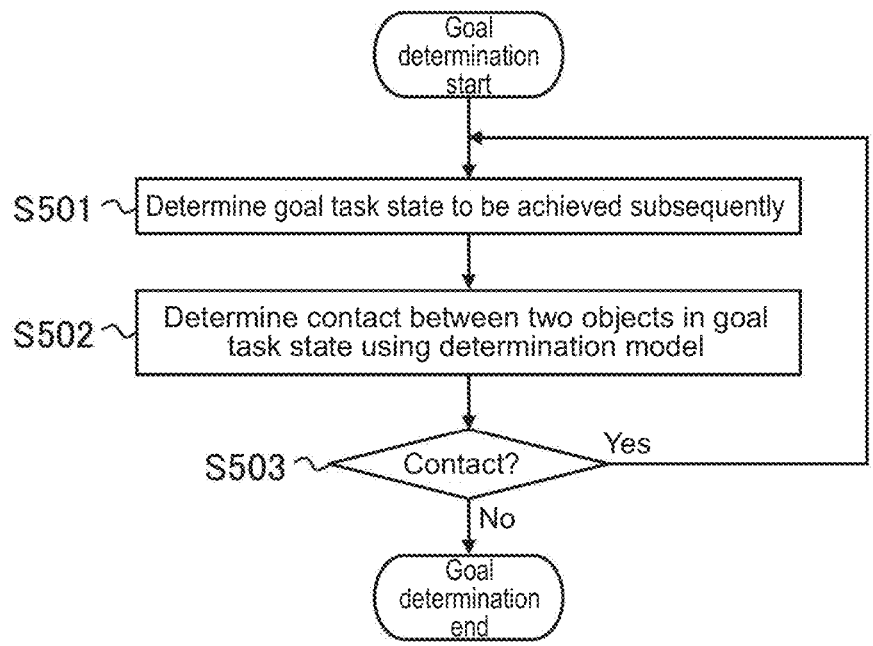
FIG. 19 is a flowchart illustrating a subroutine for goal determination performed by a control apparatus according to a modification.

FIG. 19 is a flowchart of a subroutine for determining the goal task state according to the present modification. The processing for determining the goal task state in step S308 above may be replaced by the subroutine processing illustrated in FIG. 19.

In step S501, the controller 31 operates as the action determiner 313 and determines the goal task state to be achieved subsequently to the obtained current task state to be closer to the task state as the final goal. The processing in step S501 may be performed in the same manner as in step S308 above.

In step S502, the controller 31 operates as the contact determiner 314 and determines whether two objects come in contact with each other in the determined goal task state using the trained determination model 50. The processing in step S502 may be performed in the same manner as in steps S203 and S206 above.

In step S503, the controller 31 determines a branch destination of the processing based on the determination result in step S502. When determining that two objects come in contact with each other in the goal task state in step S502, the controller 31 returns the processing to step S501 and resets the goal task state. When determining that two objects do not come in contact with each other in the goal task state, the controller 31 performs the processing in subsequent step S309. The control apparatus 3 can thus determine the operation of the manipulator 4 to avoid unintended contact of the first object with the second object using the trained determination model 50 for controlling the operation of the manipulator 4.

4.3

In the above embodiment, the control apparatus 3 determines the goal task state using the inference model 55 in step S308 above. However, the goal task state may be determined in any other manner. The goal task state may be determined without using the inference model 55. In step S308 above, for example, the goal task state may be determined in the same manner as in step S205 above. In one example, the controller 31 may determine the goal task state with a known method such as path planning. The sequence of goal task states may be, for example, predetermined. In this case, in step S308 above, the controller 31 may determine the goal task state to be achieved subsequently by referring to data representing the sequence of goal task states. The same applies to step S501 above.

In the above embodiment or embodiments, the learning data 323 is collected using the determination result obtained by the trained determination model 50. However, the learning data 323 may be collected in any other manner. For example, the learning data 323 may be collected without using the trained determination model 50 but using, for example, the actual objects. The inference model 55 may thus be generated without using the trained determination model 50.

In the above embodiment, the series of processing steps (steps S201 to S211) for generating the inference model 55 may be eliminated from the procedure performed by the control apparatus 3. In this case, the data collector 317, the model generator 318, and the storing unit 319 may be eliminated from the software configuration of the control apparatus 3. The information processing for generating the inference model 55 and the information processing for the operation control over the manipulator 4 may be performed by separate computers. A new model generation apparatus may be built by eliminating the software module for the operation control over the manipulator 4 and extracting the software module for generating the inference model 55.

Figure 20:
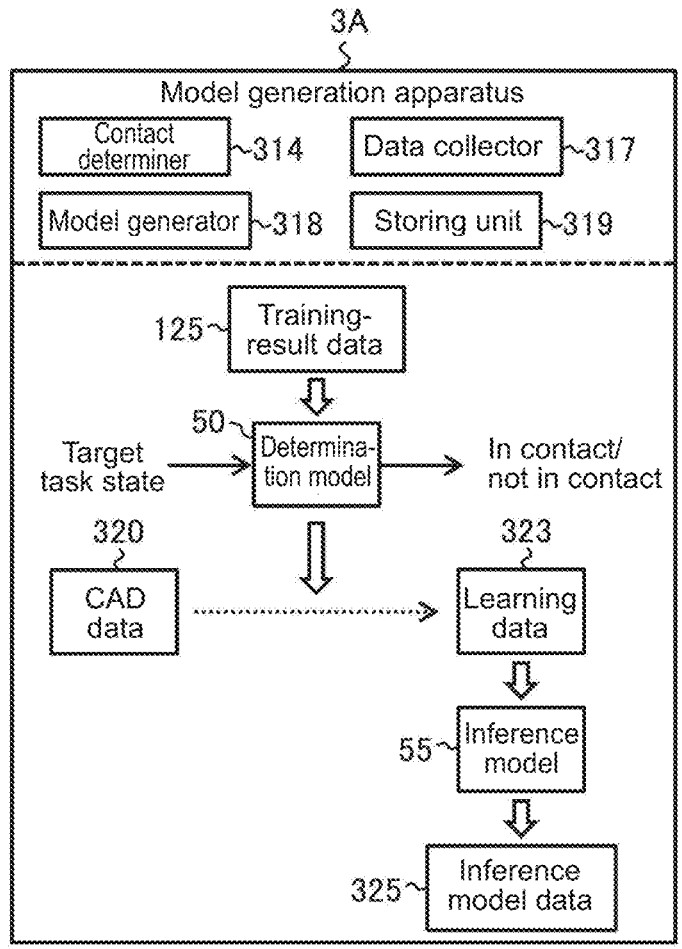
FIG. 20 is a schematic diagram illustrating a model generation apparatus according to a modification showing a software configuration.

FIG. 20 is a schematic diagram of a model generation apparatus 3A according to the modification showing its software configuration. The model generation apparatus 3A may have the same hardware configuration as the control apparatus 3 in the above embodiment. The model generation apparatus 3A operates as a computer including a contact determiner 314, a data collector 317, a model generator 318, and a storing unit 319 as software modules. The model generation apparatus 3A can thus perform the processing in steps S201 to S211 above to generate the inference model 55. A portion of a control program 83 that defines a command for generating the inference model 55 may be referred to as a model generation program.

In the above embodiment and the modification, the processing for collecting the learning data 323 through steps S201 to S209 may be performed by another computer. In this case, each of the control apparatus 3 in the above embodiment and the model generation apparatus 3A may obtain the learning data 323 generated by the other computer and perform steps S210 and S211 using the obtained learning data 323.

4.4

In the above embodiment, the positional relationship between two objects is expressed using their relative coordinates. The positional relationship may be expressed differently. For example, the positional relationship between two objects may be expressed using their absolute coordinates. In this case, the absolute coordinates for each object may be transformed into relative coordinates, which may then be used to perform the above information processing.

4.5

In the above embodiment, the control apparatus 3 analytically determines the command value (control command) for each joint from the goal value of the endpoint coordinates of the manipulator 4 in steps S307 and S309 to S312. However, the control command may be determined in any other manner. The control command for the robot device may be determined as appropriate to change the task state of the robot device from the current task state to the goal task state.

For example, the control command may be directly determined based on the current task state and the goal task state. In one example, the control command may be determined using reference data such as a data table. In this case, the controller 31 can obtain the control command from reference data by comparing the current task state and the task state as the final goal with the reference data. In another example, the control command may be determined based on the current task state and the goal task state using a trained machine learning model capable of determining such a control command through machine learning, similarly to the determination model 50, the inference model 551, or other models. In this case, the controller 31 inputs the current task state and the goal task state into the trained machine learning model and performs a computational operation of the trained machine learning model. In this manner, the controller 31 obtains, from the trained machine learning model, an output value corresponding to the determined control command. In the above embodiment, the control command includes a command value for the angle of each joint. However, the control command may have any other structure determined as appropriate for, for example, the type of the robot device.

In the above embodiment, the task state as the final goal may be set differently, or for example, may be preset. In this case, the processing in steps S301 and S302 may be eliminated from the procedure performed by the control apparatus 3. In this case, the goal setter 311 may be eliminated from the software configuration of the control apparatus 3.

4.6

In the above embodiment, the determination model 50 includes a fully coupled neural network. However, the determination model 50 may include any other type of neural network. The determination model 50 may be, for example, a convolutional neural network or a recurrent neural network, in addition to a fully coupled neural network. The determination model 50 may include a combination of two or more types of neural networks.

The machine learning model for the determination model 50 is not limited to a neural network but may be of any type selected as appropriate in each embodiment. The determination model 50 may be a machine learning model, such as a support vector machine, a regression model, or a decision tree model, in addition to a neural network. The determination as to whether two objects come in contact with each other may be performed using a real space or a virtual space.

In the above embodiment, the inference model 55 may be prepared for each task to be performed by the manipulator 4. In other words, multiple trained inference models 55 may be prepared to infer the goal task states for different tasks. In this case, the controller 31 in the control apparatus 3 may select an inference model 55 to be used for inference from the prepared inference models 55 in accordance with the operation mode set in step S305 above. The controller 31 may switch between the inference models 55 in accordance with the operation mode. In some embodiments, the inference model 55 may further receive an input of information indicating a condition for a task, such as an object type, an object identifier, a task identifier, or a task type, and may infer the goal task state of the task satisfying the input condition. In this case, the controller 31 may further input information indicating the operation mode set in step S305 above into the inference model 55 for determining the goal task state to be achieved subsequently, and may perform a computational operation in step S308 above.

In the above embodiment, the input and the output of each of the determination model 50 and the inference model 55 may be in any format determined as appropriate in each embodiment. For example, the determination model 50 may further receive an input of information other than the task state. Similarly, the inference model 55 may further receive an input of information other than the current task state and the task state as the final goal. For the task state as the final goal being fixed, the inference model 55 may not receive an input of information indicating the task state as the final goal. The determination model 50 and the inference model 55 may use either discrimination or regression for their outputs. One or more embodiments may include a control method for controlling an operation of a robot device to perform a task of moving a first object in an environment comprising the first object and a second object, the method being implementable by a computer, the method comprising: obtaining a current task state of the first object and the second object, the task state being defined by a positional relationship between the first object and the second object; determining a goal task state to be achieved subsequently to the obtained current task state to be closer to a task state as a final goal; determining whether the first object and the second object come in contact with each other in a target task state by providing the target task state of the first object and the second object to a trained determination model, the trained determination model being trained through machine learning to output an output value fitting true data in response to an input of training data, the training data indicating a positional relationship between the first object and the second object, the true data indicating whether the first object and the second object come in contact with each other in the positional relationship; determining a control command for the robot device to change the task state of the robot device from the current task state to the goal task state; and providing the determined control command to the robot device to control the operation of the robot device.

REFERENCE SIGNS LIST

1 model generation apparatus
11 controller
12 storage
13 communication interface
14 external interface
15 input device
16 output device
17 drive
91 storage medium
81 model generation program
111 data obtainer
112 machine learning unit
113 storing unit
120 CAD data
121 learning dataset
122 training data
123 true data
125 training-result data
3 control apparatus
31 controller
32 storage
33 communication interface
34 external interface
35 input device
36 output device
37 drive
93 storage medium
83 control program
311 goal setter
312 state obtainer
313 action determiner
314 contact determiner
315 command determiner
316 driver
317 data collector
318 model generator
319 storing unit
320 CAD data
321 robot data
323 learning data
325 inference model data
4 manipulator (robot device)
40 base
41 to 46 joint
491 to 494 link
T end-effector
T0 target point
CT local coordinate system
W workpiece
W0 target point
CW local coordinate system
G other workpiece
CG local coordinate system
RC1, RC2 relative coordinates
S1 camera
S2 encoder
S3 touch sensor
50 determination model
501 input layer
502 intermediate (hidden) layer
503 output layer
55 inference model

The invention claimed is:

1. A model generation apparatus, comprising:
a processor configured with a program to perform operations comprising:
obtaining a plurality of learning datasets each comprising a combination of training data and true data, the training data comprising relative coordinates indicating a positional relationship between two objects, the true data indicating whether the two objects come in contact with each other in the positional relationship; and
training, through machine learning, a determination model using the obtained plurality of learning datasets to cause the determination model to output, in response to an input of training data comprised in each of the obtained plurality of learning datasets, an output value fitting true data comprised in a corresponding learning dataset of the obtained plurality of learning datasets, and indicating whether the two objects come in contact with each other, thereby reducing a data volume of information indicating a boundary at which the two objects come into contact with each other.

2. The model generation apparatus according to claim 1, wherein
the positional relationship between the two objects is expressed using relative coordinates.

3. The model generation apparatus according to claim 2, wherein
at least one of the two objects comprises an object to be moved by an operation of a robot device.

4. The model generation apparatus according to claim 1, wherein
at least one of the two objects comprises an object to be moved by an operation of a robot device.

5. A model generation method implementable by a computer, the method comprising:
obtaining a plurality of learning datasets each comprising a combination of training data and true data, the training data indicating a positional relationship between two objects, the positional relationship expressed using relative coordinates, at least one of the two objects to be moved by operation of a robot, the true data indicating whether the two objects come in contact with each other in the positional relationship; and
training, through machine learning, a determination model using the obtained plurality of learning datasets to cause the determination model to output, in response to an input of training data comprised in each of the obtained plurality of learning datasets, an output value fitting true data comprised in a corresponding learning dataset of the obtained plurality of learning datasets, the output value indicating whether the two objects come in contact with each other, the trained determination model generated through machine learning to reduce a data volume of information indicating a boundary at which the two objects come into contact with each other.

6. A control apparatus for controlling an operation of a robot device to perform a task of moving a first object in an environment comprising the first object and a second object, the apparatus comprising a processor configured with a program to perform operations comprising:
obtaining a current task state of the robot device, the task state being defined by a positional relationship between the first object and the second object;
determining a goal task state to be achieved subsequently to the obtained current task state to be closer to a task state as a final goal;
determining whether the first object and the second object come in contact with each other in a target task state by providing the target task state of the first object and the second object to a trained determination model, the trained determination model being trained through machine learning to output an output value fitting true data in response to an input of training data, the training data indicating a positional relationship between the first object and the second object, the true data indicating whether the first object and the second object come in contact with each other in the positional relationship;
determining a control command for the robot device to change the task state of the robot device from the current task state to the goal task state;
providing the determined control command to the robot device to drive the robot device; and
generating, using a result of the determination obtained by the trained determination model, an inference model.

7. The control apparatus according to claim 6, wherein the positional relationship between the first object and the second object is expressed using relative coordinates.

8. The control apparatus according to claim 7, wherein the processor is configured with the program to perform operations further comprising:
generating, using a result of the determination obtained by the trained determination model, an inference model for inferring the goal task state to be achieved subsequently based on the current task state and the task state as the final goal to avoid contact of the first object with the second object,
wherein the processor is configured with the program to perform operations such that determining the goal task state comprises determining the goal task state to be achieved subsequently to the current task state using the generated inference model.

9. The control apparatus according to claim 8, wherein the processor is configured with the program to perform operations such that generating the inference model comprises the inference model by training the inference model through machine learning.

10. The control apparatus according to claim 9, wherein the machine learning comprises reinforcement learning using a reward defined based on a result of determination obtained by the trained determination model as to whether the first object and the second object come in contact with each other in a target task state and based on a distance between the target task state and the task state as the final goal,
the reward is set higher for the first object and the second object not coming in contact with each other and for the distance being shorter, and is set lower for the first object and the second object coming in contact with each other or for the distance being longer, and
the training through the machine learning comprises repeatedly correcting a value of a computational parameter of the inference model to increase the reward.

11. The control apparatus according to claim 8, wherein
the inference model comprises a potential field defining a potential for each set of coordinates in a task space representing a set of the task states,
the processor is configured with the program to perform operations such that
generating an inference model comprises generating paths from a plurality of task states set as start points to the task state as the final goal through path planning to avoid contact of the first object with the second object using the trained determination model in the task space, and generating the potential field by setting a potential for each set of the coordinates in accordance with a frequency of passage through the generated paths, and
determining the goal task state comprises determining the goal task state to be achieved subsequently in accordance with a gradient of the potential set for coordinates corresponding to the current task state in the generated potential field.

12. The control apparatus according to claim 6, wherein the processor is configured with the program to perform operations further comprising:
generating, using a result of the determination obtained by the trained determination model, the inference model comprises generating the inference model for inferring the goal task state to be achieved subsequently based on the current task state and the task state as the final goal to avoid contact of the first object with the second object,
wherein the processor is configured with the program to perform operations such that determining the goal task state comprises determining the goal task state to be achieved subsequently to the current task state using the generated inference model.

13. The control apparatus according to claim 12, wherein the processor is configured with the program to perform operations such that generating the inference model comprises generating the inference model by training the inference model through machine learning.

14. The control apparatus according to claim 13, wherein the machine learning comprises reinforcement learning using a reward defined based on a result of determination obtained by the trained determination model as to whether the first object and the second object come in contact with each other in a target task state and based on a distance between the target task state and the task state as the final goal, the reward is set higher for the first object and the second object not coming in contact with each other and for the distance being shorter, and is set lower for the first object and the second object coming in contact with each other or for the distance being longer, and the training through the machine learning comprises repeatedly correcting a value of a computational parameter of the inference model to increase the reward.

15. The control apparatus according to claim 12, wherein the inference model comprises a potential field defining a potential for each set of coordinates in a task space representing a set of task states, the processor is configured with the program to perform operations such that generating the inference model comprises generating paths from a plurality of task states set as start points to the task state as the final goal through path planning to avoid contact of the first object with the second object using the trained determination model in the task space, and generating the potential field by setting a potential for each set of the coordinates in accordance with a frequency of passage through the generated paths, and determining the goal task state comprises determining the goal task state to be achieved subsequently in accordance with a gradient of the potential set for coordinates corresponding to the current task state in the generated potential field.

\* \* \* \* \*